(12) United States Patent  
Takizawa

(10) Patent No.: US 6,651,820 B2
(45) Date of Patent: Nov. 25, 2003

(54) SYSTEM FOR SORTING COMMERCIAL ARTICLES AND METHOD THEREFOR

(75) Inventor: Chiyuki Takizawa, Joetsu (JP)

(73) Assignee: AT&C CO., Ltd., Niigata (JP)

(*) Notice: Subject to any disclaimer, the term of this patent is extended or adjusted under 35 U.S.C. 154(b) by 0 days.

(21) Appl. No.: 10/145,004

(22) Filed: May 14, 2002

(65) Prior Publication Data
US 2002/0175112 A1 Nov. 28, 2002

Related U.S. Application Data

(62) Division of application No. 09/793,787, filed on Feb. 26, 2001.

(51) Int. Cl.[7] ................................................. B07C 5/00
(52) U.S. Cl. ....................... 209/546; 209/583; 209/630
(58) Field of Search ................................. 209/630, 583, 209/546, 656, 657, 933; 198/370.01, 370.02, 502.1, 502.3

(56) References Cited

U.S. PATENT DOCUMENTS

| 3,640,412 | A | * | 2/1972 | Traube ........................ 414/800 |
| 4,181,948 | A | | 1/1980 | Jackson et al. |
| 5,103,205 | A | * | 4/1992 | Halligan ...................... 340/473 |
| 5,269,646 | A | * | 12/1993 | Focke ........................ 414/796.2 |
| 5,385,243 | A | * | 1/1995 | Jackson et al. ............. 209/509 |
| 5,881,890 | A | | 3/1999 | Wiley |
| 5,953,234 | A | * | 9/1999 | Singer et al. ............... 700/214 |
| 2002/0125177 | A1 | * | 9/2002 | Burns et al. ................ 209/630 |

FOREIGN PATENT DOCUMENTS

| JP | 01267213 A | * | 10/1989 | ........... B65G/47/49 |
| JP | 01279062 A | * | 11/1989 | ........... B65G/33/25 |
| JP | 2000-118641 | | 4/2000 | |

* cited by examiner

Primary Examiner—Donald P. Walsh
Assistant Examiner—Joseph C Rodriguez
(74) Attorney, Agent, or Firm—McGlew and Tuttle, P.C.

(57) ABSTRACT

An article sorting system is provided. The system comprises a first conveyor; a plurality of sorting lines; a reading device to read the identification information of a tray conveyed by the first conveyor; a memory to store an article information table connecting the identification information of a tray with the information of the articles contained in the tray, and the arrangement pattern of the slots of each of the plurality of sorting line; a sorter control device to determine an appropriate sorting line for a tray and control the sorter to guide the tray to the sorting line, after having referred to the identification information of the tray read by the reading device, and the article information table and the arrangement patterns of slots stored in the memory; and a direction indicating device to provide each article introduced into the sorting rack with an arrow to indicate a direction towards a nominated slot and a number of the nominated slot for the article.

7 Claims, 66 Drawing Sheets

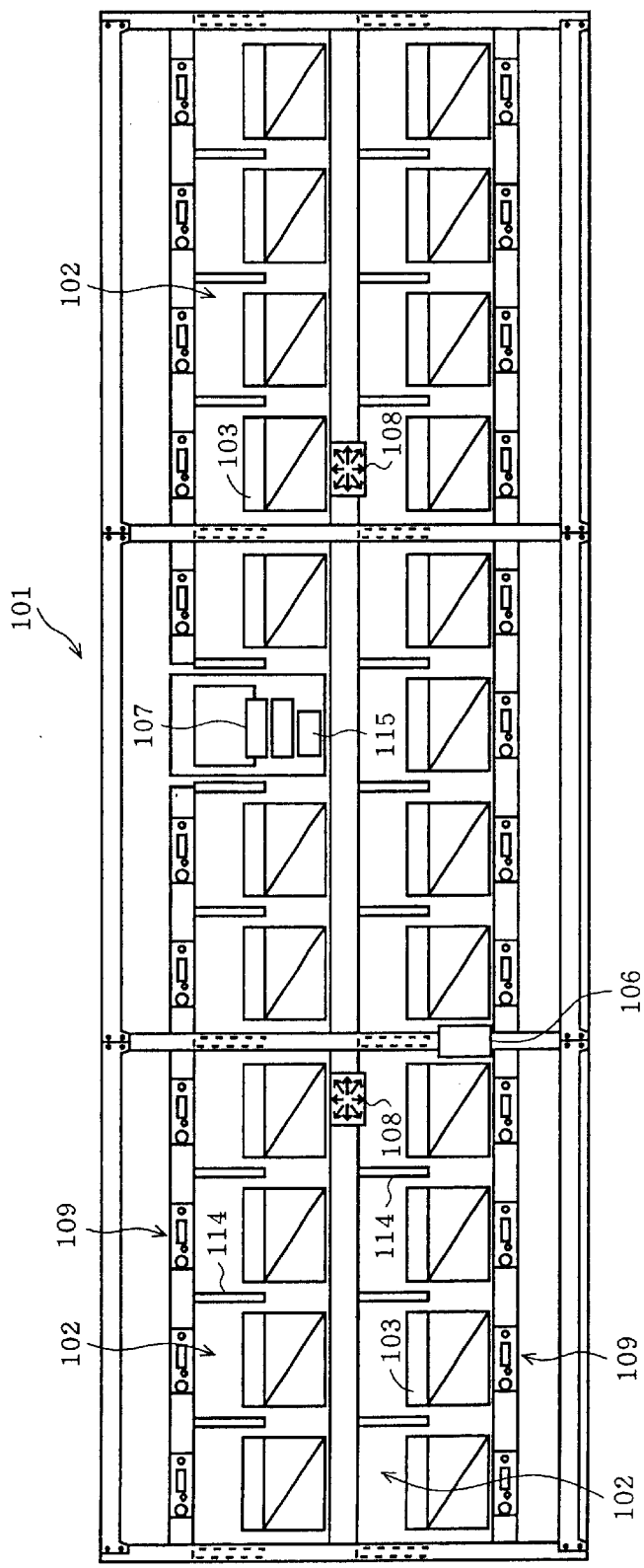
F I G. 1

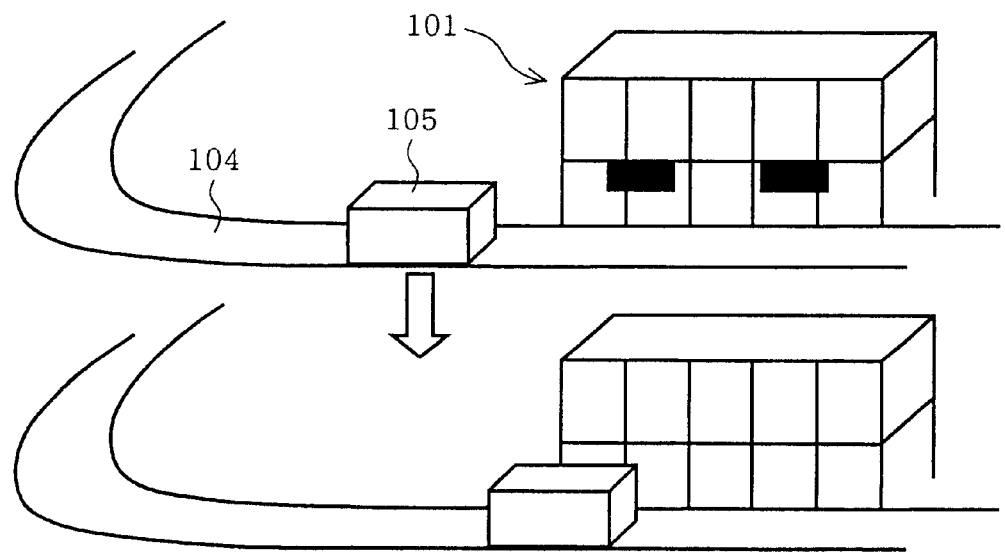
F I G. 2
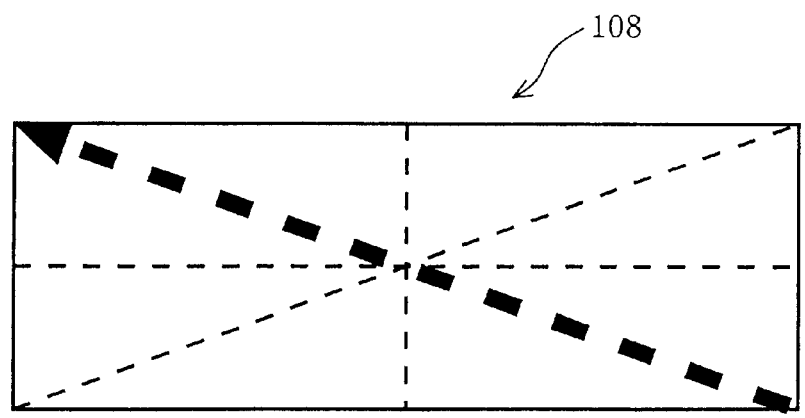
F I G. 3

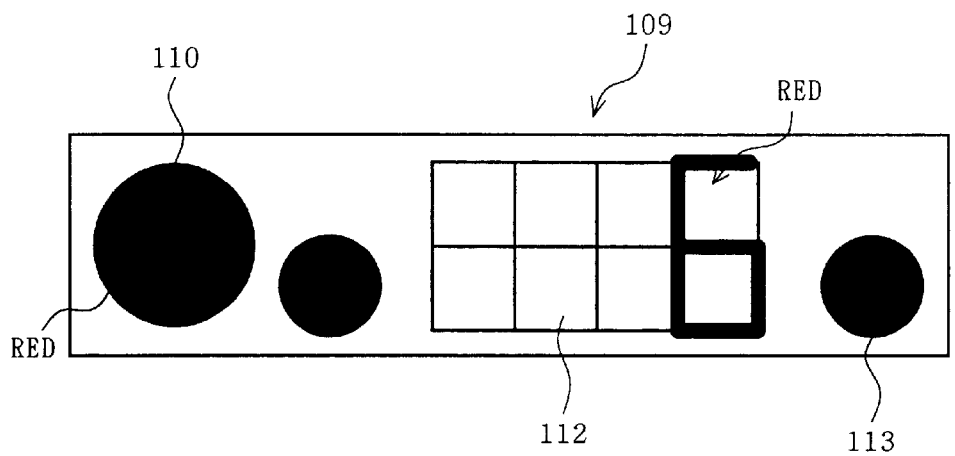
F I G. 4
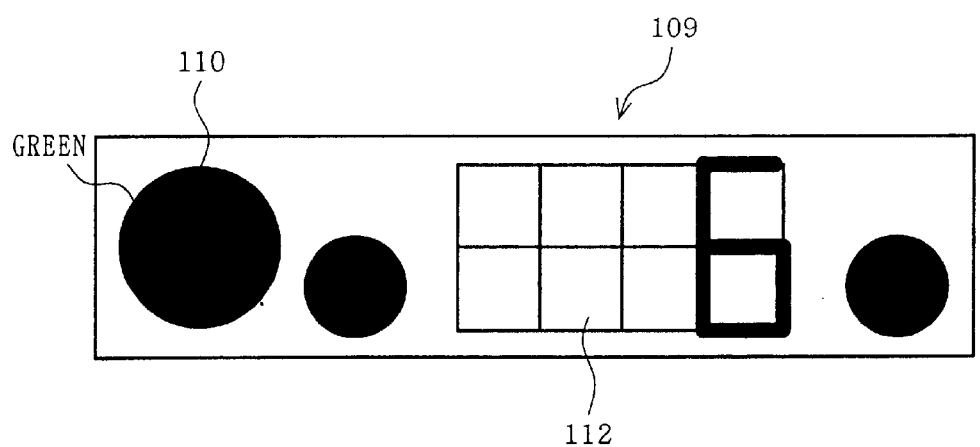
F I G. 5

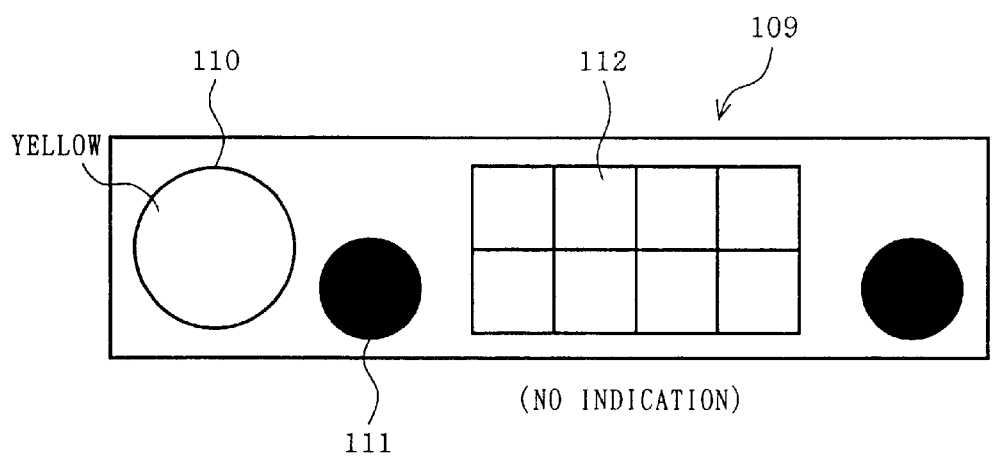
F I G . 6

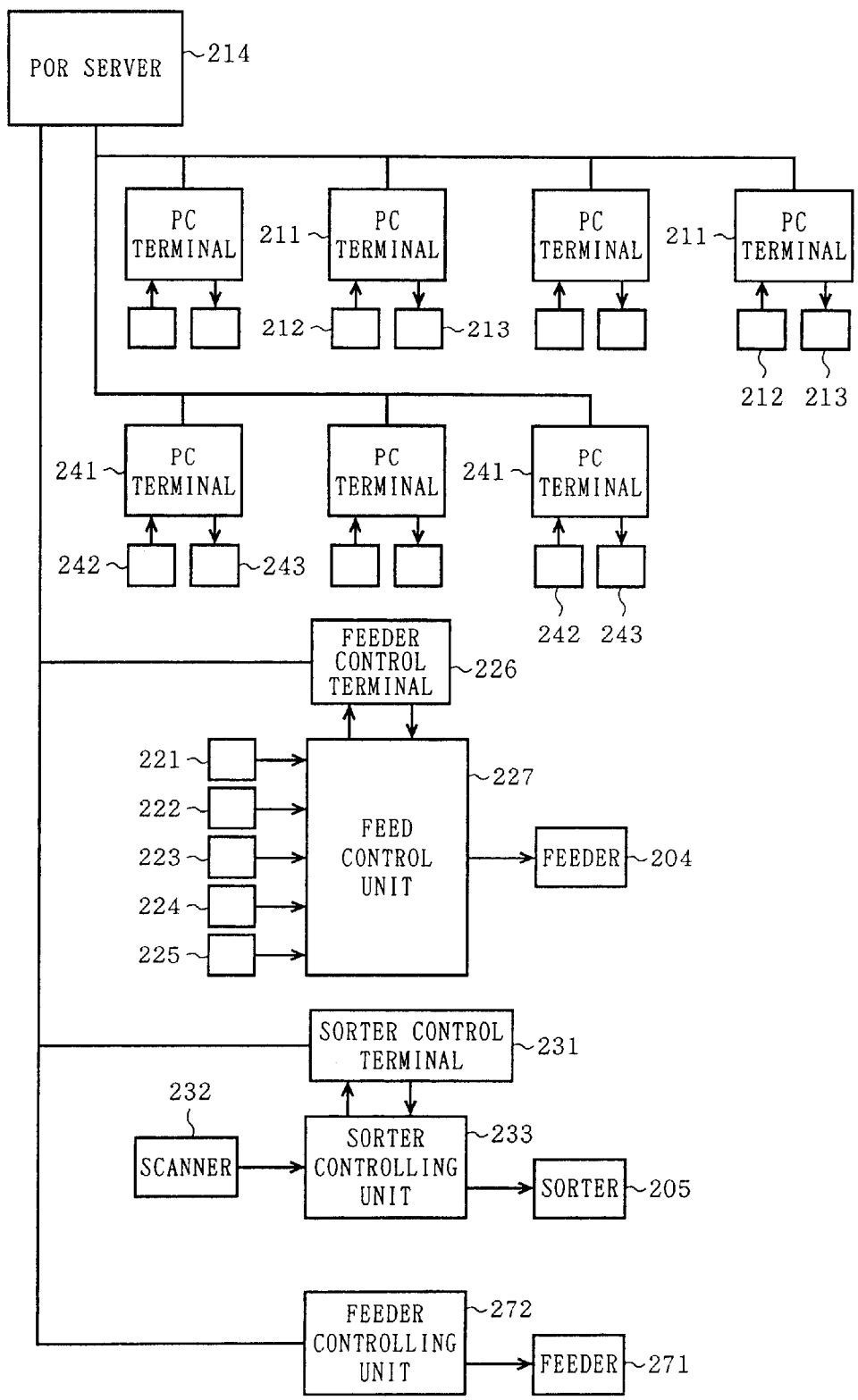
F I G. 9

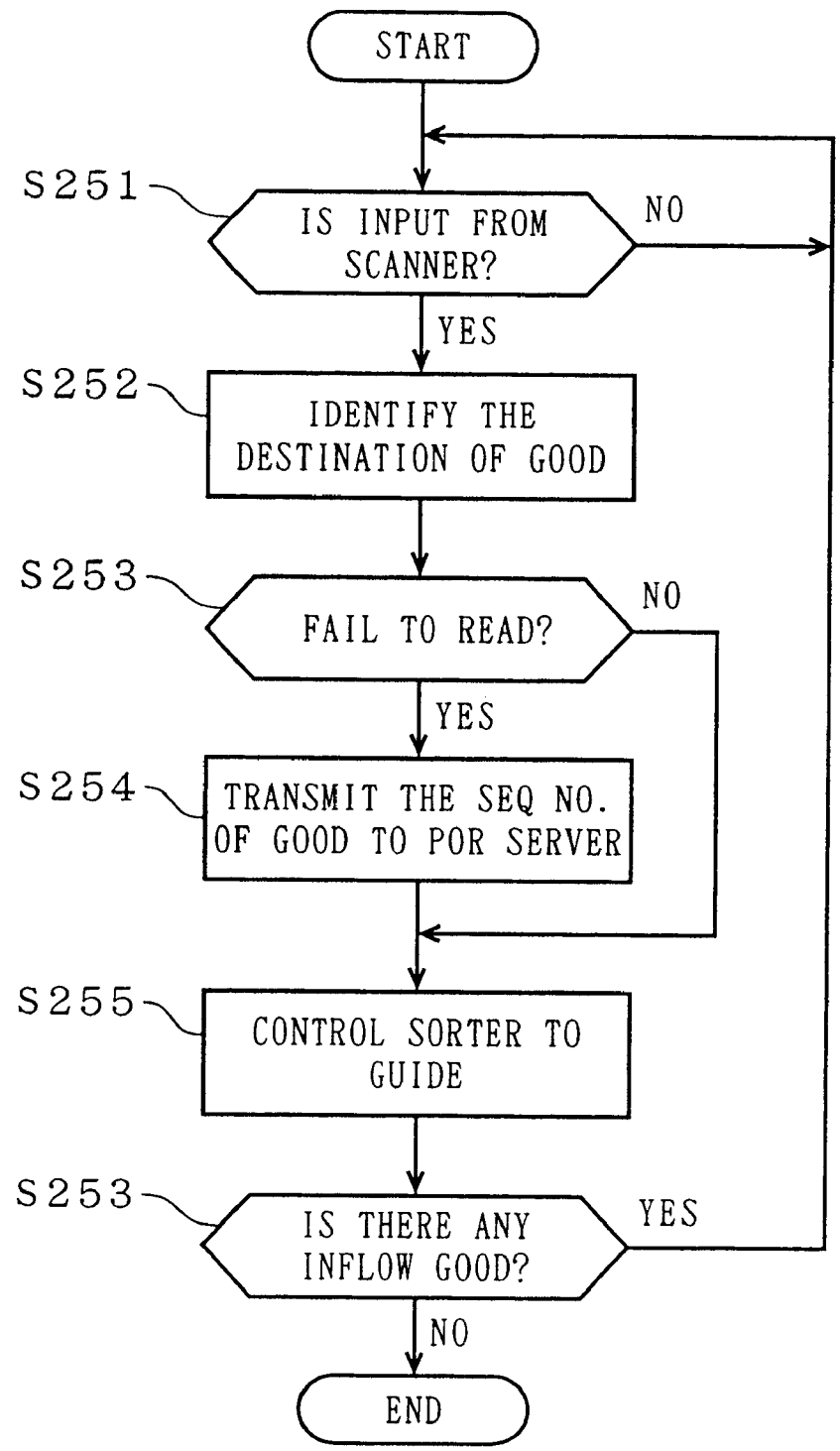
F I G. 13

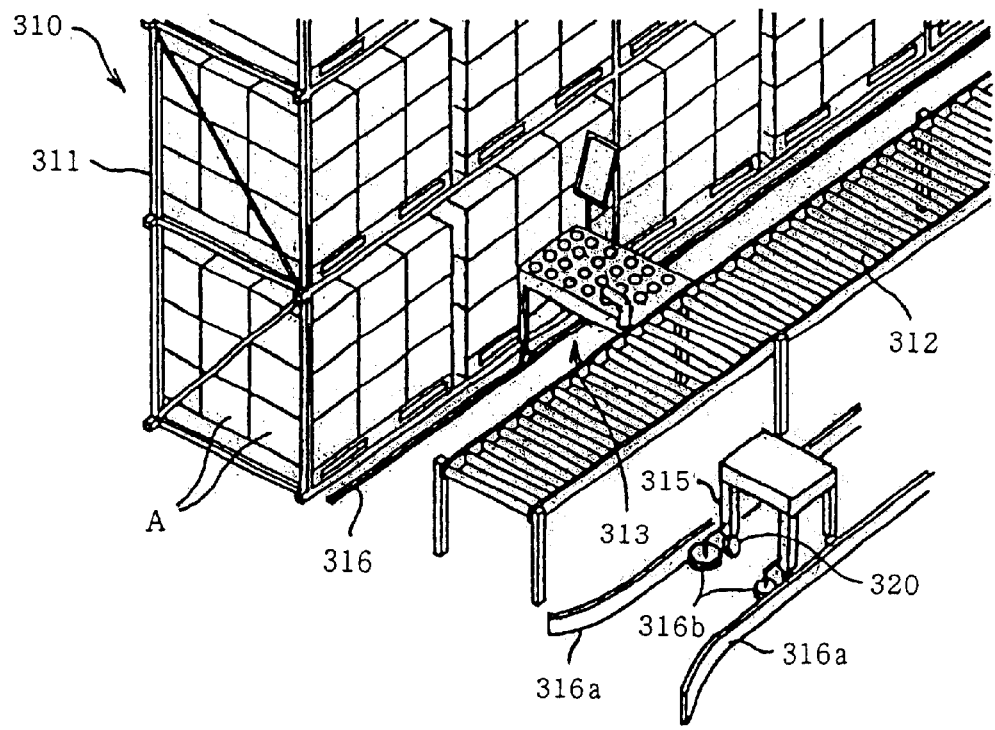
F I G . 1 7 A
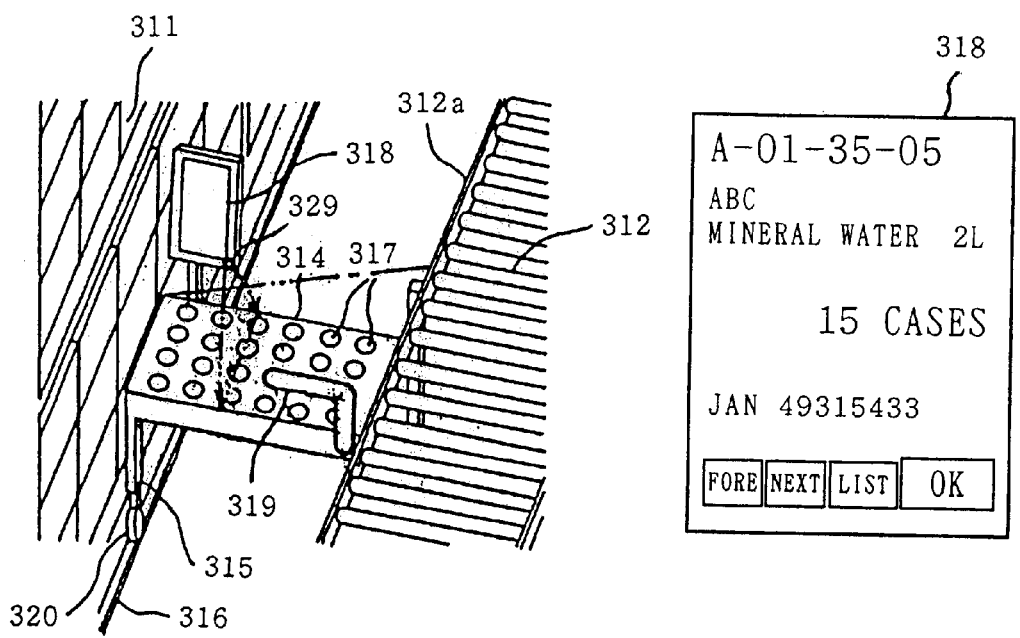
F I G . 1 7 B
F I G . 1 7 C

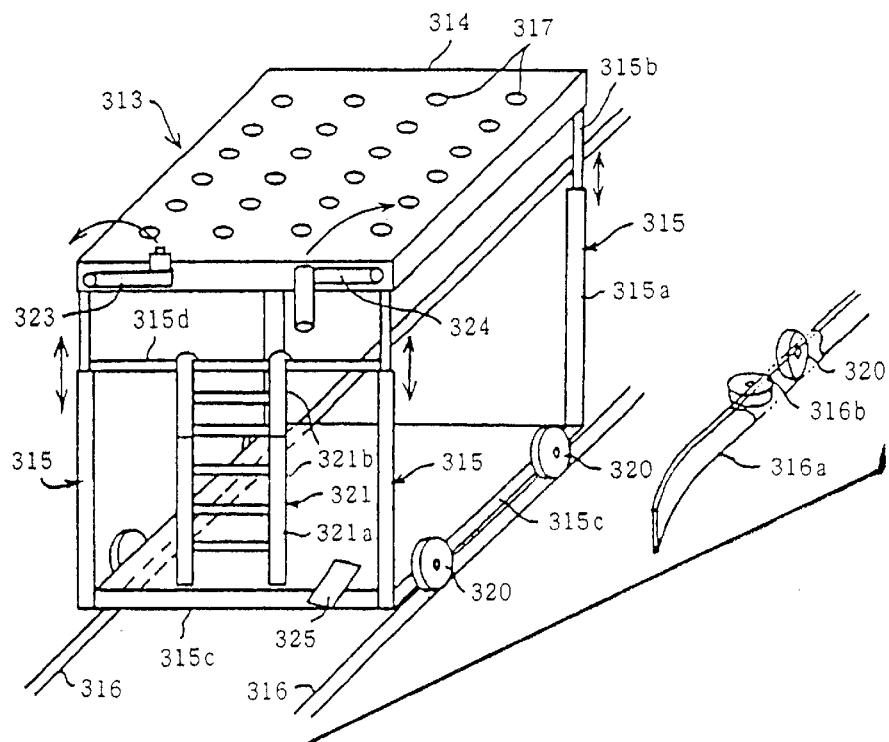
F I G. 18 A
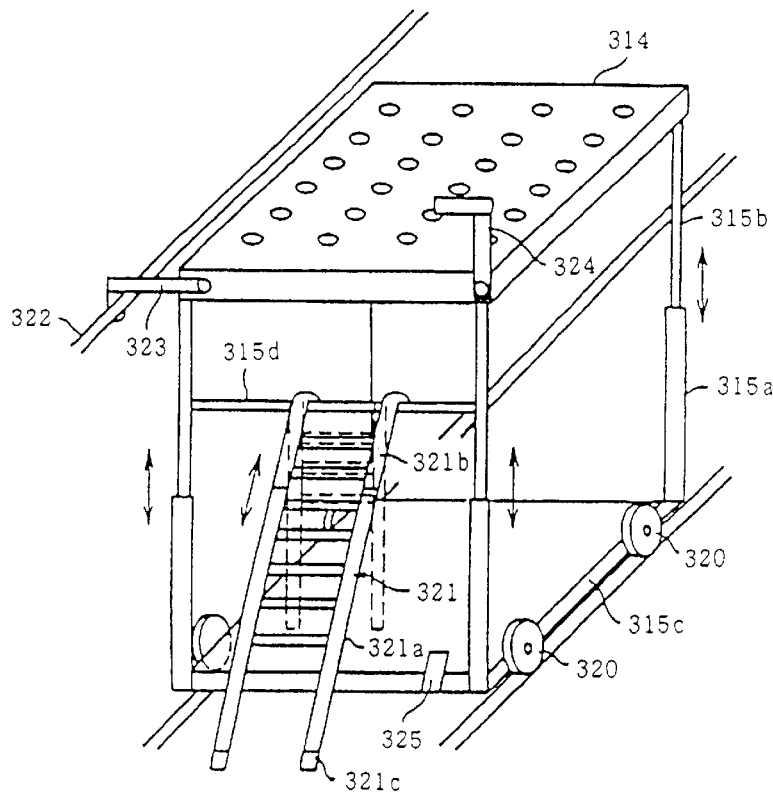
F I G. 18 B

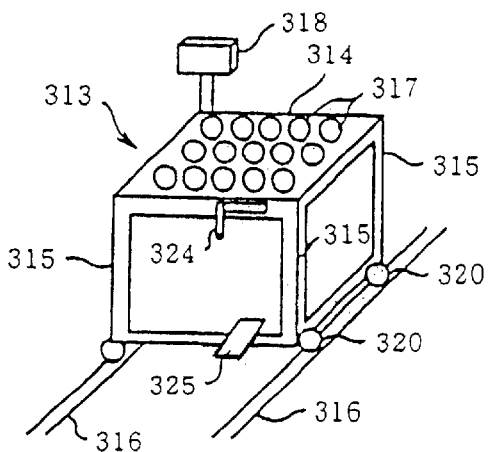
FIG. 19A
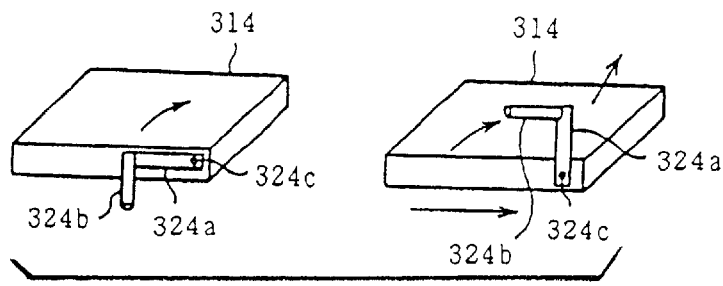
FIG. 19B
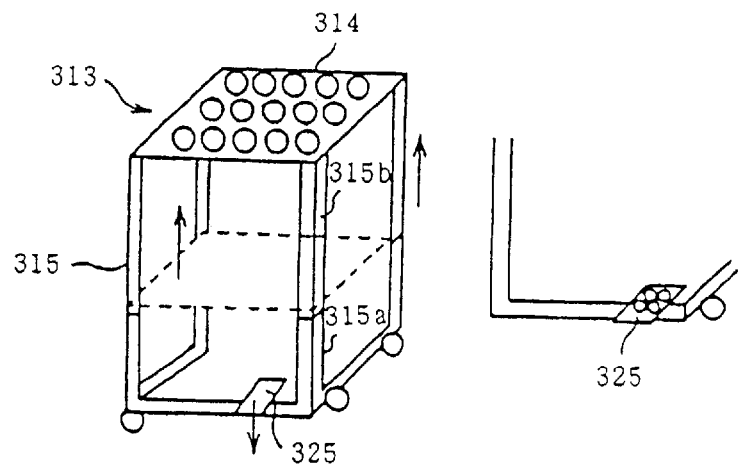
FIG. 19C
FIG. 19D

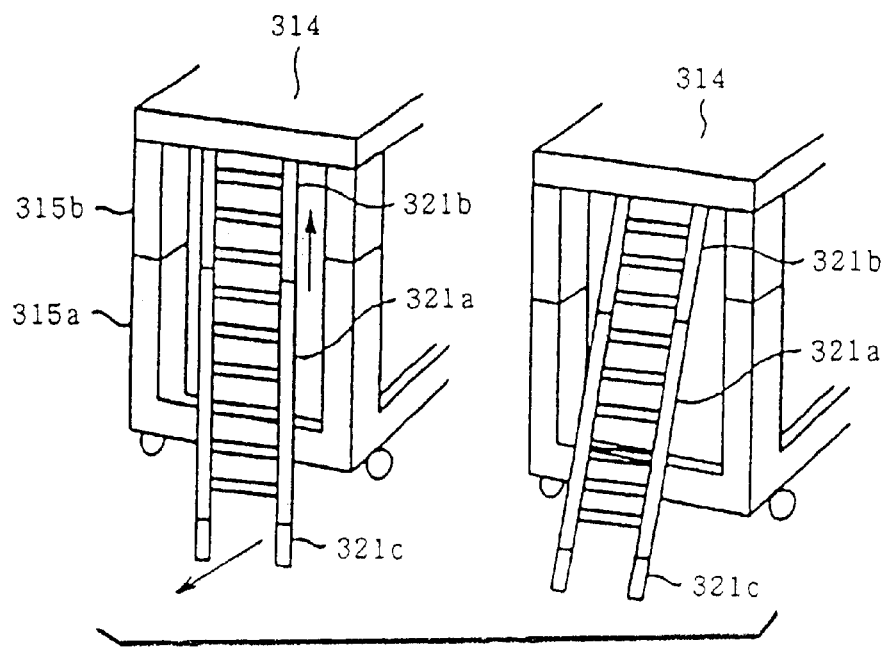
FIG. 20A
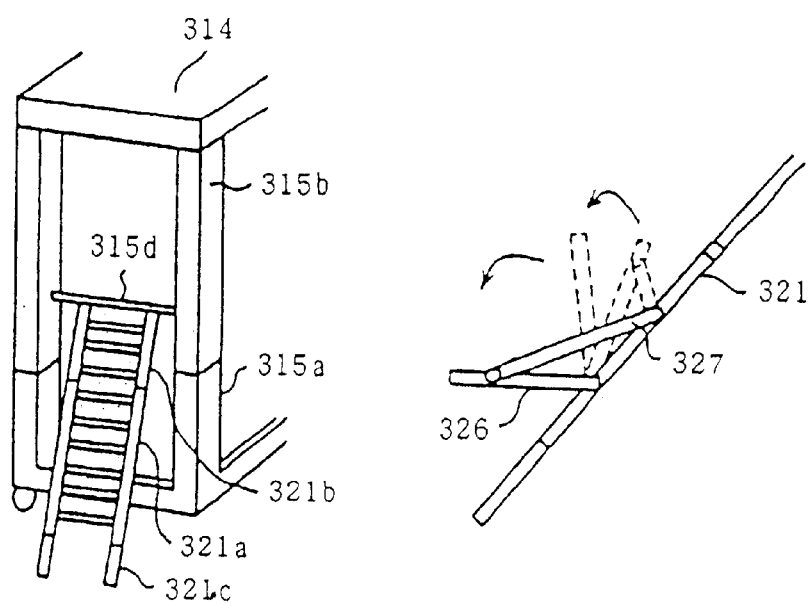
FIG. 20B
FIG. 20C

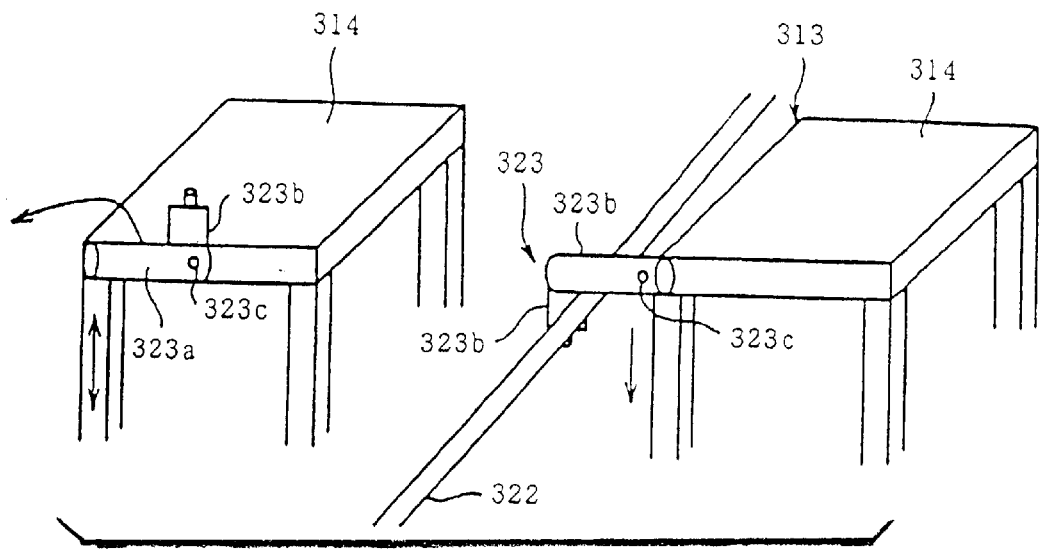
F I G. 2 1 A
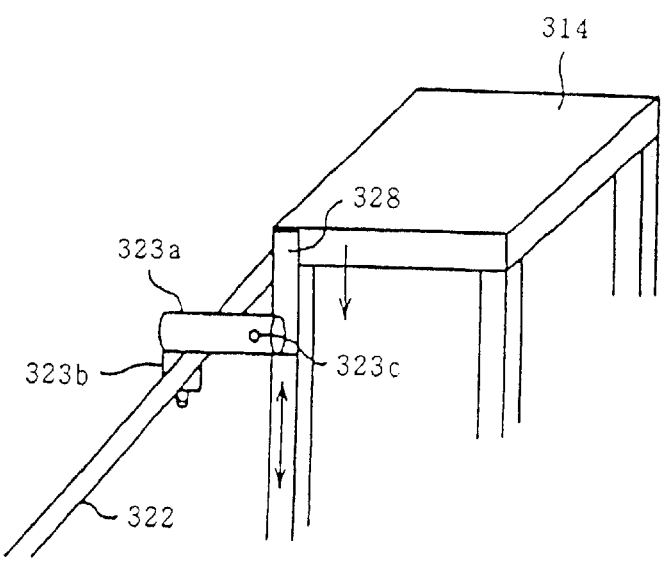
F I G. 2 1 B

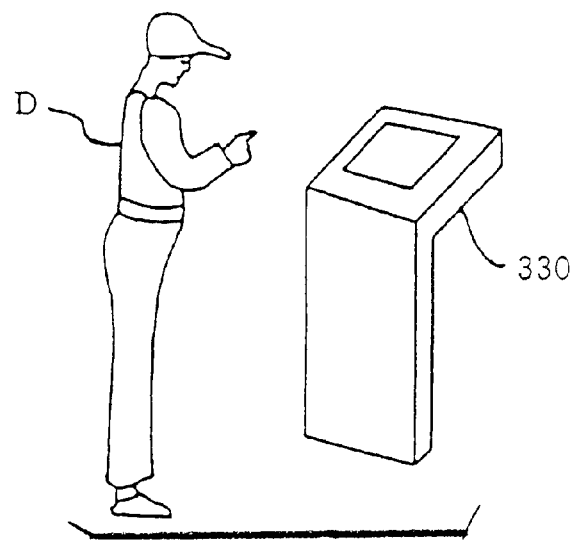
F I G. 2 2 A
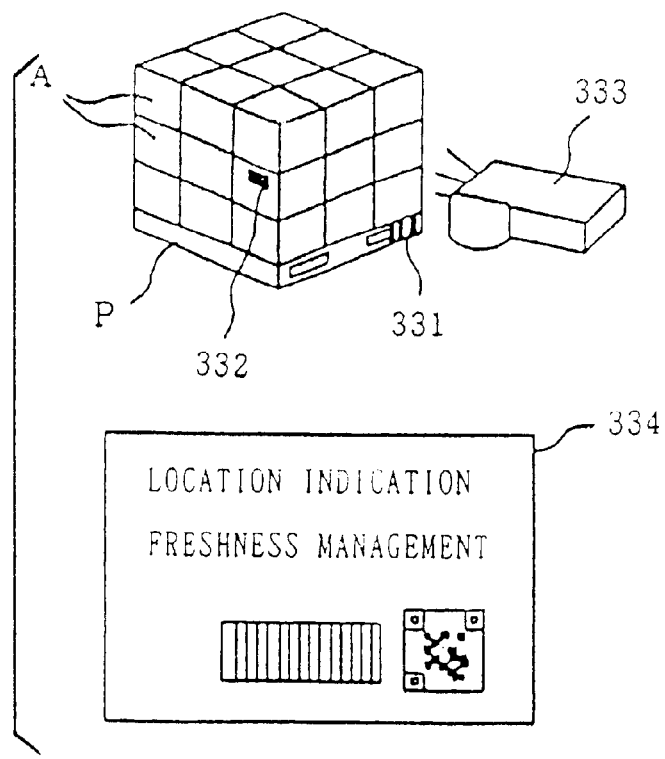
F I G. 2 2 B

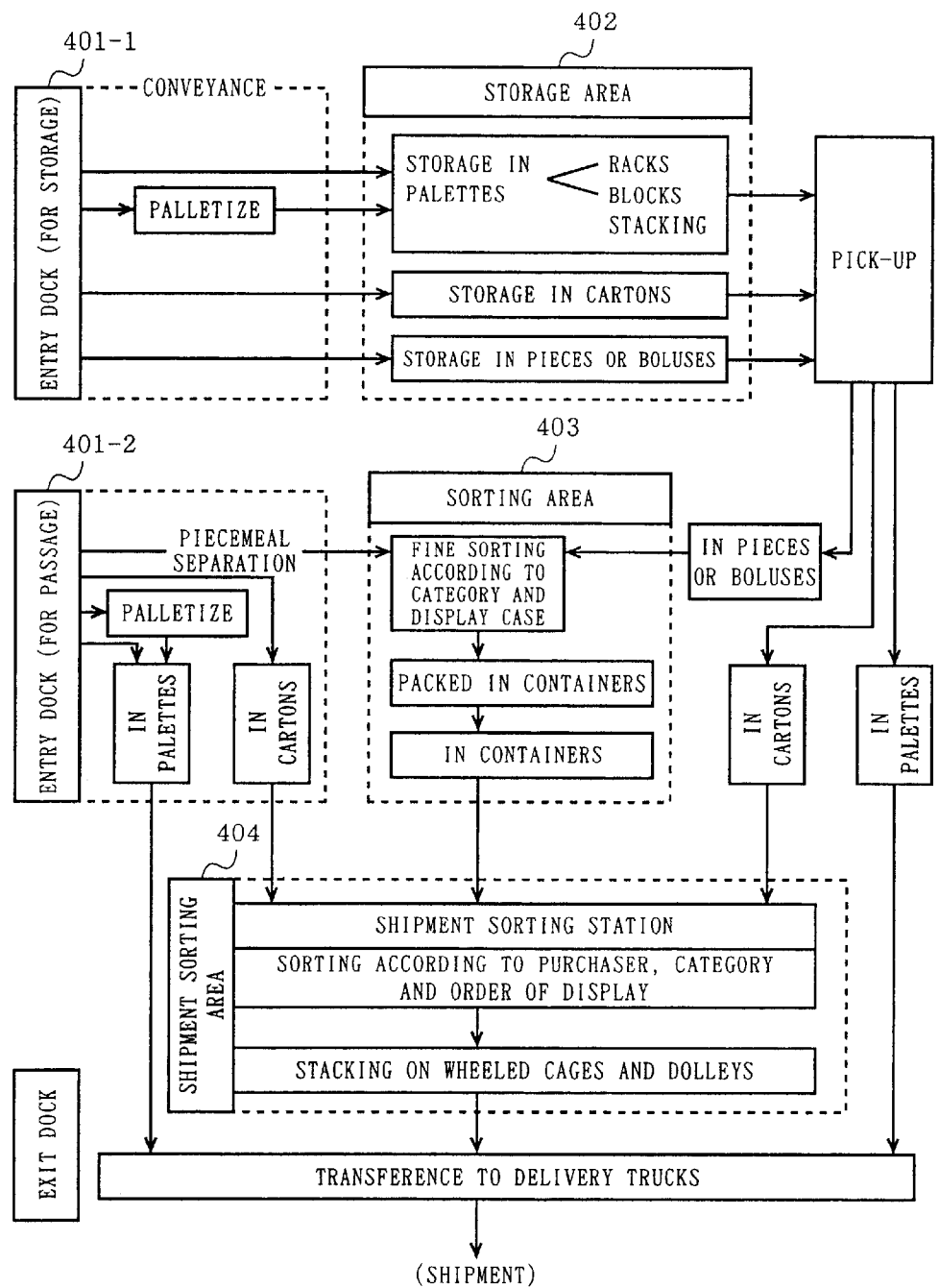
F I G. 2 5

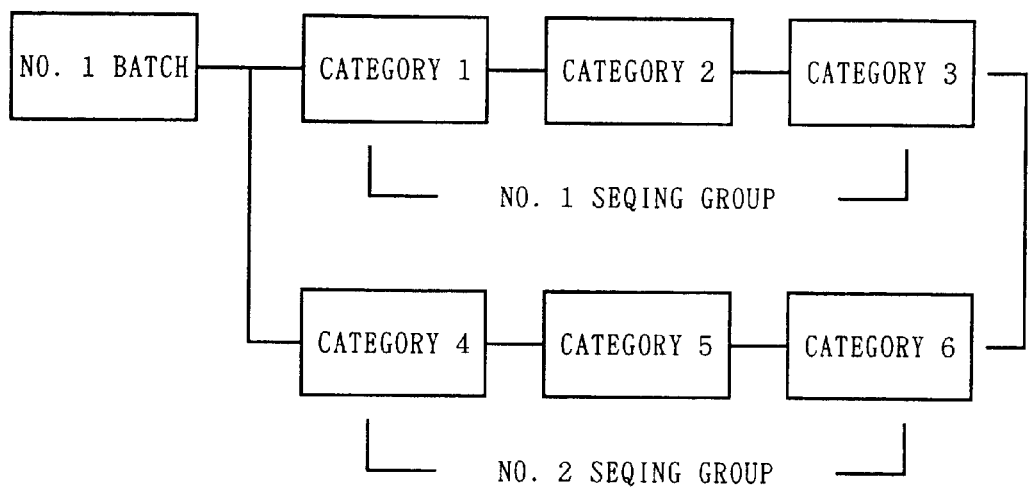
F I G. 2 7

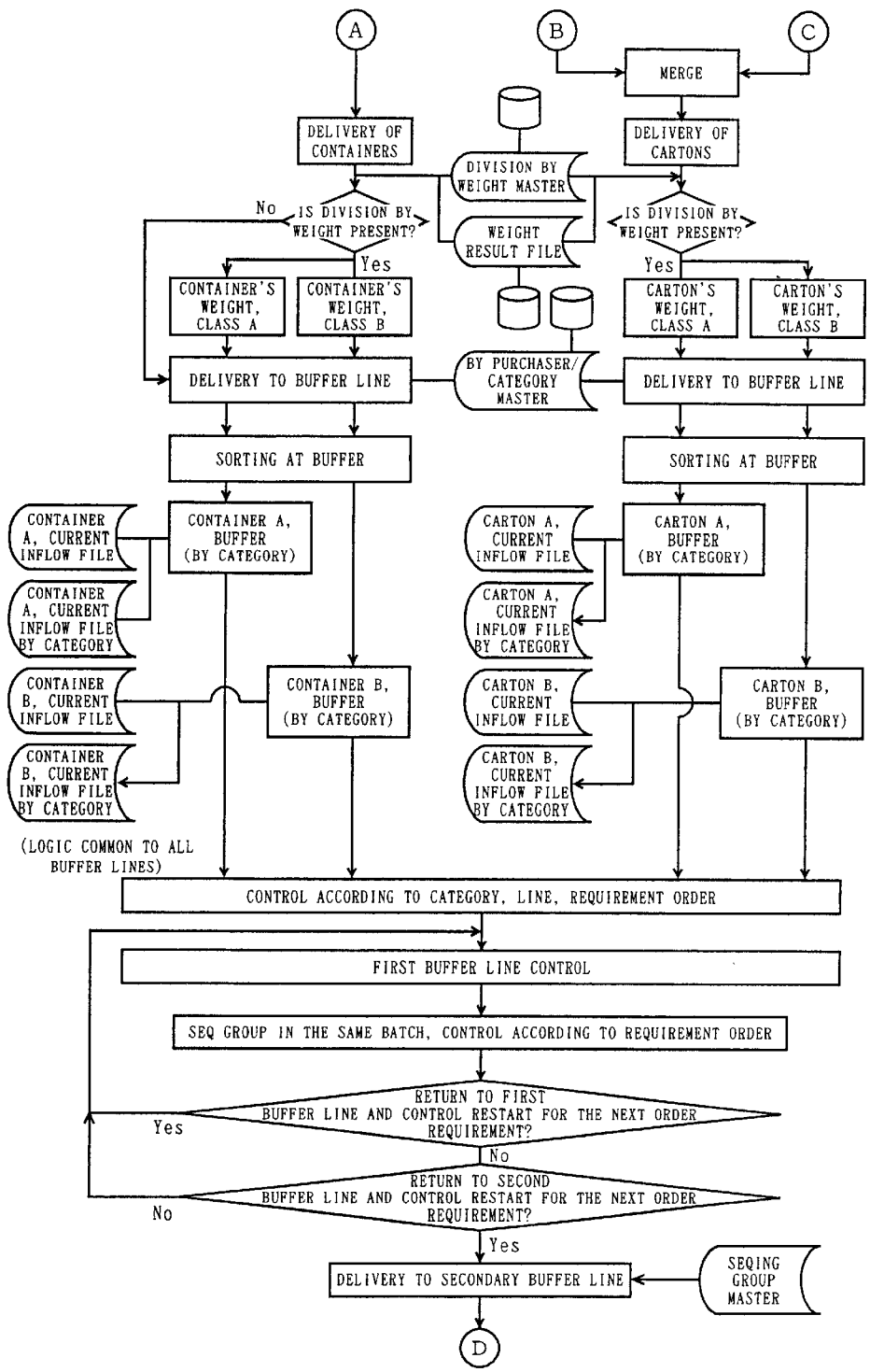
F I G. 2 9

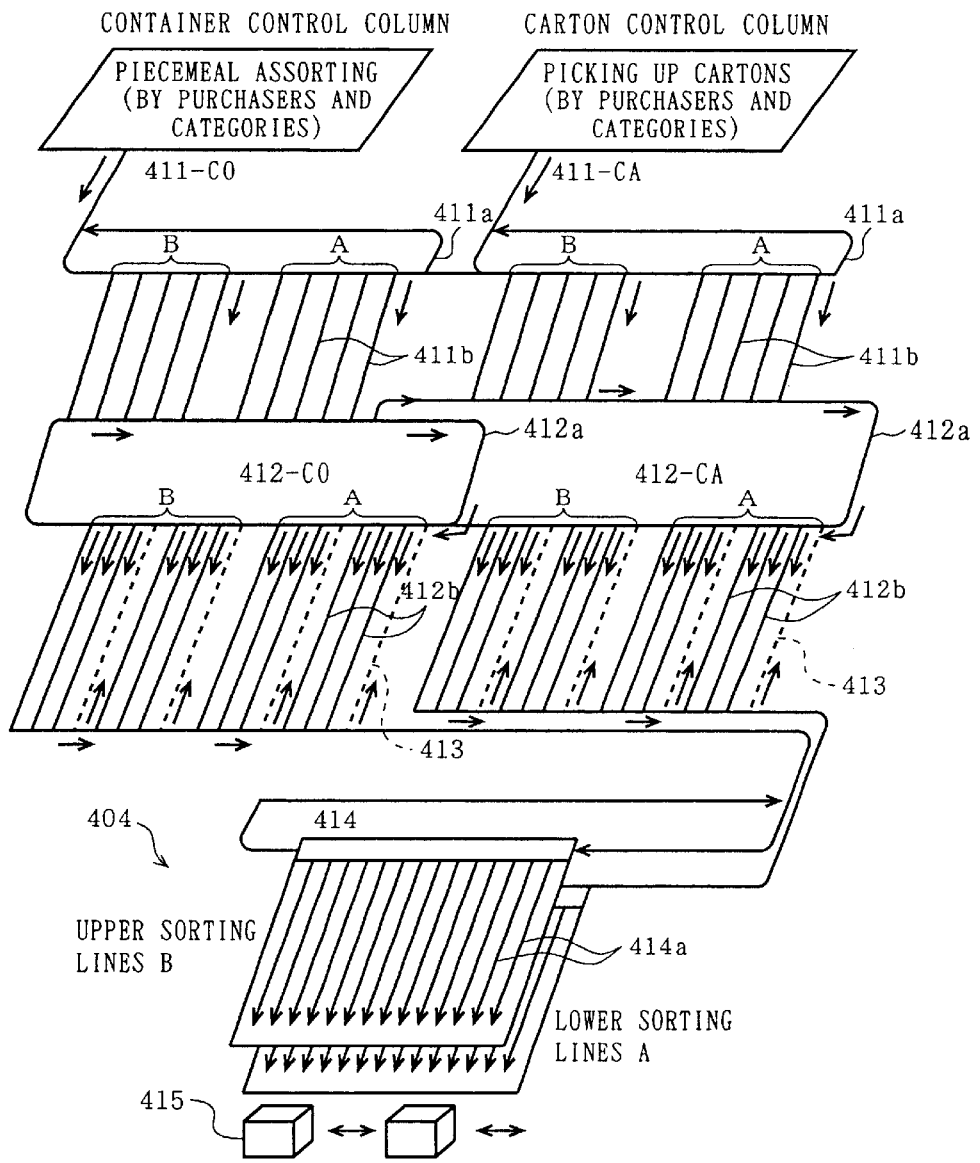
F I G. 3 3

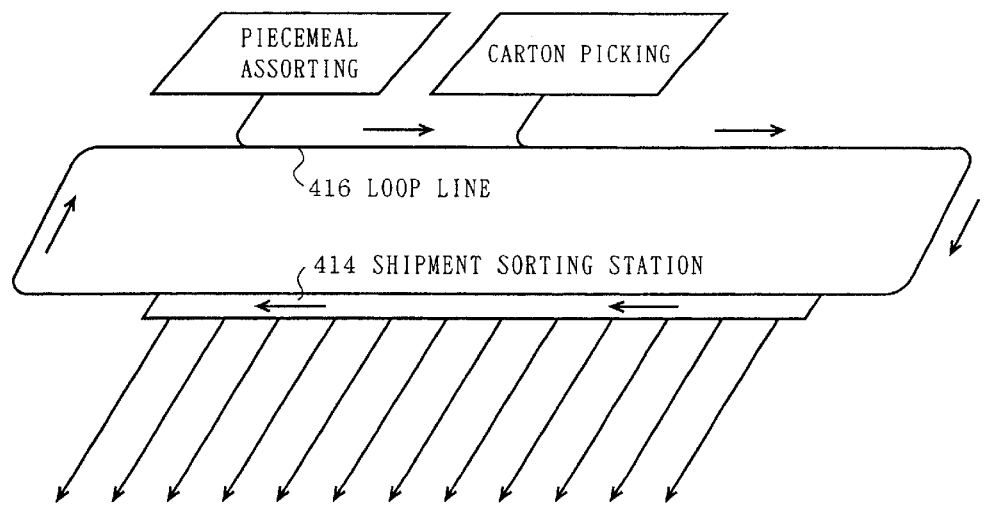
F I G. 3 4 A
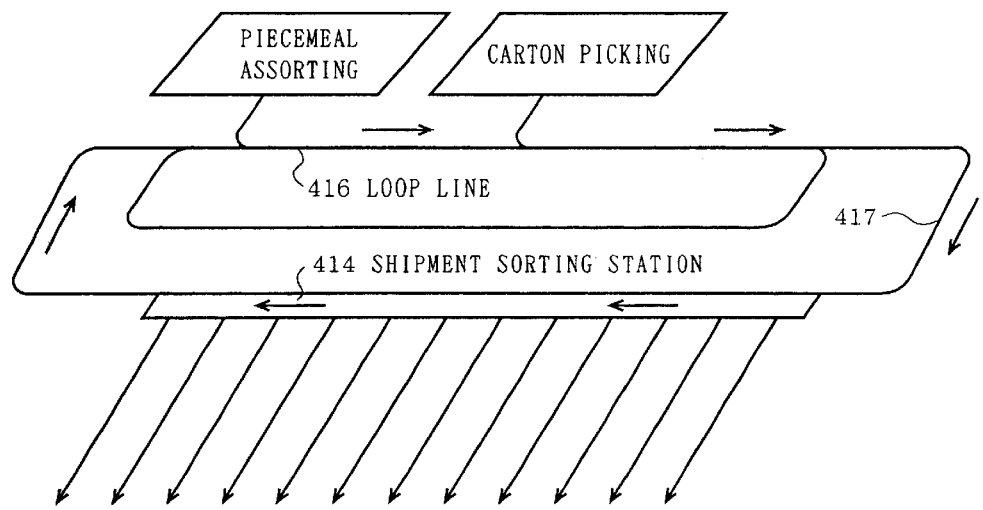
F I G. 3 4 B

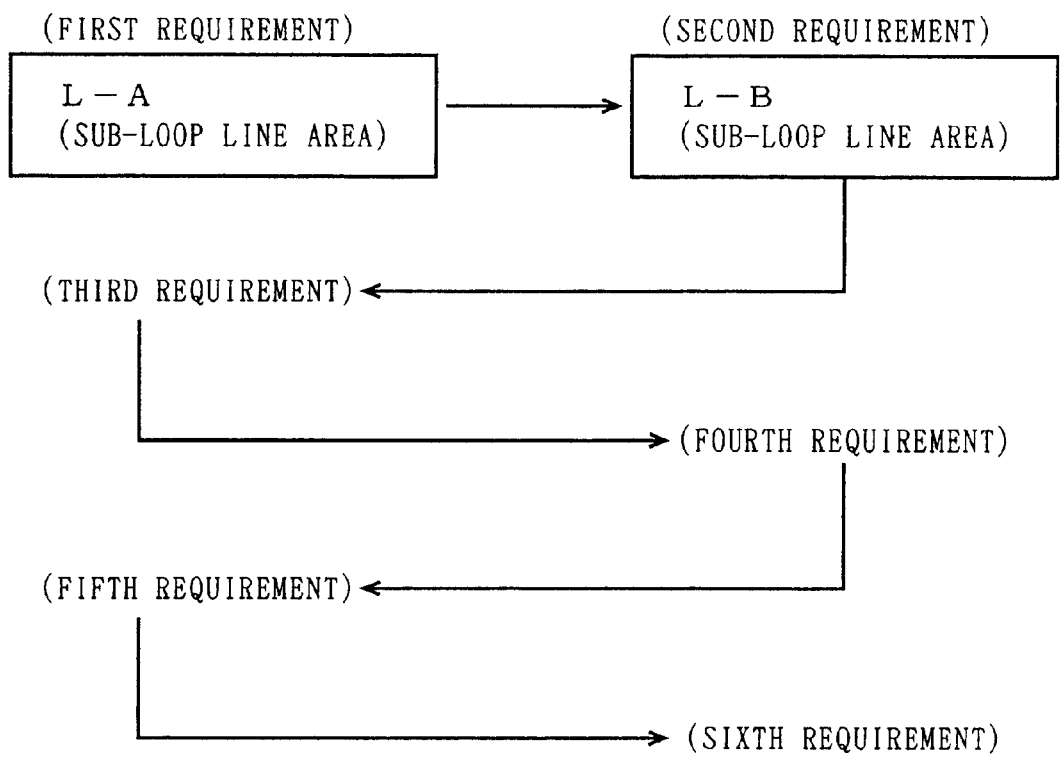
F I G. 3 7

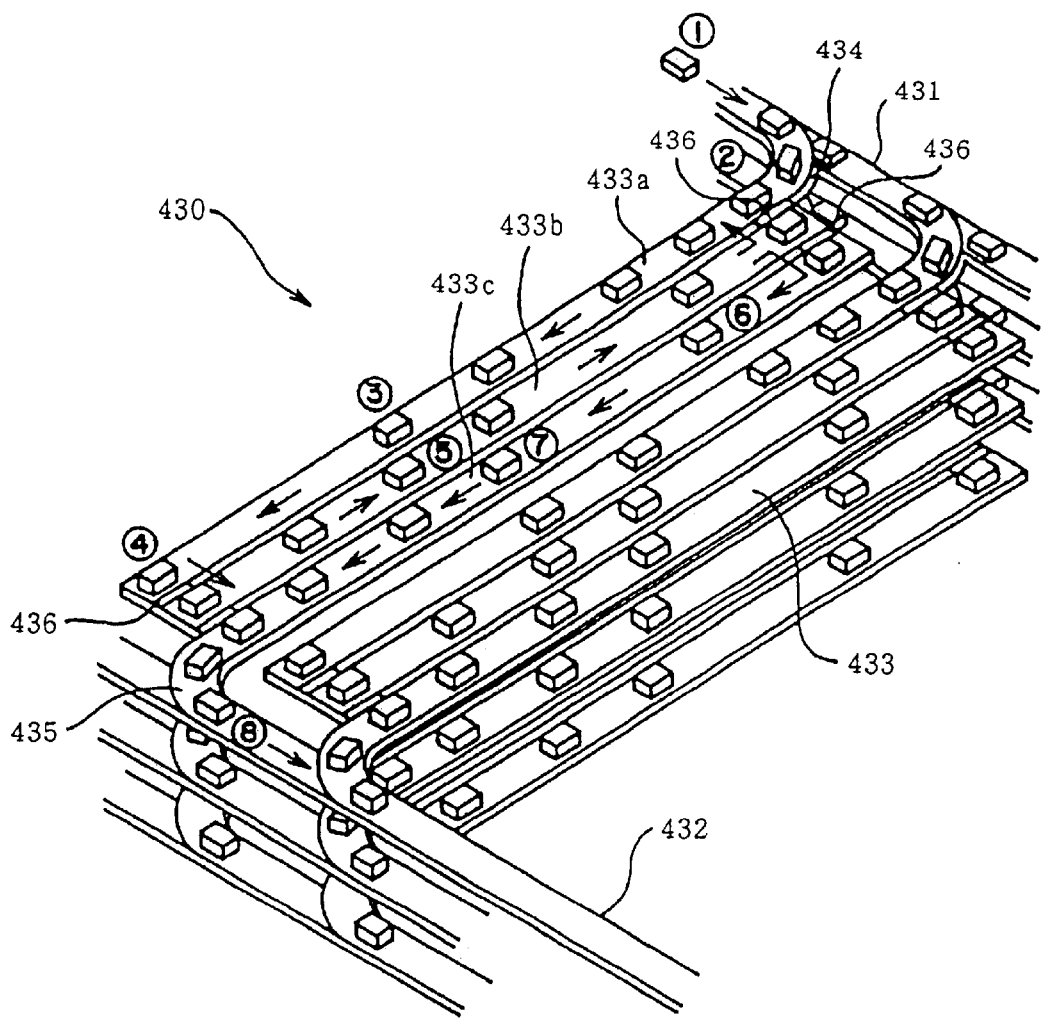
F I G. 3 9

SYSTEM OF THIS INVENTION

CONVENTIONAL SYSTEM

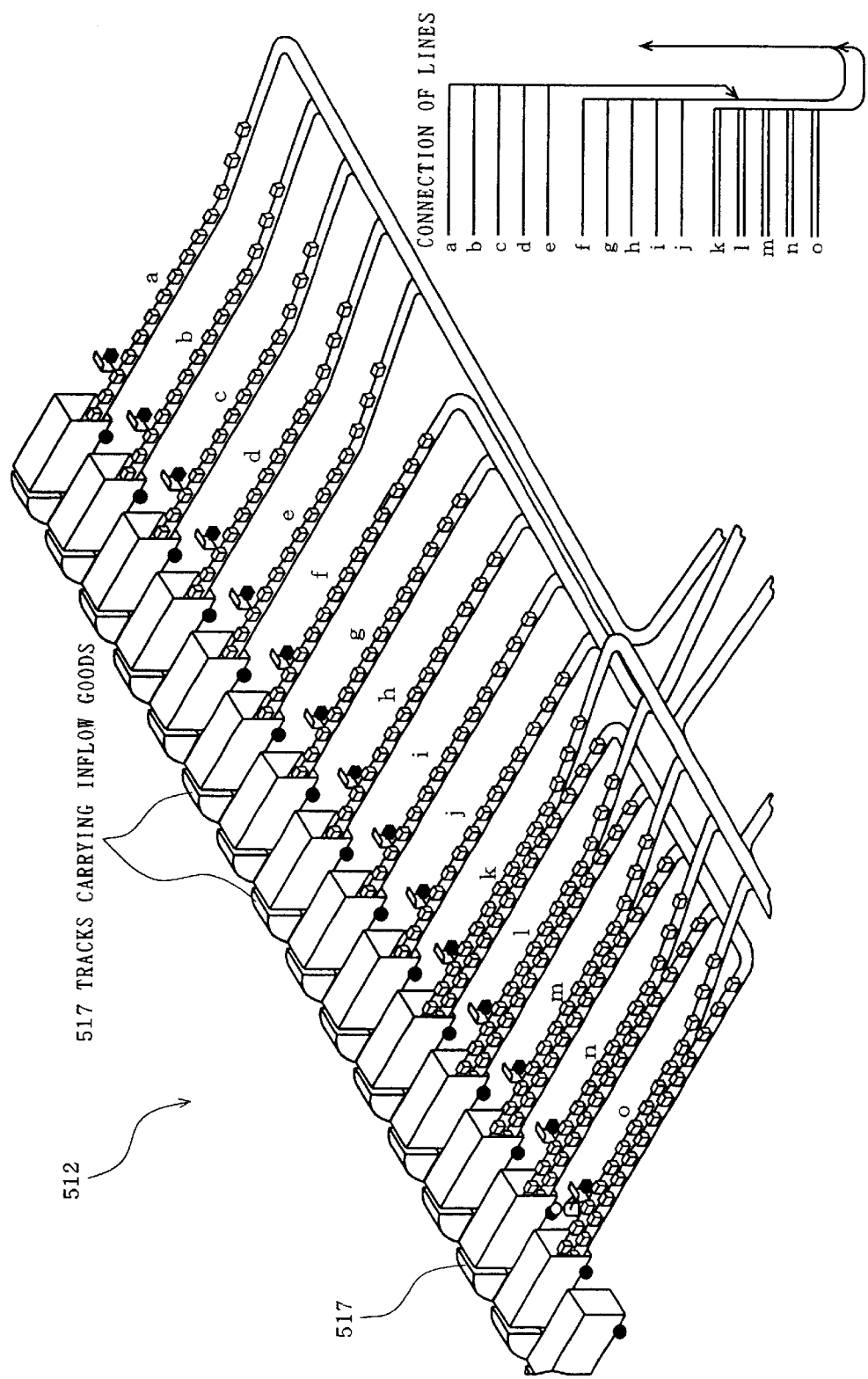
F I G. 4 4

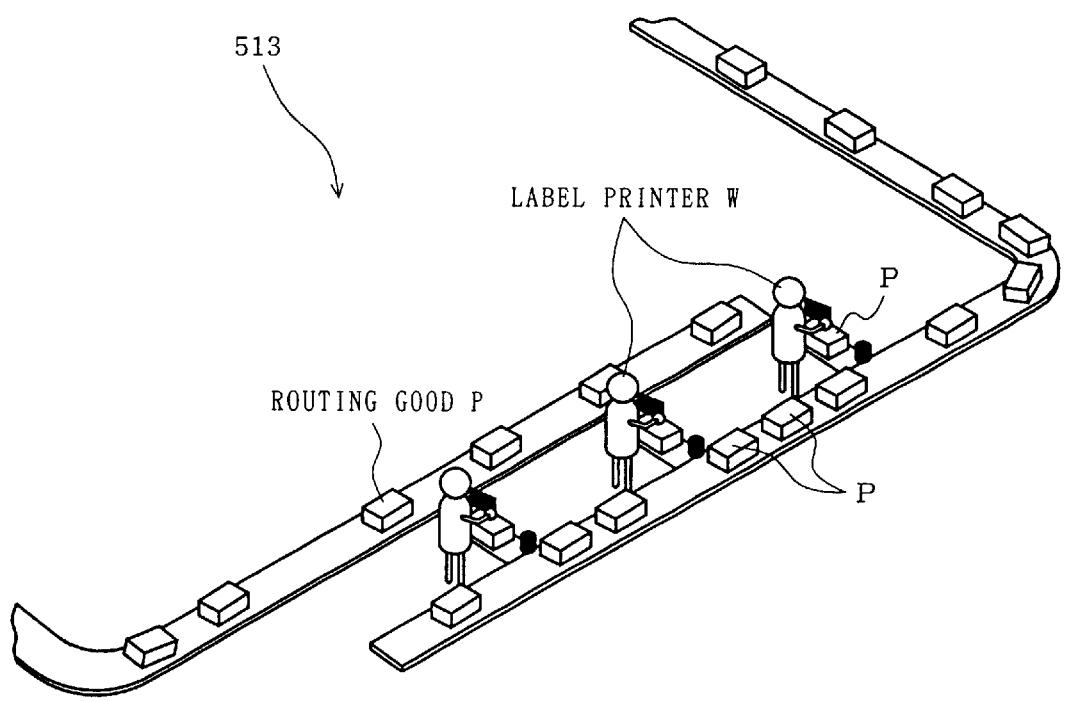
F I G . 4 5

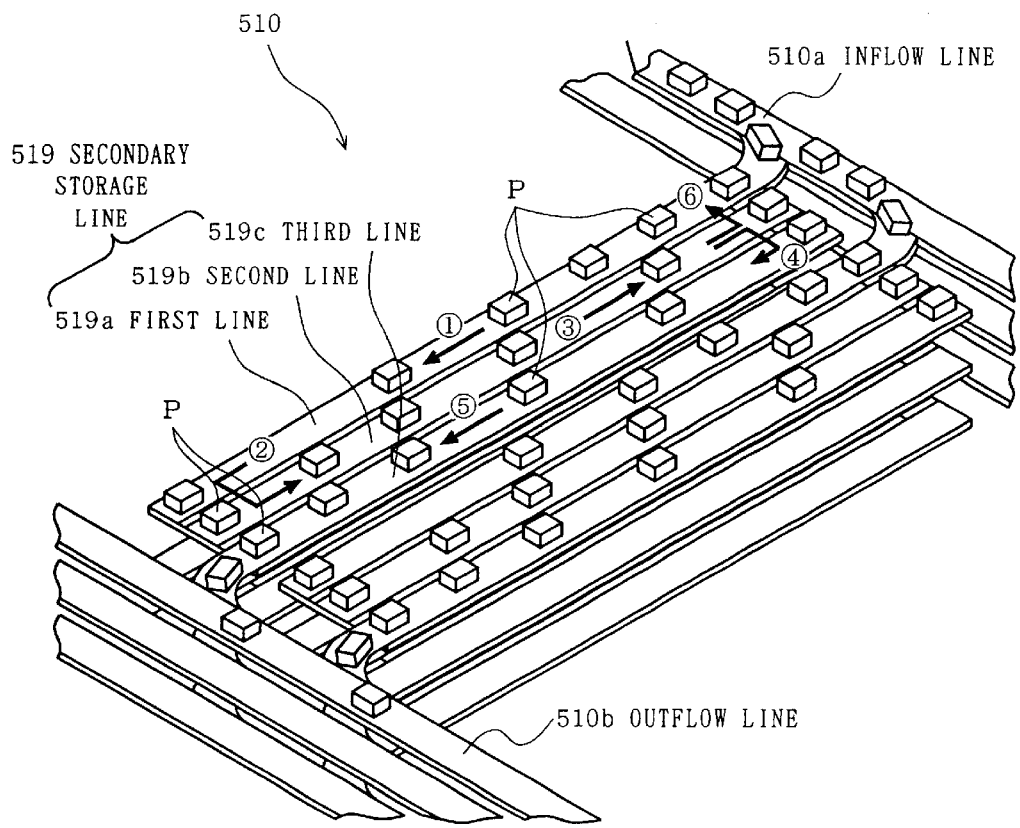
F I G . 4 7 A
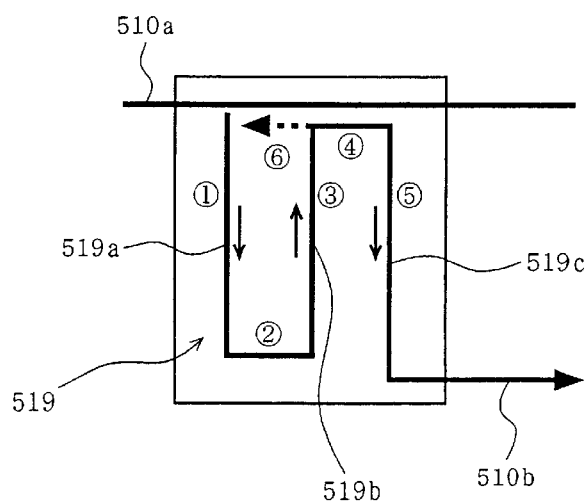
F I G . 4 7 B

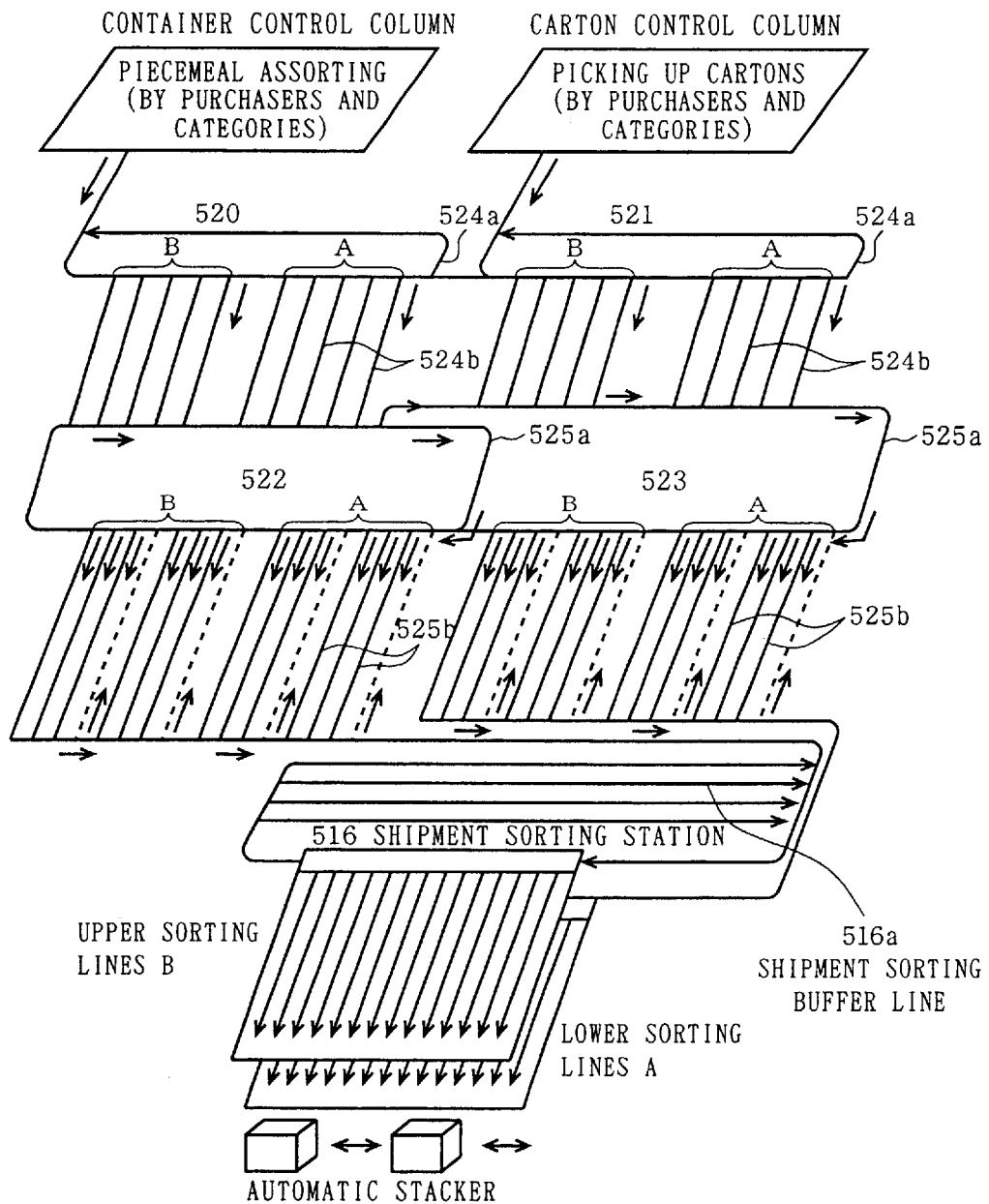
F I G. 4 8

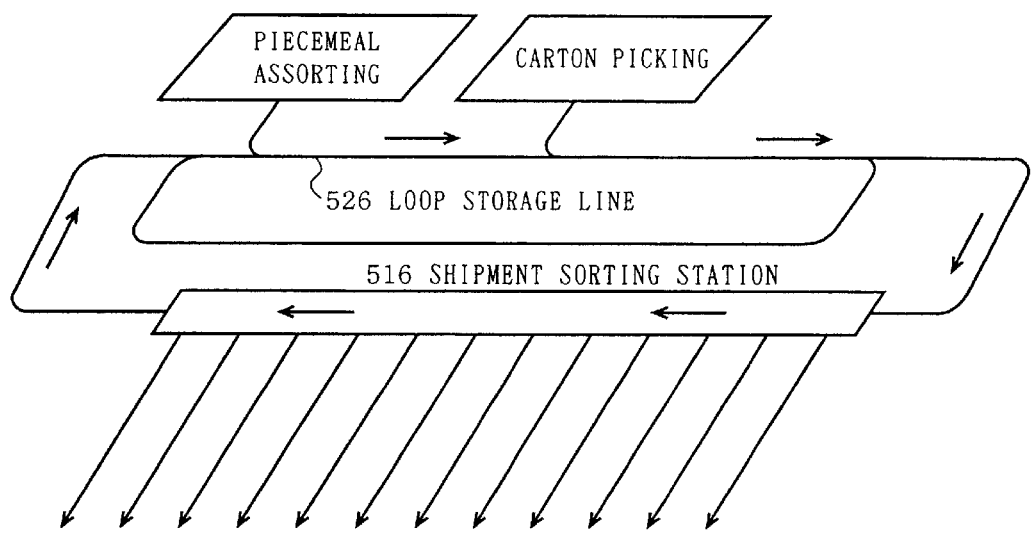
F I G. 4 9
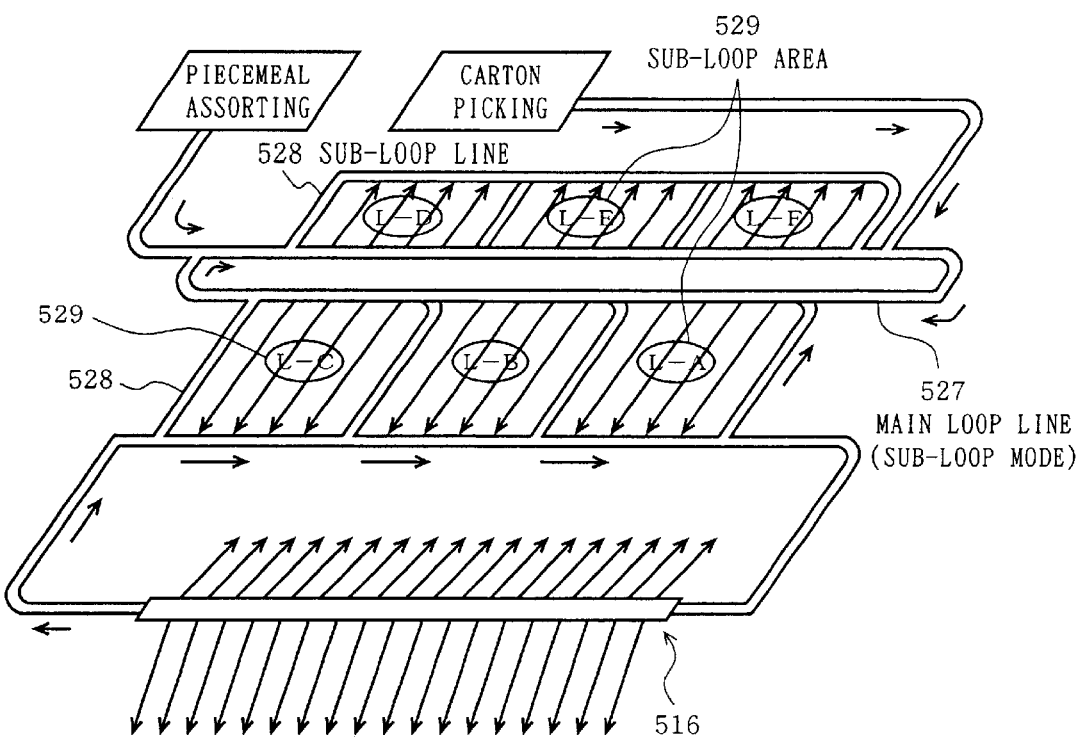
F I G. 5 0

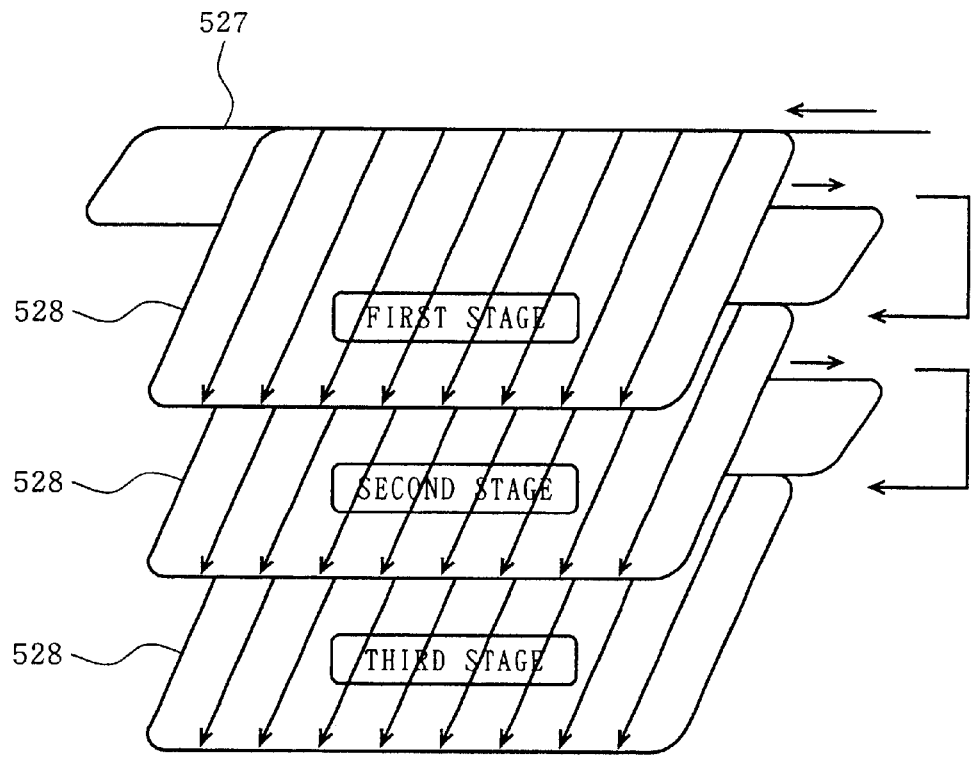
F I G. 5 1

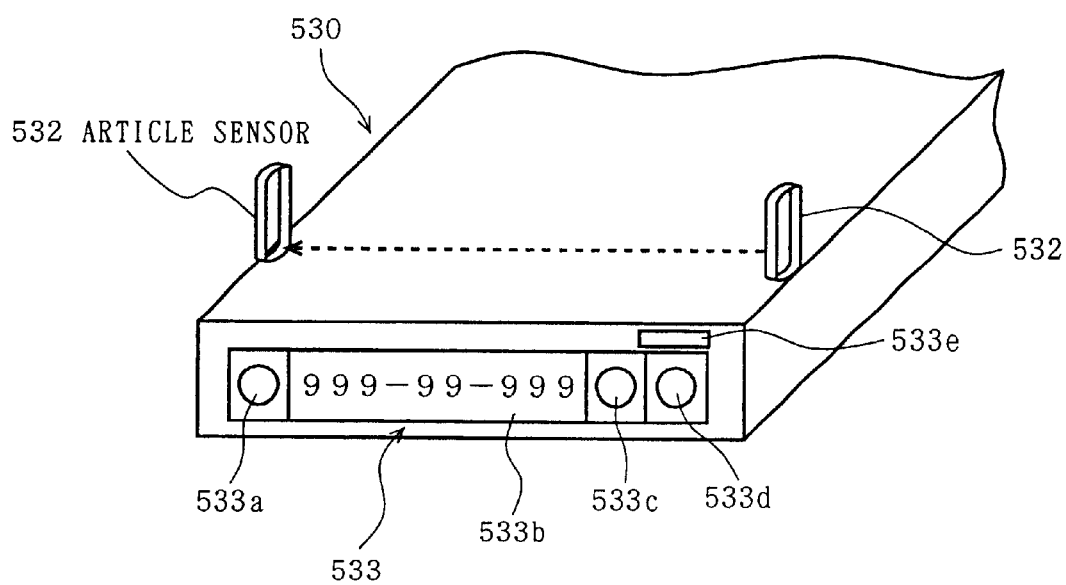
F I G. 5 3

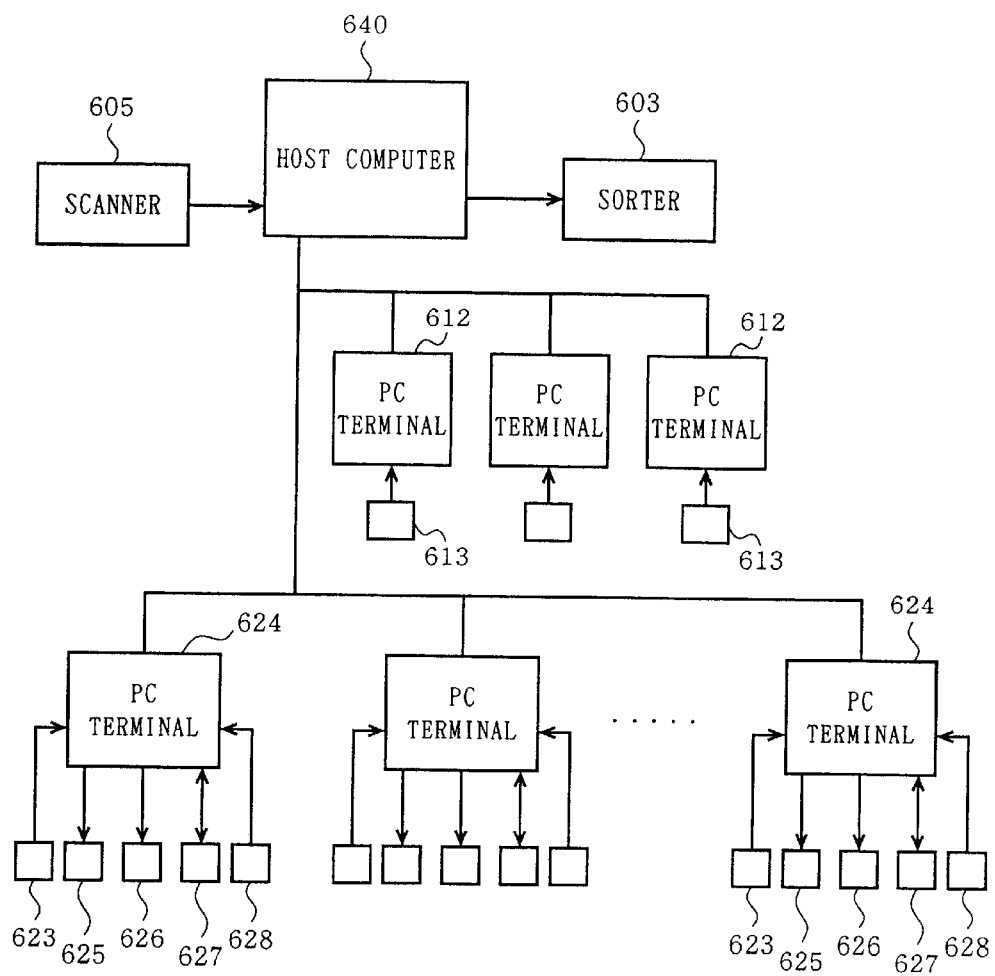
F I G. 5 5

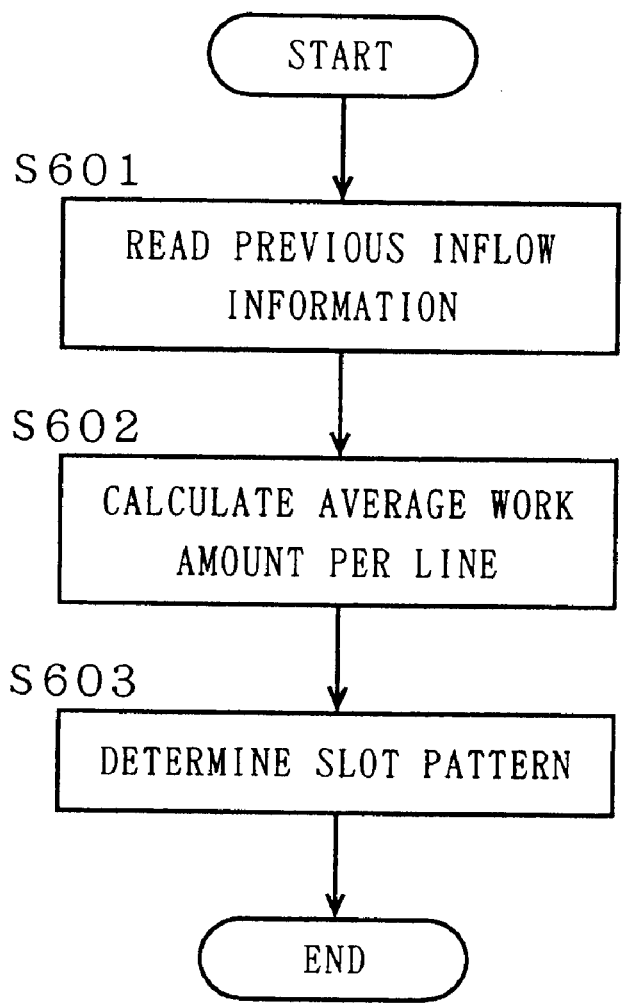
F I G. 5 9

FIG. 60A

| A1 | A3 | A5 | A7 | A9 | A11 | B1 | B2 | B4 | B6 | B8 | B10 |
|----|----|----|----|----|----|----|----|----|----|----|----|
| A2 | A4 | A6 | A8 | A10 | A12 |  | B3 | B5 | B7 | B9 | B11 |

FIG. 60B — L1

| ST1/LC1 | ST1/LC3 | ST1/LC5 | ST1/LC7 | VACANT | VACANT |  | ST1/LC9 | ST1/LC11 | ST1/LC13 | VACANT | VACANT |
|---|---|---|---|---|---|---|---|---|---|---|---|
| ST1/LC2 | ST1/LC4 | ST1/LC6 | VACANT | VACANT | VACANT | ST1/LC8 | ST1/LC10 | ST1/LC12 | ST1/LC14 | VACANT | VACANT |

FIG. 60C — L2

| ST1/LC15 | ST1/LC17 | ST1/LC19 | ST2/LC1 | VACANT | VACANT |  | ST2/LC3 | ST2/LC5 | ST2/LC7 | VACANT | VACANT |
|---|---|---|---|---|---|---|---|---|---|---|---|
| ST1/LC16 | ST1/LC18 | ST1/LC20 | VACANT | VACANT | VACANT | ST2/LC2 | ST2/LC4 | ST2/LC6 | ST2/LC8 | VACANT | VACANT |

FIG. 60D — L3

| ST2/LC9 | ST2/LC11 | ST2/LC13 | ST2/LC15 | VACANT | VACANT |  | ST2/LC17 | ST3/LC1 | ST3/LC3 | VACANT | VACANT |
|---|---|---|---|---|---|---|---|---|---|---|---|
| ST2/LC10 | ST2/LC12 | ST2/LC14 | VACANT | VACANT | VACANT | ST2/LC16 | ST2/LC18 | ST3/LC2 | ST3/LC4 | VACANT | VACANT |

FIG. 60E — L4

| ST3/LC5 | ST3/LC7 | ST4/LC1 | ST4/LC3 | VACANT | VACANT |  | ST4/LC5 | ST4/LC7 | ST4/LC9 | VACANT | VACANT |
|---|---|---|---|---|---|---|---|---|---|---|---|
| ST3/LC6 | ST3/LC8 | ST4/LC2 | VACANT | VACANT | VACANT | ST4/LC4 | ST4/LC6 | ST4/LC8 | ST4/LC10 | VACANT | VACANT |

FIG.61A  L5

| ST1/ | ST1/ | ST2/ | ST3/ | ST3/ | | ST2/ | ST2/ | ST2/ | | ST4/ |
|---|---|---|---|---|---|---|---|---|---|---|
| LC15 | LC19 | LC1 | LC5 | LC7 | | LC3 | LC5 | LC7 | VACANT | LC5 |
| ST1/ | ST1/ | | ST3/ | ST3/ | ST2/ | ST2/ | ST2/ | ST2/ | ST4/ | ST4/ |
| LC16 | LC18 | VACANT | LC6 | LC8 | LC2 | LC4 | LC6 | LC8 | LC4 | LC6 |

FIG.61B  L6

| ST2/ | ST2/ | ST2/ | | | ST2/ | ST3/ | ST3/ | | |
|---|---|---|---|---|---|---|---|---|---|
| LC9 | LC11 | LC15 | VACANT | VACANT | LC17 | LC1 | LC3 | VACANT | VACANT |
| ST2/ | ST2/ | | | | ST2/ | ST3/ | ST3/ | | |
| LC10 | LC12 | VACANT | VACANT | VACANT | LC18 | LC2 | LC4 | VACANT | VACANT |
| ST2/ | ST2/ | | | | ST2/ | | | | |
| | LC13 | | | | LC16 | | | | |
| ST2/ | | | | | | | | | |
| | LC14 | | | | | | | | |

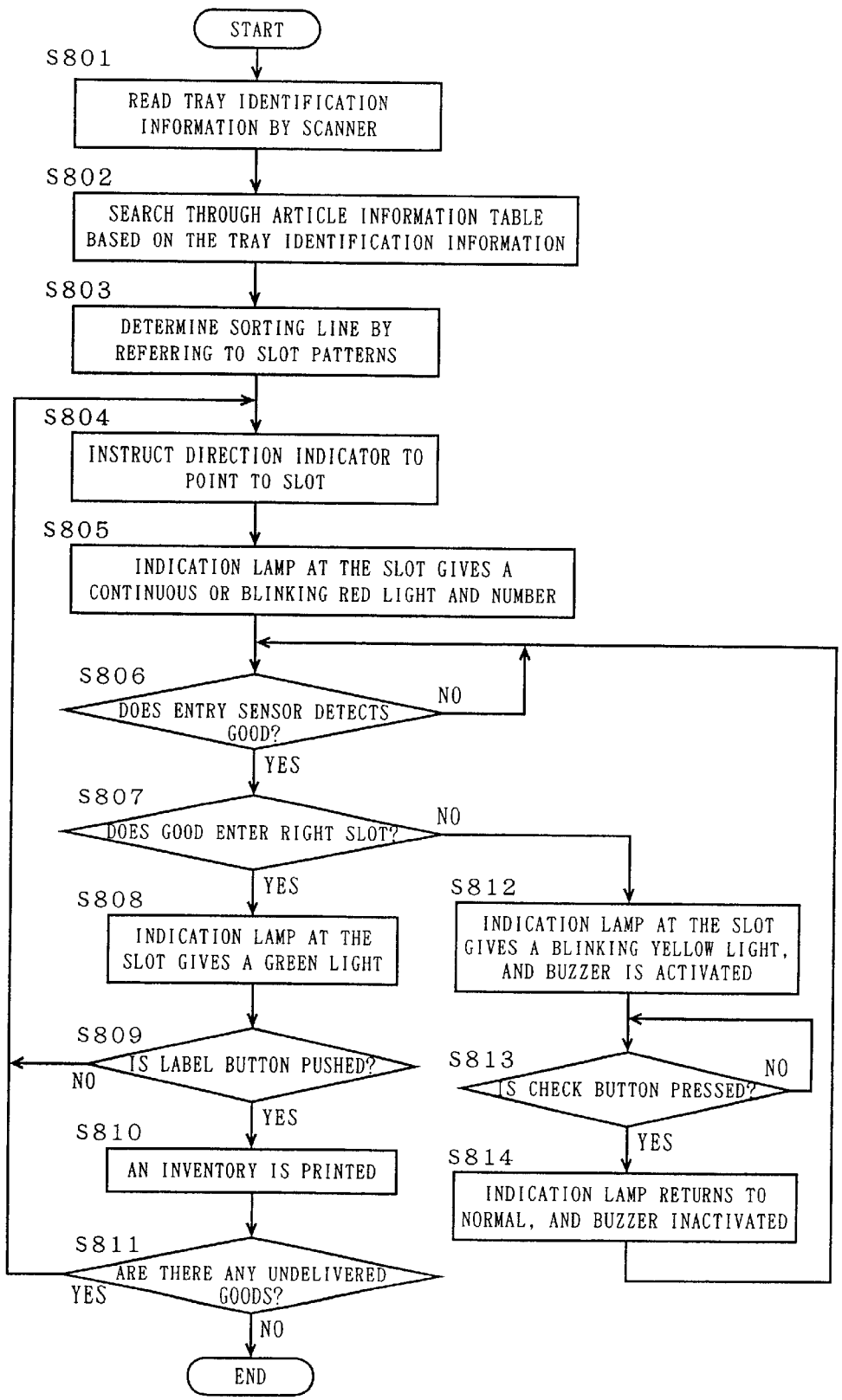
F I G. 6 3

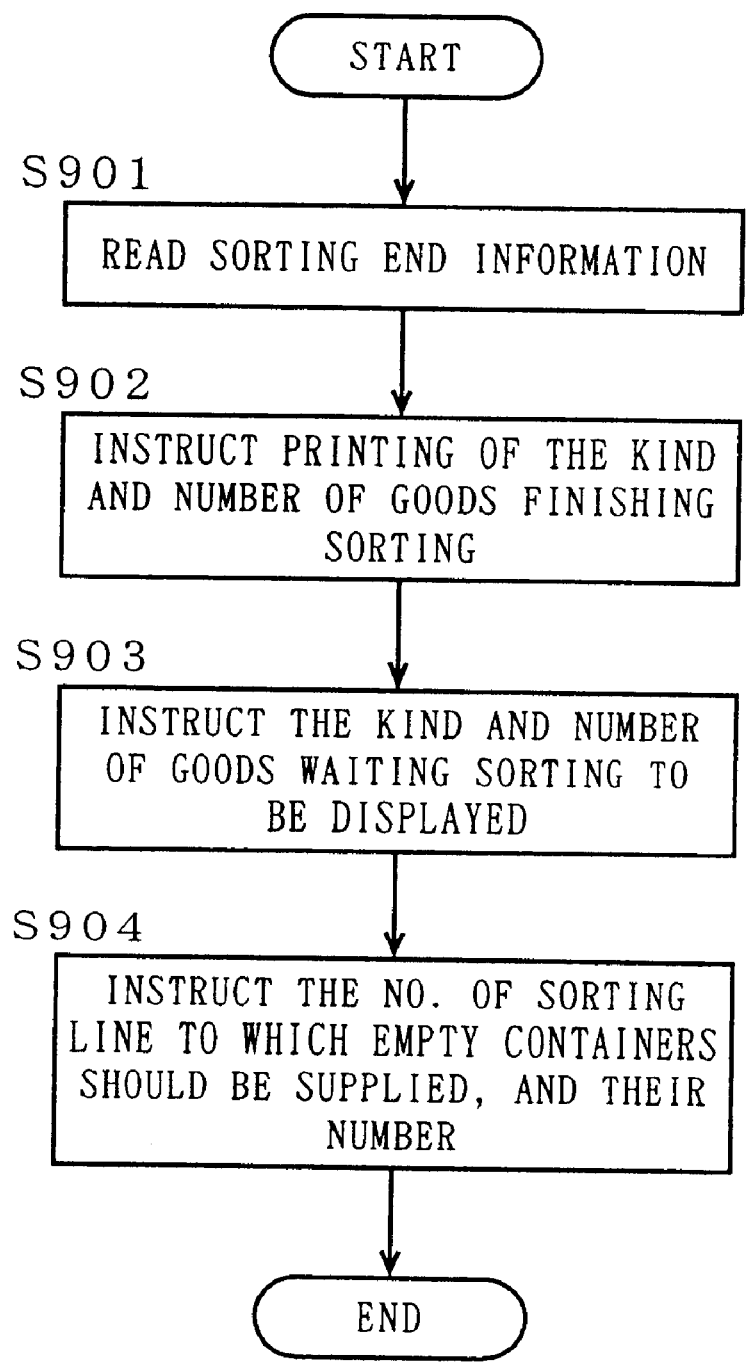
F I G. 6 4

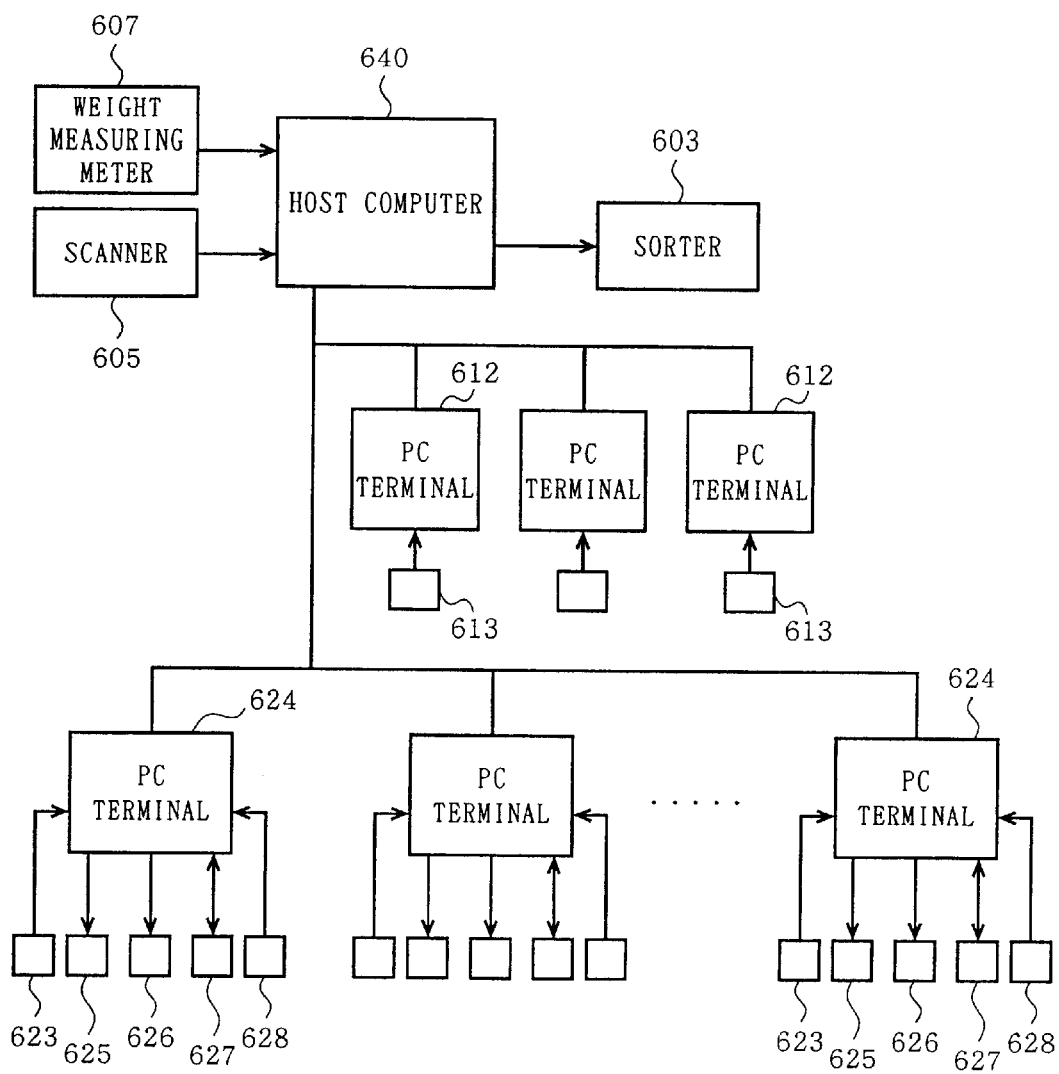
F I G. 6 6

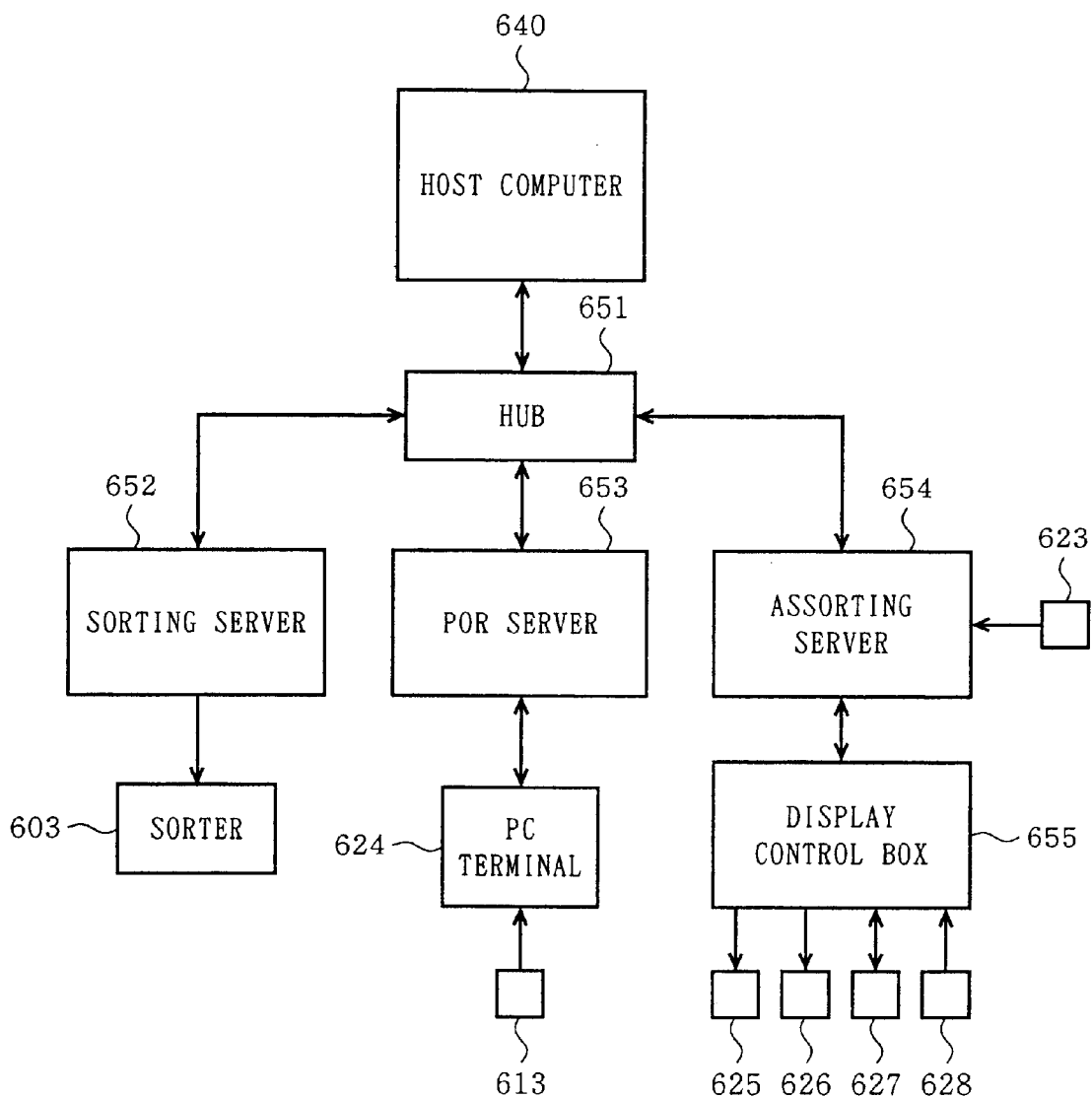
F I G. 70

SYSTEM FOR SORTING COMMERCIAL ARTICLES AND METHOD THEREFOR

This application is a Division of application Ser. No. 09/793,787, filed on Feb. 26, 2001.

BACKGROUND OF THE INVENTION

1. Field of the Invention

The present invention relates to a system for sorting commercial articles and a method therefor, particularly to a system suitable for use at a distribution center which sorts a wide variety of commercial articles by small amounts according to their destinations, and a method therefor.

2. Description of the Related Art

Conventionally, commercial goods to be distributed to retailers such as super-markets or convenience stores are delivered, for example, by trucks from a center serving as a base to and from which commercial goods are concentrated and dispersed. Commercial goods to be distributed to retailers are collected by the vendors (wholesalers) of those goods and then sent by them to a distribution center where those goods are sorted by ordered amounts according to the retailers to which they are to be sent, and the goods thus sorted by ordered amounts are distributed according to their destinations.

Commercial goods sent by vendors to a distribution center (transportation center) are divided into two classes at an entry dock according to whether they should be stored or passed. Some commercial goods are stored in a storage area by palettes, cartons, pieces, or boluses.

For storage, for example, an automated storage/retrieval system (AS/RS) or a palette rack coupled with the use of a forklift is used. The AS/RS includes storage racks with pick-up conveyors between the rows of racks, and stacking cranes. Commercial goods (existing as units such as cartons or boluses) on palettes placed on a rack are taken out as appropriate by a hauler according to shipment information, and transferred onto a conveyor for shipment.

Commercial goods thus picked are sent to a preparatory sorting area where, if goods exist as pieces or boluses, they are packed into containers or cartons. The containers and cartons are then transferred to a sorting area for shipment where they are sorted according to the purchasers to which they are to be sent. Then, they are stacked on cage carriers, and transferred to trucks for shipment.

Sorting is performed as follows. Goods sent by providers are given labels printing data necessary for sorting such as the kind, number, purchaser, etc. of the goods. Goods with labels attached are placed on trays and carried through a conveyor to a sorting area.

Next, scanners placed at respective sorting blocks and connected to a controller read the data, and distribute required amounts of goods to the slots of nominated blocks according to the instructions from the controller. Repetition of this operation results in the distribution of goods to the sorting blocks according to the orders from purchasers.

During this operation, barcodes printed on the label of each good are read by the scanner. On the label two kinds of barcode are printed: one includes information necessary for managing the good, and the other information necessary for distributing the good. Thus, when goods are received, a scanner placed at an inlet reads the barcode necessary for good management to check the contents of the goods, and the goods are guided from there to a line. Then, another scanner reads the barcode for good distribution.

The barcode is prepared based on JAN (Japan Article Number) or ITF (Interleaved Two of Five) which deals with the information related with commercial goods and their cases.

The goods thus sorted are carried separately, and required amounts of them are transferred into containers arranged along conveyor routes according to destinations. Cart drivers drive carts carrying containers along circuit routes connecting junction areas where the containers are classified according to their destinations, or transfer disjoined goods on their carts into containers.

At a distribution center, goods are classified according to the purchasers and categories, and to the aisles and racks of the purchasers' shops where they are to be displayed for sale, and separated according to the classification. If required amounts of them are packed in cartons (made of paper), the goods are handled as cartons. If goods exist as disjoined pieces, they are divided by required amounts, and the required amounts are put into foldable plastic containers in the order of arrival. The cartons and containers are then loaded on cargo carriers having casters such as carts or wheeled cages, or on carrying means such as dolleys or handcarts.

Then, they are sent to shipment lines, transferred to trucks, and distributed to individual shops for sale. The goods thus distributed to individual shops may be directly transferred to the racks of the shops, to be arranged there for sale, or may be temporarily stored in the back rooms of the shops.

At a distribution center, commercial goods are loaded on carts or wheeled cages, with no due attention being paid to the characteristics of the goods, the state of their packages, the state of their loading, or, if the goods are classified to the same category, the racks of the shop to which they will be displayed for sale, and the order of display.

Thus, during transference, a plastic container may be placed on a cardboard box; a heavy object may be placed above a light object; a good to be displayed on a rack may coexist with another good to be stored in a storeroom; or a good to be displayed on a rack may coexist with another good to be displayed on a different rack.

If what is described above happens, the cardboard carton or the light object might collapse, or the good might be wrongly stored or placed on a wrong rack for display, and, for correcting the error, it might be required to make repeated to-and-fro movements between the rack and the storage room, or between the different racks. To avoid this, the shop manager, when he receives goods in, for example, a wheeled cage, must take out them all from the wheeled cage, and reclassify them according to the characteristics of the goods, their packages, and the racks on which they are to be displayed for sale.

Of those goods, some must be placed on racks for display, others in a cooled display case, and still others in the storeroom. However, it may take long to distribute them all to proper places, and goods requiring cooled or frozen storage to keep freshness may be left without receiving no proper care for temperature management.

SUMMARY OF THE INVENTION

The object of this invention is to provide a system for classifying commercial articles whereby it is possible to improve efficiency when it is required to classify a wide variety of goods by small amounts according to the orders from purchasers, and a method therefor.

To achieve the above object, the system for classifying commercial goods according to this invention comprises a plurality of sorting blocks with respective entry slots through which the blocks receive goods according to their destinations; a reading means for reading data necessary for the classification of goods, provided to incoming single or grouped goods; and a controller which, based on the data necessary for the classification of goods read by the reading means, nominates an entry slot for a given good, wherein, when a slot is nominated by the controller for a given good, a direction indicator indicates the direction towards the slot.

With the system of this invention being configured as above, the direction indicator placed on one site of a sorting block indicates, for a given good, the direction towards the nominated slot through which the good is to be placed in a block. This arrangement makes it possible for the hauler to immediately put a good into a nominated slot without looking around at the sorting blocks at large, which will lead to the improvement of work efficiency. Moreover, because this will moderate the burden imposed on the hauler, the number of wrongly hauled goods would be greatly reduced.

The term "sorting block" used here refers to a range of slots one hauler can cover. The controller is not limited to a terminal of a host computer which controls the sorting system at large, but may be a terminal to independently control a single sorting block.

The direction indicator generally may take the form of a liquid crystal display where the direction towards a nominated slot is indicated by an arrow, but is not limited to any specific display, provided that the direction towards a nominated slot can be signaled.

To achieve the above object, the good sorting system according to this invention is further provided with an inflow sensor to detect the inflow of a good through a slot; and an alarming means which alarms as soon as it finds that, for a given good, its entry slot identified by an inflow sensor is different from that nominated by the controller.

With the good sorting system of this invention being configured as above, if a good is passed through a wrong slot, it is recognized by the sensor and then the alarming means is activated to generate a buzzing sound or a blinking light to alarm. This arrangement will make it possible to greatly reduce the number of wrongly hauled goods.

The inflow sensor may include, for example, a commercially available infra-red beam sensor. If an infra-red beam sensor is used for a slot, and a good is hauled into the slot, the good or a part of body of the hauler interrupts the infra-red beam, the interruption signal is transmitted to a controller which recognizes that a good is passed through the slot.

Alternatively, a weight sensor may be used that detects an additional weight when a good is hauled into a slot. The mode and placement of the sensor is not limited to any specific ones.

To achieve the above object, a good managing system according to this invention comprises an inflow good managing system provided with an input feeding means through which providers can enter their name when putting goods into the system; a means for reading information indicating the property of goods and attached to the goods; a means for storing in memory a list of good data carrying the name of providers, the property of goods scheduled to be received for the day and their numbers; and a control means based on inflow data which compares the name of providers fed through the input feeding means with the list of good data, and writes the number of actually received goods into the memory of the list storing means.

The good managing system of this invention being configured as above recognizes, based on the output from the good data reading means, the name of the manufacturer of a good, the property of the good, and the number of its scheduled input, and, in addition, the name of the provider, because the provider can feed his name through the input feeding means.

This arrangement will make it possible to efficiently manage inflow goods according to the name of providers, simply dependent on identification codes generally attached to goods such as a JAN code or ITF code.

To achieve the above object, a good delivery system according to this invention comprises a movable loader consisting of a rack for storing goods, a conveyor placed in parallel with the rack, and a platform movable along the conveyor, thereby facilitating the transfer of goods from the rack to the conveyor or vice versa.

With the good delivery system of this invention being configured as above, the hauler can simply haul a good from a rack to a platform in order to transfer it to a conveyor, and readily move the platform to a rack which stores a desired good. This arrangement will reduce labor required for hauling, thereby improving the efficiency of hauling. Further, this arrangement will improve the precision of hauling because hauling is achieved based on the signal from a terminal sensor.

To achieve the above object, a sorting-for-shipment system according to this invention carries unit cases containing goods to be shipped through a conveyor to a sorting-for-shipment area, sorting there the goods according to the orders from purchasers, and transferring the sorted goods by carts for shipment, wherein a buffer storage line to receive unit cases carried from an inflow area is provided to the conveyor leading to the sorting-for-shipment area.

With the sorting-for-shipment system of this invention being configured as above, it is possible to store containers and cartons sent from a storage area or from an inflow area at the buffer storage line, and thus to selectively transport the containers and cartons that meet given stacking requirements in an orderly manner.

This arrangement will make it possible to stack goods in the same category in different wheeled cages according to the location of the racks on which they will be displayed for sale, and the state and weight of their cases.

To achieve the above object, a sorting method according to this invention consists of, to sort goods on a delivery line according to specified requirements, returning to an upstream line the goods that do not meet the requirements, and, if they meet the requirements, pass them in order through a delivery line for subsequent processes.

With the sorting method of this invention being configured as above, goods on a delivery line are sorted according to specified requirements, and, if they are found not to meet the requirements, they are returned to an upstream line, while if they are found to meet the requirements, they are passed in order through a delivery line for subsequent processes. This arrangement will make it possible to selectively deliver goods that meet specified requirements, and thus to transfer them into trucks according to the property of goods, and the state of package, thereby obviating the need for reclassification at the purchasers' shops.

To achieve the above object, a good sorting system according to this invention comprises a first conveyor to carry trays bearing goods to be sorted; a second conveyor branching off from the first conveyor; and a plurality of slots at which containers are arranged to receive goods according to their attributes for sorting, to which are further provided the plurality of sorting lines consisting of racks placed opposite to the second conveyor; a sorter to guide each tray carried through the first conveyor to one of the sorting lines; a means for reading the identification data of each tray passing through the first conveyor; a memory means to store a good information table by which to compare the data of goods contained in the tray with the identification data of that tray just read, and the pattern of slots arranged at individual sorting lines; a control means to control the sorter, based on the identification data of the tray and the good information table both stored in the memory means, such that the tray may be guided to appropriate one among the plurality of sorting lines; and direction indicator means implemented to respective blocks of the racks, so as to indicate the No. of the slot and its direction.

With the good sorting system of this invention being configured as above, trays bearing goods to be sorted are carried through the first conveyor; the tray is guided by the sorter to one of the sorting lines with a second conveyor running in parallel; a good information table by which to compare the data of goods contained in the tray with the identification data of that tray just read, and the pattern of slots arranged at individual sorting lines are stored in the memory means; and the sorter is controlled by the control means, based on the identification data of the tray and the good information table both stored in the memory means, such that the tray may be guided to appropriate one among the plurality of sorting lines. Then the direction indicator means implemented to respective blocks of the racks indicate the No. of the slot and its direction.

This arrangement will improve the efficiency of work which requires a wide variety of goods to be sorted by small amounts according to the orders from their purchasers.

BRIEF DESCRIPTION OF THE DRAWINGS

FIG. 1 is a frontal view of a part of an article sorting system representing a first embodiment according to this invention.

FIG. 2 is a schematic drawing for illustrating how goods are conveyed to a sorting rack of FIG. 1.

FIG. 3 is a schematic diagram for illustrating how a direction indicator provided to each sorting block indicates the direction towards a nominated slot.

FIG. 4 is a diagram for illustrating how the entry indicator provided at each slot of FIG. 1 signals the slot to receive goods, and the number of goods (No. 1).

FIG. 5 is a diagram for illustrating how the entry indicator provided at each slot of FIG. 1 signals the slot to receive goods, and the number of goods (No. 2).

FIG. 6 is a diagram for illustrating how the entry indicator provided at each slot of FIG. 1 signals the slot to receive goods, and the number of goods (No. 3).

FIG. 9 is a block diagram for illustrating the composition of a control system to control the system depicted in FIG. 8.

FIG. 13 is a flowchart for illustrating the processing practiced by a sorter control terminal.

FIG. 17 shows a basic composition of a movable loader attached to an automated storage/retrieval system of this invention provided to a distribution center: FIG. 17A is a general perspective view; FIG. 17B a partial perspective view; and FIG. 17C a sample display of a display device.

FIG. 18 is a perspective view of the movable loader of FIG. 17 for illustrating its detailed construction.

FIG. 19 is a perspective view of the movable loader of FIG. 18 for illustrating its constitutive elements.

FIG. 20 gives the perspective and side views of a ladder or a constitutive element of the movable loader of FIG. 18.

FIG. 21 is a perspective view of a part of a fall prevention mechanism of the movable loader of FIG. 18.

FIG. 22 shows the inflow steps of a distribution center to which this invention is applied: FIG. 22A illustrates how a transporter feeds input; and FIG. 22B illustrates the operation taken at an inflow line, and a label for inflow goods.

FIG. 23 illustrates steps necessary for carrying goods from an inflow line to an automated storage/retrieval system of a distribution center to which this invention is applied.

FIG. 25 is a block diagram of a distribution center to which this invention is applied, divided by functions.

FIG. 27 is a block diagram for explaining the definitions of a shop group and SEQing group to which goods are assigned at the initial phase of inflow as depicted in FIG. 26.

FIG. 29 is a flowchart for illustrating the generation of data necessary for controlling good handling in a distribution center as depicted in FIG. 25, and the control steps based on the data.

FIG. 33 is a flat view of one example of a buffer control line incorporated in the shipment sorting system of this invention.

FIG. 34 is a schematic flat view of a buffer control line based on a loop used in the shipment sorting system of this invention.

FIG. 37 is a block diagram of a variant of the sub-loop line areas as depicted in FIG. 35 in which different sub-loop areas treat respective requirements.

FIG. 39 is a schematic flat view of a buffer control line comprising plural straight storage lines based on a midway return mode of the shipment sorting system of this invention.

FIG. 44 illustrates the outline of the inflow guide line of FIG. 43: FIG. 44A is a perspective view; and FIG. 44B a schematic diagram.

FIG. 45 is a perspective view for illustrating the outline of the labeling line of FIG. 43.

FIG. 47 illustrates the outline of the secondary sorting station of FIG. 43: FIG. 47A is a perspective view and FIG. 47B a schematic diagram.

FIG. 48 is a diagram for illustrating the operation of an exemplary buffer control.

FIG. 49 illustrates the concept of another buffer control based on a loop mode.

FIG. 50 illustrates the concept of a still other buffer control based on a main loop/sub-loop mode.

FIG. 51 illustrates the concept of a still other buffer control based on a multi-stage mode.

FIG. 53 is a perspective view of the exit end of a shipment shoot line of FIG. 52.

FIG. 55 is a block diagram for illustrating the composition of the control system of the article sorting system of FIG. 54.

FIG. 59 is a flowchart for illustrating the steps necessary for determining the pattern of slots of FIG. 56.

FIG. 60 illustrates an exemplary pattern of slots (No. 1).

FIG. 61 illustrates an exemplary pattern of slots (No. 2).

FIG. 63 is a flowchart for illustrating the control steps taken by a computer terminal provided to each sorting line.

FIG. 64 is a flowchart for illustrating the steps taken by a host computer for monitoring the progress of the work.

FIG. 66 is a block diagram to illustrate the composition of the control system of the article sorting system of FIG. 65.

FIG. 70 is a block diagram for illustrating another composition of the control system of an article sorting system.

DESCRIPTION OF THE PREFERRED EMBODIMENTS

Figure 7:
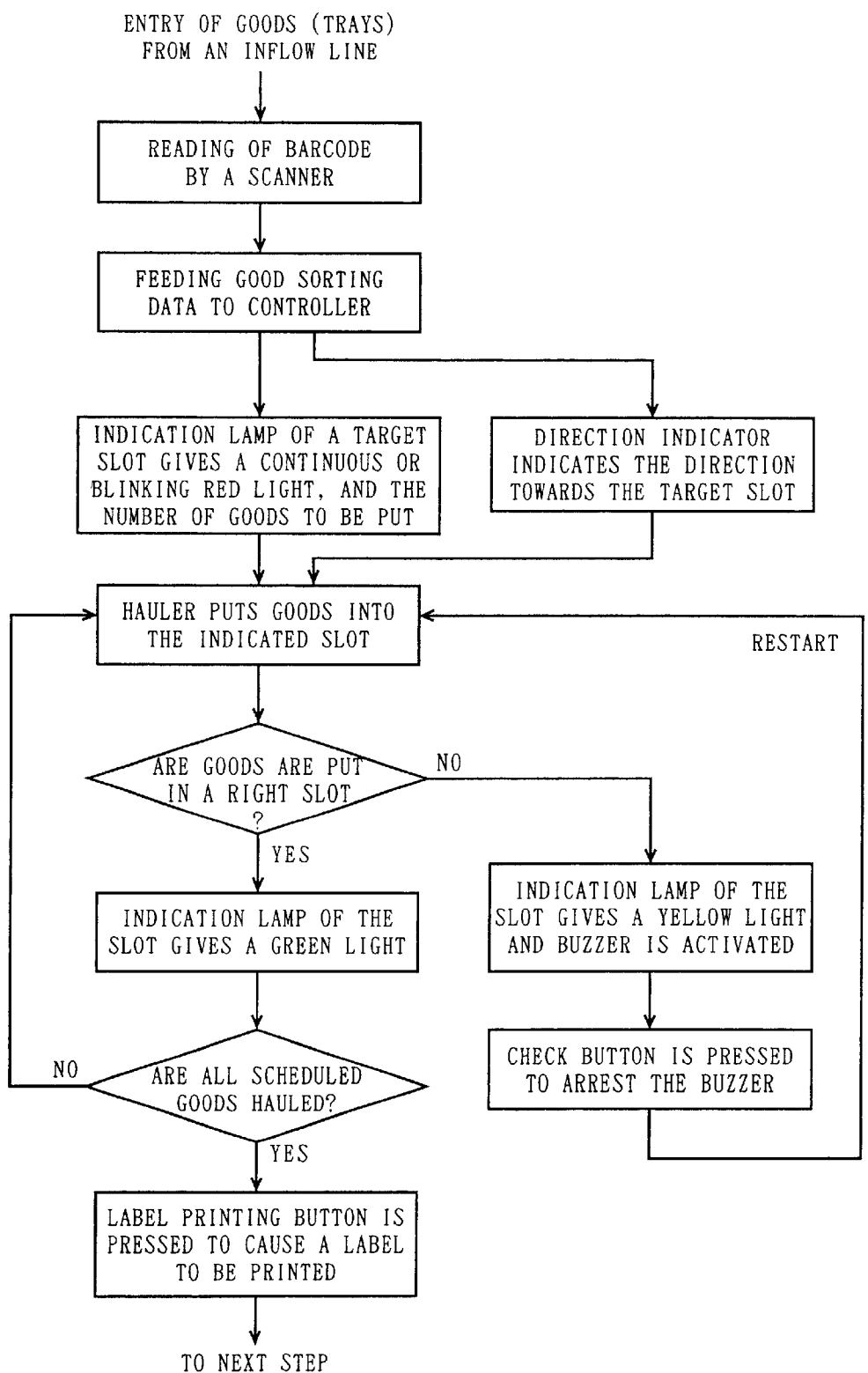
FIG. 7 is a flowchart indicating the steps taken by an article sorting system containing a sorting rack as shown in FIG. 1.

The embodiments of this invention will be described below with reference to the attached figures.

First Embodiment

FIG. 1 is a frontal view of a part of a system for sorting commercial goods representing a first embodiment according to this invention. FIG. 1 shows a part of a sorting rack 101, or a component of a good sorting system installed at a sorting area. In this embodiment, a rack 101 with two layers includes eleven foldable resin-made containers 103 on the upper layer and twelve same containers on the lower layer. Thus, the containers total twenty-three each of which is provided with an entry slot 102.

Twelve entry slots 102 on the left side from the center constitutes a block assigned to one sorter while the eleven entry slots on the right side including one at the center constitutes another block assigned to another sorter. Groups of goods delivered are handled by the two sorters in a tandem manner. On the lower layer of the rack there is fixed a barcode scanner 106.

FIG. 2 is a schematic drawing for illustrating how goods are delivered to a sorting rack. As shown in the figure, a group of goods 105 are transferred from a distribution line through a belt conveyor 104 to a sorting rack 101. A barcode scanner 106 reads the data necessary for sorting from the good 105 thus transferred.

In this embodiment, plural goods the same in kind are transferred while being put in a tray, and the data for sorting printed on a label attached to the tray is read, and an entry slot determined appropriately according to the number of goods, and their destination is transmitted to a controller 107 provided at the center of the upper layer (see FIG. 1).

Each entry slot 102 has an entry indicator 109 (see FIG. 1) at its upper or lower edge. The controller 107 controls by way of a control signal the entry indicators 109 such that their indication lamps are switched on and their number indicators give the number of goods to be received. Thus, the entry indicator 109 of a slot which is to receive goods indicates the slot 102, and the number of goods to receive through the slot 102.

FIG. 3 is a schematic diagram for illustrating how a direction indicator provided to each sorting block indicates a direction towards a nominated entry. As shown in the figure, to each of the two blocks assigned to the left and right sides of the rack, a direction indicator 108 is mounted on the partition of the two layers of rack 101.

The direction indicator 108 indicates by an arrow the location of a slot 102 which is nominated by the controller 107 (see FIG. 1). The controller 107 can control the direction indicator 108 in conjunction with the indication lamp of the relevant entry indicator.

FIGS. 4 to 6 are schematic diagrams for illustrating how the entry indicator provided to each slot indicates the location of the slot to receive goods, and the number of goods.

In FIG. 4, the indication lamp 110 gives a red light while the number indicator 112 gives a number (six in this particular example). Incidentally, a tray usually carries plural goods.

Therefore, if goods transferred at the same time must be delivered to different slots 102, the indication lamps of the relevant slots 102 give red lights in a sequential order to instruct the sorter the order of delivery.

On both sides of each slot 102 of rack 101, there is provided a pair of infra-red beam (IF) sensor 114 (see FIG. 1). This beam sensor 114 detects the entry of goods through the slot into the container, or passage of the operator's hand through the slot. The detection signal is transmitted to the controller 107.

If goods are properly entered, the controller 107 delivers a control signal to cause the indication lamp 110 to give a green light as shown in FIG. 5.

If a good is improperly entered, the controller 107 delivers a control signal to cause the indication lamp 110 to give a blinking yellow light, as well as to activate a buzzer (not illustrated here) to give an alarming sound as shown in FIG. 6. Then, the sorter pushes a check button 111 beside the indication lamp 110 to stop the blinking of the indication lamp 110 and the buzzer, and delivers the good into a right slot.

FIG. 7 is a flowchart indicating the steps taken by a system for distributing goods to a sorting rack as shown in FIG. 1. As shown in FIG. 7, when the sorter has completely sorted goods assigned to his block, he pushes a label printing button 113 (see FIG. 4) on the right end of entry indicator 109, thereby causing a label printer 115 (see FIG. 1) below the controller 107 to print a label printing an inventory which will be sent to the purchaser together with the goods.

Printing of the inventory label is made only after all the goods have been delivered through a slot 102 into a container 103. Thus, as long as goods remain that are to be delivered into the slot, sorting of goods continues.

With the system for distributing commercial goods according to this invention, a direction indicator provided to each sorting block indicates the location of a slot to receive next goods, in contrast with the conventional system where an entry indicator is provided at each slot, and thus the sorter must scan the entire rack surface to spot an indicated slot. This arrangement allows the sorter to easily spot an activated slot and to timely deliver goods to the slot, which will improve the efficiency of sorting works.

If a burden imposed on the sorter is reduced, it will greatly reduce the likeliness of goods being delivered into wrong containers.

Moreover, this system alarms the sorter by emitting a buzzing sound or by causing a lamp of an alarming color to blink, if a sensor detects a good is delivered to a wrong slot. Through this arrangement, it becomes possible to greatly reduce the incidence of wrongly delivered goods.

Second Embodiment

Figure 8:
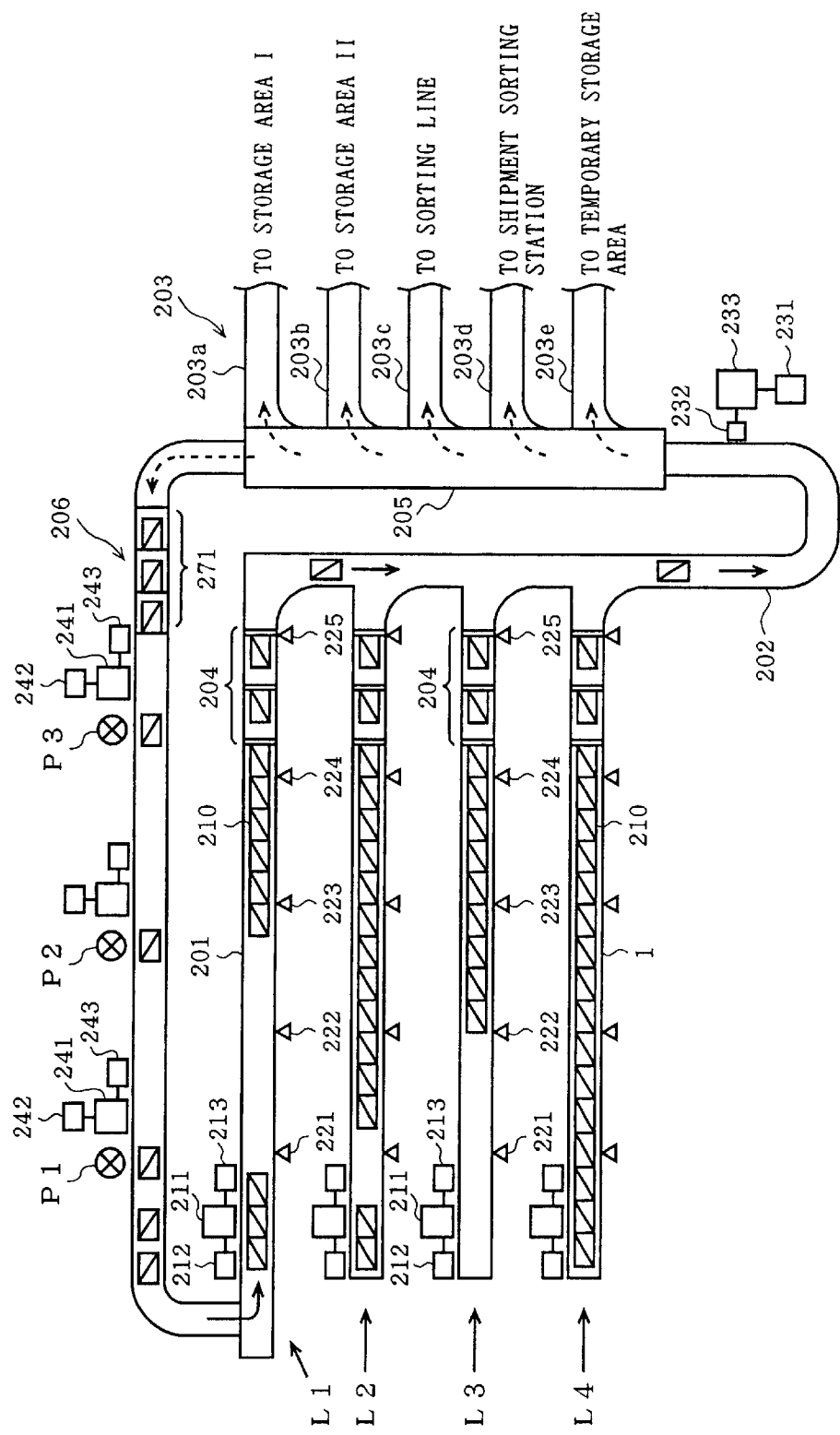
FIG. 8 is a diagram for illustrating the composition of an inflow management system representing a second embodiment of this invention.

FIG. 8 is a plan view of an inflow management system representing a second embodiment of this invention, to illustrate its composition. As shown in the figure, this system comprises the following: four inflow lines L1 to L4 on which providers put goods; a first conveyor 202 to receive goods from the inflow lines L1 to L4 and to carry them to a next step; a sorter 205 to sort goods transported via conveyor 202 according to their destinations; second conveyors 203 provided to respective destinations; and a line 206 for sticking inflow labels to inflow goods.

Each of lines L1 to L4 is provided with an inflow conveyor 201, a computer terminal (PC terminal hereinafter) 211 to manage inflow goods, a scanner 212 to read a barcode printed on the label of each inflow good encoded according to JAN, ITF or SCM (shipping carton marking), a label printing device 213 to print the data informing the purchaser and the previous sale of each good on a label, article sensors 221 to 225 to detect whether any article is present on conveyor 201 or not, and a feeder 204 to transfer inflow goods from the inflow conveyor 201 to the first conveyor 202.

In the figure, a commercial good 210 is in the form of a unit of goods (a unit for management), such as a cardboard box or a container containing one or more goods (to be simply referred to as "commercial good or good 210" hereinafter).

The first conveyor 202 has midway a scanner 232 to read the barcode on the label of each good carried to the conveyor 202, a sorter controller 233 to control the sorter 205 according to the information read from the barcode, and a sorter control terminal 231 to control the sorter controller 233.

To the sorter 205 are connected the following: a conveyor 203a moving towards a storage area I; a conveyor 203b moving towards a storage area II; a conveyor 203c moving towards a line where goods are sorted by pieces; a conveyor 203d moving towards a sorter for shipment where goods are sorted for shipment; a conveyor 203e moving towards a temporary storage area; and a line 206 where labels are newly stuck to inflow goods.

A good guided to the sorter 205 is introduced into either one of conveyors 203a to 203e or inflow label sticking line 206, under the control of sorter controller 233.

The inflow label sticking line 206 is provided, in addition to a feeder 271, with three label sticking sections each comprising a PC terminal 241, a scanner 242 and a label printing device 243, each of the label sticking sections being operated by a label sticker (P1, P2 or P3).

To the inflow label sticking line 206 are carried goods whose barcodes could not fully deciphered by the scanner 232, and the goods are temporarily stopped at feeder 271. Then, the goods are sent one by one to the label stickers P1 to P3, under the control of feeder controller 272 (see FIG. 9).

At each label sticking section, label sticker P1, P2 or P3 applies the scanner 242 directly to the label of a good contained in a carton, by opening the carton; the scanner 242 reads the JAN code there; and then the PC terminal 241 instructs the label printing device 243 to print an SCM label indicating the destination of the good.

The good whose barcode has been properly read is placed again in the carton, and the newly printed label is stuck on the carton. The other end of the inflow label sticking line 206 is connected to inflow line L1, and thus the newly labeled carton enters inflow line L1.

With this system, if a good 210 is provided to the left end of inflow conveyor 201 (left end of the figure), it is carried rightward, and temporarily stopped at the feeder 204. The feeder 204 is placed under the control of an order control unit 227 as will be described later (see FIG. 9), and, in response to control signals from the order control unit 227, guides goods one by one to the first conveyor 202.

FIG. 9 is a block diagram for illustrating the composition of a control system to control the system depicted in FIG. 8. As shown in the figure, the PC terminals 211 of inflow lines L1 to L4 are connected to a POR (Point of Receiving) sever 214, and thus receive necessary data from the POR server 214, and transmit information about inflow goods to the POR sever 214.

POR server 214 stores in its memory ASN (Advanced Shipping Notice) data, and, in response to a request from the PC terminal 211, transmits a part of the data to the PC terminal 211. In this embodiment, the POR server prepares a merchandise information table based on accumulated such ASN data.

The article sensors 221 to 225 arranged along inflow lines L1 to L4 are connected to the order control unit 227. The order control unit 227 drives the feeder 204 in accordance with outputs from the article sensors 221 to 225, thereby controlling the entry of goods carried via inflow conveyors 201 into the first conveyor 202.

As long as based on FIG. 9, only one set of article sensors 221 to 225, and feeder 204 are connected to the order control unit 227, but, in reality, the article sensors 221 to 225, and feeder 204 provided to inflow lines L1 to L4 are all connected to the order control unit 227.

Figure 12:
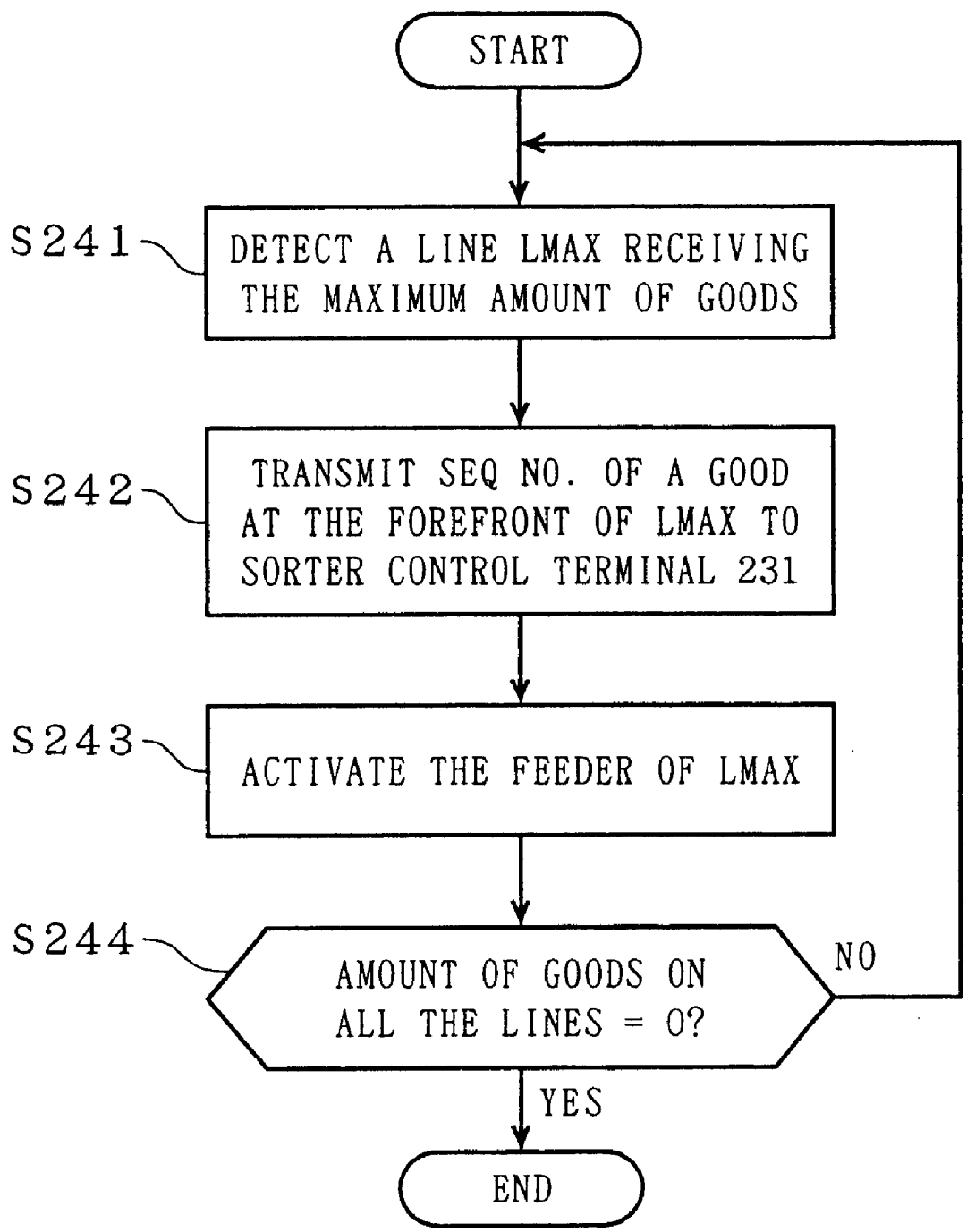
FIG. 12 is a flowchart for illustrating the processing practiced by a feeder control terminal.

A feeder control terminal 226 is connected to the sorter control terminal 231 and to the POR server 214, as well as to the order control unit 227. The feeder control terminal 226 practices a control operation as shown in FIG. 12 as will be described later.

The sorter controller 233 is connected to the sorter 205, and controls the sorter 205 such that it may guide a good carried via the first conveyor 202 to any one of second conveyors 203a to 203d as appropriate according to the information recorded in the destination label of the good.

The sorter control terminal 231 is connected to POR server 214 and feeder control terminal 226, and practices a control operation as shown in FIG. 13 as will be described later.

Figure 14:
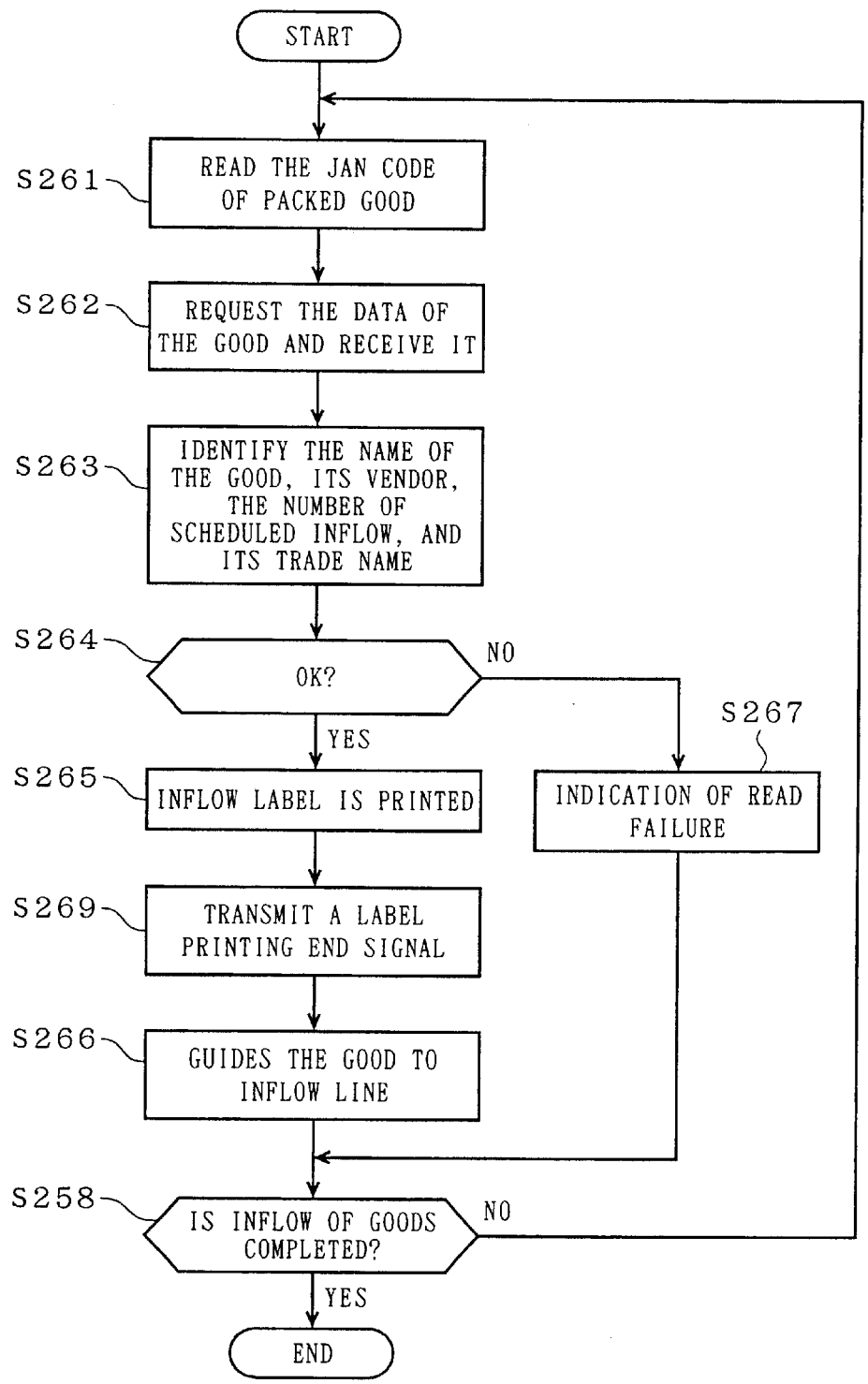
FIG. 14 is a flowchart for illustrating the processing practiced by a PC terminal arranged along an inflow label sticking line.

Each of the PC terminals 241 arranged along the inflow label sticking line 206 is connected to POR server 214, practices a control operation as shown in FIG. 14 as will be described later, reads the JAN code attached to a good using a scanner 242, receives data related with the good from POR server 214, and prints a label carrying necessary information.

The feeder 271 jointed to the inflow label sticking line 206 is connected to the feeder controller 272, and operates under the control of the feeder controller 272. The feeder controller 272 is connected to POR server 214, sorter control terminal 231, etc.

Figure 10:
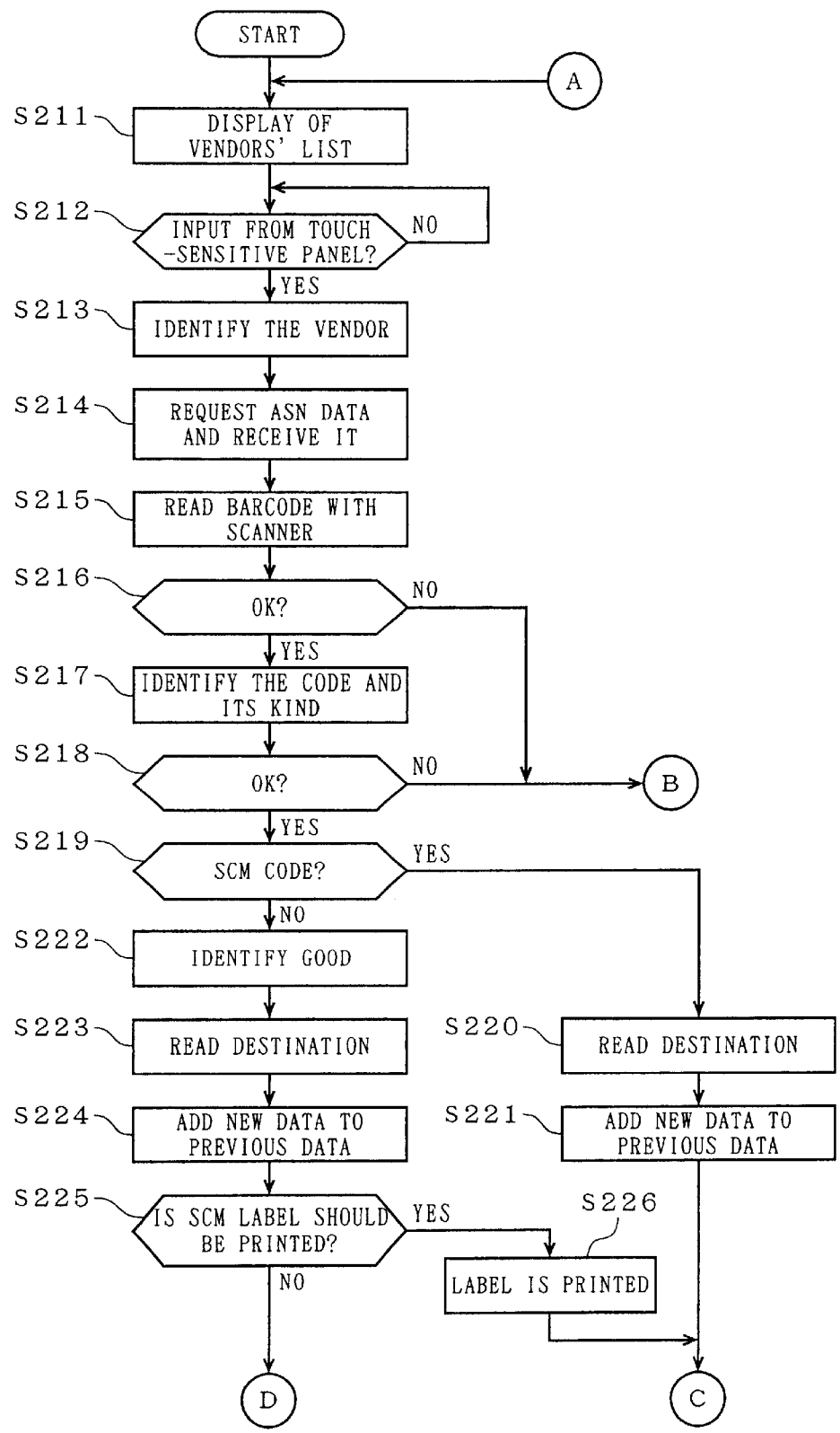
FIG. 10 is a flowchart showing the steps taken by a PC terminal for practicing a processing assigned to it (No. 1).
Figure 11:
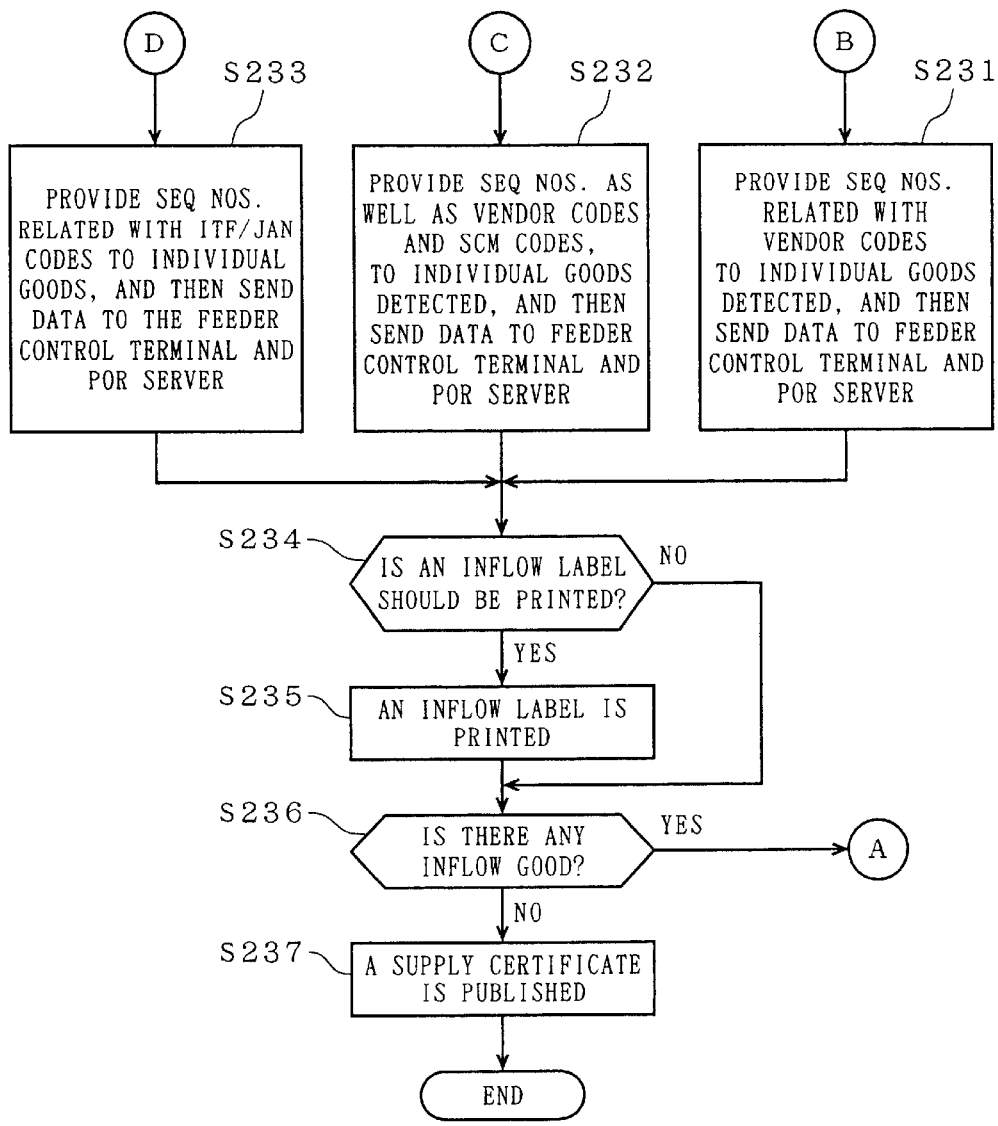
FIG. 11 is a flowchart showing the steps taken by a PC terminal for practicing a processing assigned to it (No. 2).

FIGS. 10 and 11 give flowcharts showing the steps (initial and final segments) the PC terminal 211 take for practicing a processing assigned to it. At step S211, PC terminal 211 causes a display device (not illustrated here) to present a list of providers who are going to provide goods. This display device has a touch-panel based input device whereby it is possible to feed input through a touch panel (pressure sensor) provided to the display, and thus it is possible for a provider to feed his name (company's name) into the PC terminal 211 when he puts his goods onto the inflow line.

At the next step S212, PC terminal 211 waits input as given by a provider who touches the touch panel by his finger. When PC terminal 211 detects input, it notes the name of the provider (step S213). Then, it requests the ASN (Advanced Shipping Notice) data of that provider from POR server 214, and when it receives the data, it stores it in its memory (step S214).

When the goods are put on the inflow conveyor, PC terminal 211 reads the barcode on labels attached to the goods with scanner 212 (step S215), and checks whether the code is rightly read or not (step S216).

When PC terminal 211 finds the code is not rightly read, it advances to step S231 (FIG. 11). When PC terminal 211 finds the code is rightly read, it determines whether the code is a SCM code (code printed on an SCM label), or a JAN code or an ITF code (steps S217 and S218). When PC terminal 211 finds the code is not any one of the above codes, it advances to step S231.

When PC terminal 211 finds the code is an SCM code, it advances through steps S218 and S219 to step S220 at which it extracts, from the ASN data, information regarding the handling of the goods (to be stored or immediately shipped or to be further sorted).

Next, PC terminal 211 adds the number of inflow goods to the ASN data (step S221). This processing consists, for example, of subtracting the number of inflow goods from the number of goods to be received for that day, and of adding the same number to the number of goods having been received on that day. On completion of the processing required for step S221, PC terminal 211 advances to step S232 (FIG. 11).

If PC terminal 211 finds the code is a JAN code or an ITF code, it advances from step S219 to step S222 at which it recognizes how to handle the goods, and adds necessary data to existent data as in steps S220 and S221 (steps S223 and S224).

Next, PC terminal 211 determines whether an SCM label should be printed or not. If it finds an SCM label should be printed, it instructs the label printing device 213 to print an SCM label (step S226), and advances to step S232. Alternatively, if it finds an SCM label need not be printed, it advances through step S225 to step S233 (FIG. 11).

At step S231, PC terminal 211 provides, to individual goods detected (goods 210 in FIG. 8), sequential numbers ("SEQ Nos." hereinafter) which are related with the codes of the vendors who have sent those goods, that is, the codes to serve as ID numbers of those vendors. Then, PC terminal 211 sends the vendor codes, SEQ Nos., and other necessary data to the feeder control terminal 226 and POR server 214.

The SEQ Nos. are given to individual goods to serve as their IDs thereby facilitating the management of those goods, in case the same goods might be provided by different vendors, and some of the vendors might provide other goods, in addition to the goods here concerned.

At step S232, PC terminal 211 also gives, to individual goods, SEQ Nos. which are related with their vendor codes and SCM codes, and sends the SEQ Nos. as well as the vendor codes and SCM codes and other necessary data, to the feeder control terminal 226 and POR server 214.

At step 233, PC terminal 211 gives, to individual goods, SEQ Nos. related with their JAN codes or ITF codes, and sends the SEQ Nos. as well as the vendor codes, JAN codes or ITF codes, and other necessary data to the feeder control terminal 226 and POR server 214.

In the subsequent step S234, PC terminal 211 determines whether new inflow labels should be given to newly flowed-in goods. If it determines new inflow labels should be given, it instructs the label printing device 213 to print inflow labels (step S235).

The inflow label includes data in the form of characters, barcodes or two-dimensional codes such as a storage area in which the good is to be stored, a storage location (address within the storage area), the date of production, the date of inflow, the expiration date for outflow, the shelf-life, etc. Sticking the labels to goods will facilitate the management of the goods: the good will be shipped within the expiration date or a first-come first-out rule will be safely observed.

If goods receive SCM labels or inflow labels from their providers, PC terminal 211 will not perform a renewed printing of inflow labels for them. If a good should be sorted by pieces, PC terminal 211 will guide it to the conveyor 202, instead of printing a label for it, thereby preventing the scanner 232 from reading the barcode of the good, and allowing the sorter 205 to pass the good to the inflow label sticking line.

At a subsequent step S236, PC terminal 211 checks whether any goods should be further provided by the same provider or not, and it finds there are any goods left to come, it will return to step S211. On the contrary, if it finds there is no good left, it will instruct the label printing device 213 to print a supply certificate indicating that the provider has securely provided all the necessary goods for the day (step S237), to complete the processing for that provider.

As shown above, this embodiment incorporates an input feeding means by which the provider can feed his name to PC terminal 211 when he puts goods to the inflow line, thereby enabling PC terminal 211 to identify the provider as well as to note the properties and numbers of goods. Through this arrangement it becomes possible to easily and efficiently manage goods according to their providers by only resorting to general-purpose JAN codes or ITF codes attached to the goods, instead of depending on the barcodes specifically provided for the management of inflow goods.

Moreover, with this embodiment, the display device integral with a touch panel gives a list of providers which are scheduled to provide goods for the day; and a provider, when he puts goods on the inflow line, touches his name on the list through the touch panel, thereby entering his name to PC terminal 211. This arrangement makes it possible that the provider can easily feed his name to the computer, thus being relieved of the burden which would be otherwise inflicted upon him, and that need for personnel to receive inflow goods can be safely obviated, which will contribute to a reduction of cost.

Further, each time a provider has finished providing a series of goods required for the day, PC terminal 211 automatically prints a supply certificate for him. This makes it possible to obviate the need for personnel for the printing work, which will contribute to a further reduction of cost.

For the embodiment as depicted in FIGS. 10 and 11, the SCM label and the inflow label serve as a label carrying the destination information.

FIG. 12 is a flowchart for illustrating the processing practiced by the feeder control terminal 226. As shown in the figure, at step S241, the feeder control terminal 226 determines, based on the outputs provided by the article sensors 221 to 225 of each inflow line, which inflow line (LMAX) receives the largest number of goods 210 on its conveyor (LMAX is either one of L1 to L4, and in the example shown in FIG. 8, L4 is LMAX).

Next, the feeder control terminal 226 transmits the SEQ No. (and the vendor code) of a good 210 at the forefront of LMAX thus determined (to be handled next), to the sorter control terminal 231 (step S242); activates the feeder 204 of LMAX via the order control unit 227; and guides the good 210 to the first conveyor 202 (step S243).

Through the operation exercised at step S242, the sorter control terminal 231 can note in advance the SEQ No. (and vendor code) of the good just entering into the first conveyor 202.

At the end of the above processing, the feeder control terminal 226 checks whether all the lines are devoid of goods or not, and as long as the answer is not zero (NO), it returns to step S241, and repeats the same processing until the answer is zero (YES).

As seen from above, with this embodiment, goods from different lines are guided to the first conveyor 202 in order of the congested state of the line through which the good pass, and thus the number of goods on each inflow line 201 is averaged. This arrangement makes it possible to avoid a situation which might otherwise result, that is, a situation where some of plural inflow lines are so much congested with goods as to block the entry of new goods to those lines. This will improve the efficiency of handing inflow goods.

FIG. 13 is a flowchart for illustrating the processing practiced by the sorter control terminal. As shown in the figure, at step S251, the sorter control terminal waits input from the scanner 232. When it receives the input, it identifies the destination of a good from the information contained in the label stuck to the good (step S252).

With this embodiment, the sorter control terminal determines the destination of the good, that is, which one of the following the good should be carried to: storage areas I and II, a sorting area where the good is sorted by pieces, a sorting area for shipment, and a temporary storage area (see FIG. 8). If the sorter control terminal fails to read necessary information, it will transmits the SEQ No. (and the vendor code) of that good 210 to POR server 214 (step S254).

Even if the sorter control terminal fails to read necessary information from the label of a good, it can identify the good because it has received the SEQ No. of the good from the feeder control terminal 226.

Next, the sorter control terminal controls the sorter 205 via the sorter controller 233 in such a way as to guide a good to the second conveyor 203a if the good is to be carried to storage area I; to the second conveyor 203b if the good is to be carried to storage area II; to the second conveyor 203c if the good is to be carried to the sorting area for piecemeal sorting; to the second conveyor 203d if the good is to be carried to the sorting area for shipment; to the second conveyor 203e if the good is to be carried to the temporary storage area; or to the inflow label sticking line 206 if the sorter control terminal can not determine the destination of the good (step S255).

At step S256, the sorter control terminal checks whether there is any inflow good or not, and as long as the answer is affirmative, it returns to step S251 and repeats the same processing until it receives an negative answer.

As seen from above, the sorter control terminal controls, through the processes as depicted in FIG. 13, the sorter 205 in such a way as to guide goods to appropriate conveyors 202 according to the information carried in the labels of those goods, which makes it possible to smoothly distribute goods to their specified destinations.

If the sorter control terminal fails to read necessary information from the label of a good, it will guide the good to the inflow label sticking line 206 so that the good may receive a new label there. Therefore, even if a good whose case does not bear any code such as JAN code, ITF code or SCM code, the good will be safely received and handled by this system.

FIG. 14 is a flowchart for illustrating the processing practiced by a PC terminal 241 arranged along the inflow label sticking line. As shown in the figure, at step S261, the label sticker P1, P2 or P3 feeds, using a scanner 242, the JAN code of a good contained in a case to the PC terminal 241. Then, PC terminal 241 requests the data of the good from POR server by sending that JAN code to the latter, and receives the data (step S262).

When PC terminal 241 identifies, from the data, the name of the good, the name of the provider (company's name), the good being scheduled to be provided for the day, etc., it causes an inflow label to be printed as at step S235 of FIG. 11 (steps S263, S264 and S265).

Next, on completion of the printing of the label, PC terminal 241 transmits a label printing end signal to the feeder controller 272 (step S269).

Then, the label sticker P1, P2 or P3 puts the good in a case such as a container, sticks the label to the container, and guides the container to the inflow line L1 (step S266). PC terminal 241 advances to step S268.

If at step S264 the PC terminal 241 can not obtain sufficient data, it instructs a terminal display to display a failure (step S267), and advances to step S268. At step S268, PC terminal 241 checks whether inflow of goods is completed for the day or not, and as long as it finds inflow of goods continues, it returns to step S261 and repeats the same processing until it finds inflow of goods is completed for the day.

As seen from above, even if a good is contained in a case carrying an illegible label, the label sticker P1, P2 or P3 takes out a piece of the good from the case, and feeds its JAN code to PC terminal 241 which then causes a new inflow label to be printed so that the label may be stuck to the case. This makes it possible to smoothly handle a good contained in a case carrying an illegible label. Therefore, goods contained in cases carrying illegible labels will be safely received and handled by this system.

Incidentally, with this system, it is possible, even if a good carries no ITF code, to identify the provider of the good from its SEQ No. The goods requiring renewed labeling are mainly composed of piecemeal assorted goods, and such goods are put anew in containers properly labeled, guided to an inflow line, and carried through the sorter 205 to the conveyor 203c leading to the sorting area for piecemeal sorting.

Figure 15:
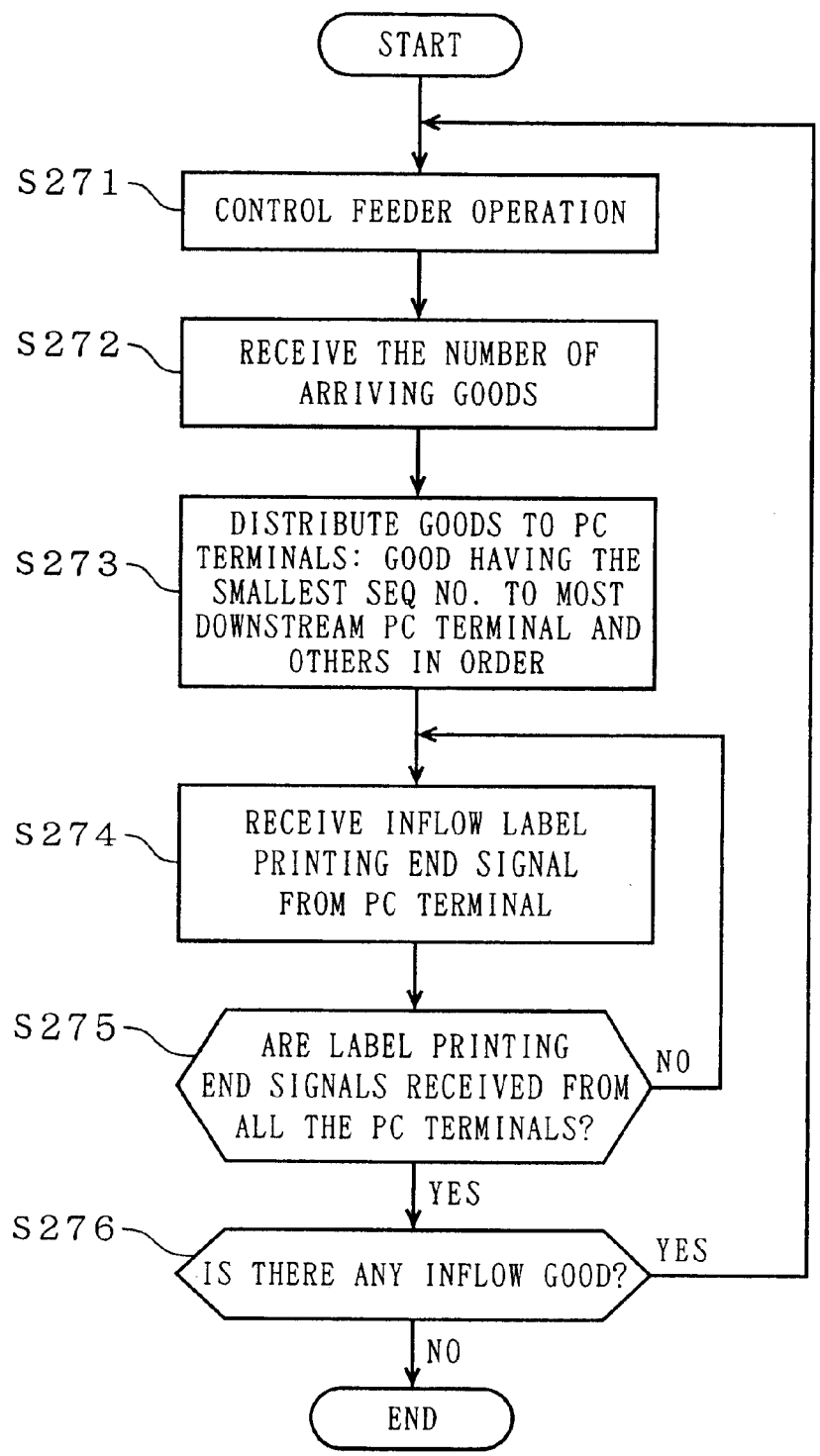
FIG. 15 is a flowchart for illustrating the processing practiced by a feeder controller.

FIG. 15 is a flowchart for illustrating the processing practiced by the feeder controller while FIG. 16 illustrates the processing practiced by the feeder controller. The processing which proceeds through the steps as shown in FIG. 15 will be described by means of an example as depicted in FIG. 16 where goods having SEQ Nos. 1 to 8 are carried to the feeder 271.

Figures 16A, 16B, 16C:
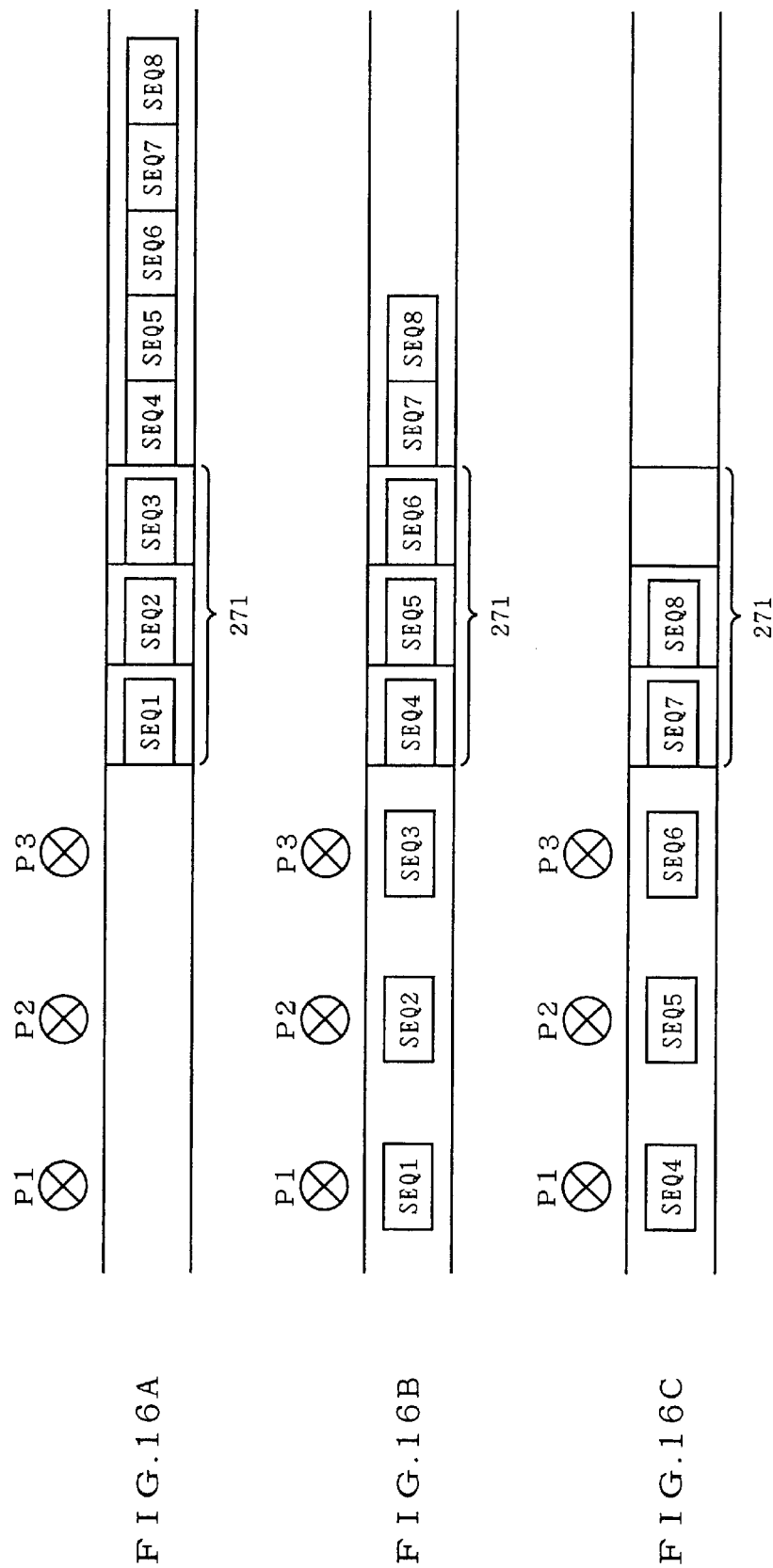
FIG. 16 is a diagram for illustrating the processing practiced by a feeder controller.

At step S271, the feeder controller instructs the feeder 271 to receive goods having SEQ Nos. 1 to 3 as shown in FIG. 16A. Then, the feeder controller receives the number of goods entering the sorter 205 from the sorter control terminal 231 (step S272), and, in accordance with the number of goods received, it distributes goods to PC terminals such that the good having the smallest SEQ No. is assigned to the PC terminal situated at the leftist or at the most downstream of the line (step S273).

To put it more specifically, the feeder controller assigns the goods having SEQ Nos. 1, 4 and 7 to the PC terminal at the most downstream of the line (operated by P1), those having SEQ Nos. 2, 5 and 8 to the PC terminal at the next downstream of the line (operated by P2), and those having SEQ Nos. 3 and 6 to the PC terminal at the most upstream of the line (operated by P3).

Through this operation, as shown in FIG. 16B, the goods having SEQ Nos. 1, 2 and 3 are moved to the label stickers P1, P2 and P3 respectively, and then new labels are printed and stuck to the goods. On completion of the printing of the label, each PC terminal transmits an inflow label printing end signal to the feeder controller (step S274). The feeder controller waits until it receives label printing end signals from all the PC terminals (step S275), and after confirming it has received label printing end signals from all the PC terminals, it checks whether there are any goods that newly enter the feeder (step S276).

In the example as illustrated in FIG. 16, the feeder controller, finding there are still goods with SEQ Nos. 4 to 8 left, returns to step S271, and drives the feeder 271 again so that the goods of SEQ Nos. 4 to 6 may be shifted to the label stickers P1 to P3 as shown in FIG. 16C. When it finds printing of the inflow label of the good with SEQ No. 8 has been completed, it terminates the processing for the goods in question.

The processing as illustrated in FIG. 14 allows the label stickers to handle goods in parallel, which will contribute to the improvement of work efficiency.

Incidentally, this invention is not limited to the embodiments described above, but may be modified in various manners. For example, the number of conveyors is not limited to four. One invention may be based on a single inflow conveyor, and the other may be based on two or more inflow conveyors.

The number of label printing devices 213 per line may be made larger than in the above embodiment, if the inflow frequency of goods is high.

In the above embodiment, article sensors 221 to 225 serve as a means to monitor the traffic of goods on a line, but the monitoring means is not limited to such sensors. An alternative method may include obtaining the number of inflow goods (nIN) from the scanner 212 and the number of goods exiting from the feeder 204 (nOUT), and then calculating the difference (nIN—nOUT) to find the number of goods currently on the line.

The above embodiment incorporates three label printing devices along the inflow label sticking line, but the number of label printing devices is not limited to three.

As has been detailed above, according to the invention wherein, for each inflow good, the name of its provider, and its property and number can be identified from the output provided by a means for reading information necessary for good identification; and otherwise the provider of a good may feed the information necessary for good identification so as to allow the name of the provider as well as the property and number of the good to be identified, it is possible to efficiently manage inflow goods according to their providers simply based on the codes generally attached to goods such as JAN codes or ITF codes.

According to the invention wherein an input means composed of a display device combined with a touch panel-based input device gives a list of providers on display; and a provider of a good can feed his ID information by simply touching his name on the list, it is possible to relieve the provider of the burden which would otherwise be inflicted on him, to obviate the need for personnel who would otherwise be required for the reception of inflow goods, and thus to reduce cost.

According to the invention wherein an identification number is given to each management unit of the same goods, according to the identification information of its provider, and inflow goods are managed based on the identification information of their providers and the identification numbers given to them, it is possible to accurately manage goods based on the data of their management units, even when the same goods are provided by different providers at the same period, or when different management units of the same goods are provided by a single provider.

According to the invention wherein the destination of a good is determined according to the good identification information provided by a means for reading good identification information, and a label carrying the destination information is printed based on the determination, it is possible to smoothly carry the good provided with the label to the steps subsequent to the inflow check.

According to the invention wherein a supply certificate is automatically published for every scheduled input of goods, it is possible to obviate the need for personnel who would otherwise be required for the work, and to further reduce cost.

According to the invention wherein, for inflow goods on a conveyor, their destination information is read from the labels attached to them, and a sorting machine is controlled according to the destination information on the labels, it is possible to smoothly distribute the goods to their specified destinations.

According to the invention as wherein, if there are any goods whose destinations remain undecipherable, they are guided to an inflow label sticking line where they have new inflow labels printed and stuck, it is possible to manage the goods based on those newly stuck labels. Accordingly, even if a good whose case has no label (or good which is so packed as to disable the deciphering of the code on the label) enters a line, the good will be easily managed. Thus, the system will safely receive and handle such goods.

According to the invention wherein a plurality of label stickers can work at their respective inflow label sticking sections in parallel, it is possible to improve the work efficiency.

According to the invention wherein goods are transferred from inflow conveyors to an intermediary conveyor with a priority on the congested state of the inflow lines through which the goods are carried, the congested state of each inflow line being constantly monitored based on the output provided by a monitoring means to follow the current number of goods at that inflow line, it is possible to average the number of goods on each inflow line, and to avoid a situation where some of the inflow lines are so much congested with goods as to block the entry of new goods to those lines, thereby improving the efficiency of handing inflow goods.

Third Embodiment

FIG. 17 shows a basic composition of a movable loader attached to an automated storage/retrieval system of this invention provided to a distribution center: FIG. 17A is a general perspective view; FIG. 17B a partial perspective view; and FIG. 17C a sample display of a display device.

As shown in the figure, the automated storage/retrieval system 310 is provided with stacker cranes (not illustrated here) automatically moving between the adjacent arrays of multiple storage racks 311. A pick-up conveyor 312 is installed between each pair of adjacent racks in parallel with their longitudinal axes, and movable loaders 313 of this invention are installed at a space between a row of storage racks 311 and a pick-up conveyor 312.

The movable loader 313 may be installed at both sides of a conveyor 312, but in the figure a movable loader 313 is installed at one side of a pick-up conveyor 312 for illustration. A plurality of movable loaders 313 may be installed on one side of a conveyor 312 in parallel with the longitudinal axis of the conveyor with an appropriate interval inserted between adjacent loaders.

The movable loader 313 mainly consists of a platform 314 and supports 315, and moves on rails 316. The platform has many round rotational bodies such as steel balls embedded on its upper surface such that only the upper portions of the balls protrude from the surface to be freely rotational in their seats. On one side of the platform 314 which runs in a direction normal to the direction of movement stands a pillar on the top of which there is provided a display 318 to serve as a terminal of a computer. On the opposite side of the platform 314 there is provided a handle 319.

With respect to a basic movable loader 313, the platform 314 rests on four supports 315 integrally jointed with it: two supports are on the side close to a row of racks 311 and the other two supports on the side close to a conveyor 312. The four supports 315 have on their lowest ends wheels 320 through which they contact with rails 316 so that they may run on the rails.

The platform 314 may have only two supports 315 on the side close to a row of racks 311, and those on the side close to a conveyor 312 may be substituted for some movable means that is movably supported on the frame 312a of the conveyor (see FIG. 17B).

That movable means may comprise, for example, a mechanism attached to the side of platform 314 so as to be placed on a guide rail mounted to the frame 312a to slide over the latter, or a slider consisting of rollers or balls attached to the side of platform 314 so as to slide along the frame 312a.

Alternatively, in stead of weight-bearing rails 316, a pair of guide rails to support the load on their inner sides may be introduced, and guide wheels 316b attached horizontally to the lowest ends of supports 315 may be engaged with the inner sides of the guide rails to move along the latter as shown in FIG. 17A.

As seen from above, because the platform 314 rests on the supports 315, the hauler can easily push or pull the platform 314 using the handle 319, and by so doing move it along the pick-up conveyor 312.

The upper surface of platform 314 is positioned horizontal or slightly inclined toward the conveyor 312 so that it may be nearly flush with the upper surface of pick-up conveyor 312. This arrangement will make it possible for a good A hauled out from a rack to be transferred in the presence of a weak force or of its own weight to the pick-up conveyor 312.

In this embodiment, the rotational bodies 317 are steel balls, and they are embedded rotationally in the substance of platform 314 such that their upper portions protrude from the surface of platform 314. However, the rotational body is not limited to a ball, and cylindrical rollers may be embedded rotationally such that only their upper portions are exposed.

Alternatively, the side of platform 314 close to a pick-up conveyor 312 may be wider than the opposite one as indicated by the two-dot dash line of FIG. 17B. This arrangement will make it possible for the hauler to haul goods in the direction towards which the conveyor moves, which will smoothen the hauling of goods.

The display device 318 to serve as a terminal of a computer receives, via SS wireless communication on a real time basis, the pick-up data of each line from a host computer, and displays them on the screen. FIG. 17C is a sample display which presents the location of a good, the name of the good, the total picked up number of the good, etc.

The display device 318 is provided with an infra-red ray sensor or a laser sensor 329 whereby it is possible to detect the presence of a picked-up good, to count the total number of picked-up goods, and to present the number of currently picked-up goods on display as shown in FIG. 17B. Further, a scanner may be attached to the platform 314 so that it may be used for reading the barcode of a good to present the data represented by the barcode on display.

The sensor and scanner are integrally installed in the platform 314 or in the display device 318 so that the sensor, when excited, may activate the scanner, thereby enabling the counting and checking of picked-up goods.

Alternatively, the sensor may be installed in the display device 318, while the scanner fixed separately from the display device, and counting and checking of picked-up goods achieved in the manner as mentioned above.

Alternatively, the scanner may not be employed, and only the sensor used for counting picked-up goods.

FIG. 18 is a perspective view of the movable loader of FIG. 17 for illustrating its detailed construction. FIG. 19 is a perspective view of the movable loader of FIG. 18 for illustrating its constitutive elements. FIG. 20 gives the perspective and side views of a ladder or a constitutive element of the movable loader of FIG. 18. FIG. 21 is a perspective view of a part of a fall prevention mechanism of the movable loader of FIG. 18.

The movable loader 313 as shown in FIGS. 18 to 21 has four supports as its basic structure; the four supports 315 can vary their lengths vertically, thereby making it possible to adjust the height of the platform 314; and thus the hauler on the platform can easily reach a good A on an upper shelf of a storage rack. The loader also has a ladder 321 which allows the adjustment of its height, and thus the hauler can easily reach goods even when the platform is kept high.

The storage rack 311 has a horizontal guide rail 322; the platform 314 has a fall prevention mechanism 323 which is detachably and freely movably jointed to the horizontal guide rail 322; and thus the movable loader 313 is safely prevented from falling during movement and during rest at which hauling works proceed. The platform 314 has a handle 324 which can stand upright to be grasped when in use, or lie horizontally when not in use.

As shown in FIGS. 18 and 19, the support 315 consists of a cylindrical portion 315a of a specified length and a sliding member 315b whose lowest end is movably inserted into the cylindrical portion 315a; the upper ends of the sliding members 315b are fixed on the lower surface of the platform 314; and the sliding members 315b are slid vertically by an actuator (not illustrated here).

The lowest ends of the cylindrical portions 315a are connected with horizontal joining members 315c so that the rigidity of the structure may be enhanced. The wheels 320 may be mounted to the horizontal joining members 315c.

The actuator may be based on a hydraulic cylinder, an air cylinder or a motor-driven screw rod. For example, the support 315 may be constituted of a piston rod inserted into a cylindrical tube.

The horizontal joining member 315c joining the supports 315 has a pedal 325; and the hauler can activate the actuator by way of the pedal 325, thereby adjusting the height of the platform 314 to a desired level.

As shown in FIG. 18, the ladder 321 is constituted of bases 321a and sliding portions 321b so that its length may be freely varied in correspondence with the height of the platform. This extendable ladder 321 may be substituted for a common ladder of this type that consists of bases 321a and sliding members 321b which slide along the guide rails attached to the bases 321a.

The upper ends of sliding members 321b may be rotationally attached to the lower surface of platform 314 via a horizontal rod, or may be rotationally attached, via hooks, to a horizontal joining member 315d which is jointed to the mid-portions of the sliding members 315b of supports 315 as shown in FIG. 20.

Regardless of whether the ladder 321 extends or contracts with the vertical movement of the platform 314, the ladder will form a slope against the floor, and contact through rubber inserted at its foots 321c with the floor for firm fixation.

To reach a good on a high place, the hauler climbs the ladder 321, and carries out necessary operations on the ladder. If the hauler wants to stabilize his stance more firmly, he may use a step 326 as depicted in FIG. 20C. The step 326 may be jointed through an extendable link 327 to a vertical frame of the ladder 321 and fixed via a pin to the latter so that the step may be pulled flat for stepping on or folded back for storage.

The fall prevention mechanism 323 consists of a body 323a, and a roller 323b rotationally fixed to the top end of the body as shown in FIG. 21 and generally takes a hooklike form; and the body 323a has its base end being rotationally fixed to a horizontal pin 323c attached to the side of platform 314 such that the body 323a turns, about the horizontal pin 323c, in a vertical plane towards a nearby storage rack 311.

When the mechanism 323 is turned round towards a horizontal guide rail 322 stretched close to a nearby storage rack, thereby bringing the roller 323 into intimate contact with the rail 322, the movable loader is safely prevented from falling; the roller 323c rolls under the guidance of the horizontal rail 322; and thus the movable loader 313 smoothly moves while being safely protected against fall.

However, although the horizontal guide rail 322 has a constant height, the platform 314 may vary its height. Thus, for the fall prevention mechanism 323 to securely engage with the horizontal rail 322, it must be vertically movably attached to the platform. To achieve this, a guide member 328 is provided to the platform 314 as shown in FIG. 21B, and the body 323a has its base end fixed vertically movably to this guide member 328.

This arrangement makes it possible for the fall prevention mechanism 323 to be always engaged with the horizontal guide rail 322 no matter what height the platform 314 may take. The fall prevention mechanism 323 may be fixed to the cylindrical portion 315a of a support 315. In this case, the guide member 328 can be dispensed with.

The handle 324 consists of a bar 324a and a grip 324b as shown in FIG. 19B; and the bar has its base end being rotationally fixed to a horizontal pin 324c attached to the side of platform 314 such that the bar 324a rotates, about the horizontal pin 324c, in a vertical plane.

If turned round 90°, the handle 324 rests along the side end of platform 314 so that it may not disturb the movement of goods taken out or put on the platform 314. If turned round 90° in the opposite direction, the handle 324 stands upright and the hauler can easily move the movable loader in parallel with a conveyor by using the handle.

It should be noted that the handle 324 has stoppers (not illustrated here) to set it in place to be at rest or upright.

Processes necessary for storing goods in the automated storing/retrieval system configured as above and for picking up goods from the same system will be described below, with attention being focused on the handling of goods contained in cartons.

Figure 23A:
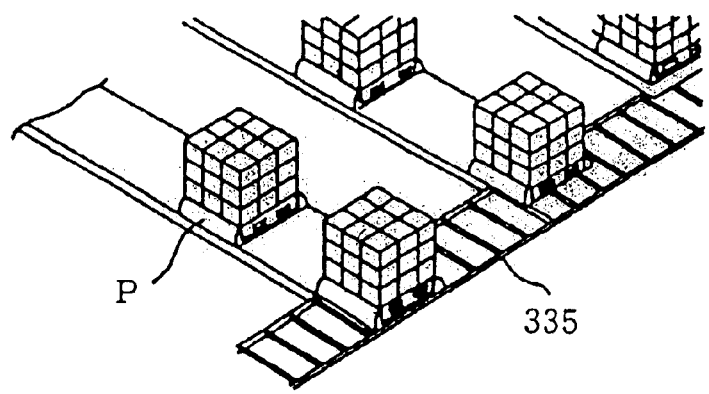
FIG. 23A illustrates an inflow line and a routing line.
Figure 23B:
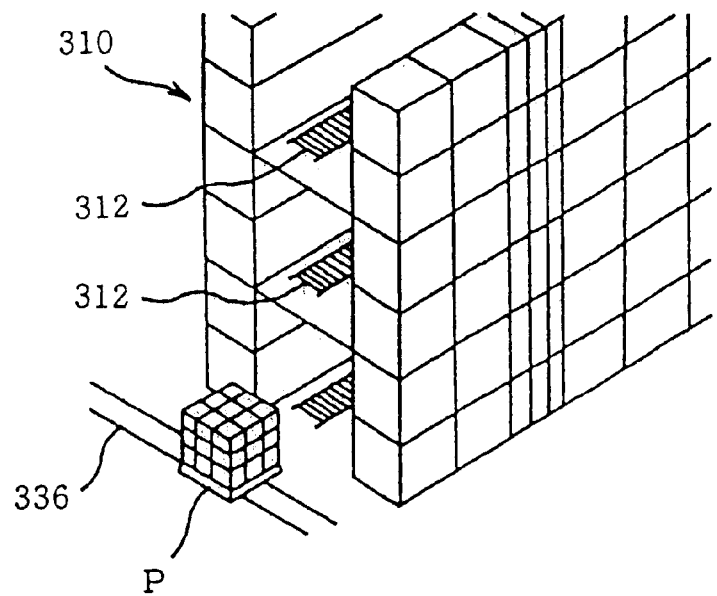
FIG. 23B illustrates a transporter and an automated storage/retrieval system.
Figure 24:
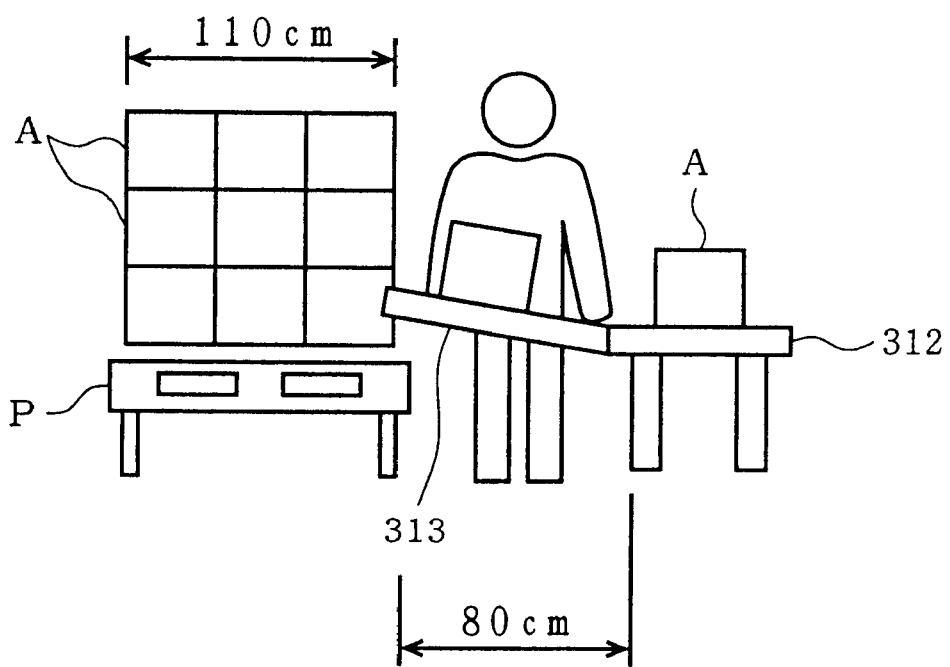
FIG. 24 illustrates how the hauler takes out or puts in goods using a movable loader as depicted in FIG. 17.

FIG. 22 shows the inflow steps of a distribution center to which this invention is applied: FIG. 22A illustrates how a transporter feeds input; and FIG. 22B illustrates the operation taken at an inflow line, and a label for inflow goods. FIG. 23 illustrates steps necessary for carrying goods from an inflow line to an automated storage/retrieval system of a distribution center to which this invention is applied: FIG. 23A illustrates an inflow line and a routing line; and FIG. 23B illustrates a transporter and an automated storage/retrieval system. FIG. 24 illustrates how the hauler takes out or puts in goods using a movable loader as depicted in FIG. 17. FIG. 25 is a block diagram of a distribution center to which this invention is applied, divided by functions.

1) Inflow goods placed on palettes and received at an entry dock are guided to inflow lines. For a given inflow good, the transporter feeds the name of vendor, the name of manufacturer, etc., to a computer terminal 330 placed at the entry dock through the touch panel.

The data are transmitted to a POR (Point of Receiving) server, and the POR server compares the data with the corresponding ASN (Advanced Shipping Notice) data stored in its memory.

2) Goods placed on a palette P is guided to an inflow line where the identification code of the palette P and the ITF (Interleaved Two of Five) code 332 of the cartons A containing the goods are read by a scanner 333 working on SS wireless communication as shown in FIG. 22B, and the data thus read from the codes are transmitted to the POR server where the data are compared with the corresponding ASN data.

When the matching of the two kinds of data is confirmed, a storage space is automatically prepared. The cartons A may receive as appropriate such an inflow label 334 as shown in FIG. 22B. This inflow label can contain a two-dimensional code necessary for the management of goods requiring freshness.

3) Palettes P from different inflow lines are automatically transferred to a connecting conveyor 335 as shown in FIG. 23A. Then, the palettes P are automatically transferred to a transporter 336 and carried to the aisle of an automated storage/retrieval system 310 as shown in FIG. 23B. If the palette must be hauled by a fork-lifter, the palette is placed on the transporter so that its fork receiving sockets may face sideways, under the instruction from a fork-lifting terminal.

4) A palette P is transferred from the transporter 336 to an automated storage/retrieval system 310 by a stacker crane (not illustrated here), and efficiently sent to a target address based on shipment data under a free address management. The palette P is automatically delivered to an appropriate area according to whether its storage will take place temporarily or permanently.

If transference of cargo is performed by a fork-lifter, the cargo is stored in a location indicated on a terminal. The hauler checks the rightness of the location by reading the label code of cargo with a scanner before delivering the cargo to the location.

5) During hauling works, necessary data are delivered to the hauler through SS wireless communication on a real time basis, and the hauler can achieve necessary works based on the data presented on a display device 318.

Because the data as represented in FIG. 17C are automatically presented to the hauler in synchrony with the advancement of hauling works at each row of racks, it is only necessary for the hauler to, for example, haul out the amount of goods indicated on the display to a nearby movable loader 313 (see FIG. 18).

Further, because data are presented for each row of racks, the hauler can move from a row to another in order together with a loader 313 each time he finished one row. Furthermore, because the amount of goods the hauler has hauled is also presented on display, he can easily check whether the right amount is already hauled or not.

To inform a host computer of the completion of a required work, it is only necessary for the hauler to simply press once a check key on a computer terminal attached to the platform 314. If the hauler wants to identify the good to be hauled, he may only apply a scanner onto the ITF code of the carton containing that good, or directly onto the JAN (Japan Article Number) code of the good. If the hauler wants to identify the goods stored in a rack, he may only apply a scanner to a relevant location code.

Hauling consists of simply transferring, for example, a good A down a slope of the movable loader 313 by a distance of 1.0–1.6 m at maximum as shown in FIG. 24, and the distance the good should be handled by human hand is actually less than 1.0 m. Thus, with the system of this invention, it will be possible to moderate hauling works and to improve the efficiency of the works.

A vertically adjustable movable loader 313 as depicted in FIGS. 18 to 21 can be used similarly to an inclined movable loader as depicted in FIG. 17, if a good in a row rack must be hauled through the loader. If the vertically adjustable movable loader 313 is used for hauling a good in a high rack, its platform 314 is raised to a level flush with the rack; the good is transferred to the platform; the platform is lowered to a level flush with a pick-up conveyor 312; and finally the good is transferred to the conveyor.

Use of such a vertically adjustable movable loader will ease the hauling of goods placed in racks at high levels. If the loader is further provided with a fall prevention mechanism 323, it will be prevented from falling even when it is raised to a high level.

The above description is mainly restricted to the hauling of goods contained in cartons, but hauling of boluses and pieces can be similarly achieved. Boluses and pieces are grouped, and put by groups into containers carried on a pick-up conveyor 312. The containers containing grouped boluses or pieces are guided to a primary assorting line where the boluses or pieces receive a primary sorting; the primarily sorted boluses or pieces are then transferred to a secondary assorting line for a secondary sorting; and they are then shipped.

Because the system of this invention is configured as above, it ensures the following advantages.

1) Because a loader with a platform is movably placed between a row of racks and a pick-up conveyor so that goods may be transferred from the racks to the conveyor and vice versa, it is possible for the hauler, for transferring goods from a rack to the conveyor, to simply haul goods on the platform to slide towards the conveyor, and to readily move the loader to the gateway of a desired row of racks. This will moderate hauling works and improve the efficiency of the works.

2) Because the platform has rotational bodies embedded on its surface with their upper portions being exposed outside, it allows a good placed thereupon to readily move even in the presence of a weak force or of its own weight.

3) Because a display device of a computer terminal is mounted to the platform, to automatically provide the hauler with data of the row of racks he is currently engaged with, he can pursue his job easily and securely depending on the data presented on display.

4) Because the movable loader consists of a platform resting on wheeled supports, it may have a simple and cheap structure.

5) Use of a vertically adjustable movable loader of which the supports and the ladder are adjustable in length will easily enable the hauler to reach a good at a high place.

6) Introduction of a fall prevention mechanism will prevent the fall of the movable loader even if its platform is elevated high.

Fourth Embodiment

A new system according to this invention allows systematization of the works required for a distribution (transportation) center, more particularly, this system allows goods to be stacked in wheeled cages so that they may be delivered to individual shops, being classified by sale areas or by the order of display.

This system, by meeting the following requirements, simplifies the work, ensures speedy, productive, and precise advancement of the work without missing any good, and makes checking easy.

1) Prerequisites 1-1) Goods should be transferred to wheeled cages, divided:
  (1) By purchasers,
  (2) In order of arrival from providers,
  (3) By delivery routes,
  (4) By intermediary distribution centers,
  (5) By intermediary distribution agents,
  (6) Goods to be stored in the backroom of a shop should be separated (it should be determined for a given good whether it will be stored temporarily in a backroom or it will be immediately displayed for sale),
  (7) By categories,
  (8) By display aisles,
  (9) In order of display,
  (10) Materials and products should be separated,
  (11) Goods requiring storage at different temperatures should be separated, and
  (12) Goods requiring storage at different temperatures but able to be delivered in a same truck, and goods requiring storage at different temperatures and to be delivered separately should be separated.

1-2) Goods should be stacked on a wheeled cage meeting the requirements introduced in accordance with:
  (1) their weight, and
  (2) the form of their case,
     a. Carton,
     b. Plastic container,
     c. Unit box having the same base size and capable of being stacked into a pile.

These requirements may be freely introduced by the user of the system of this invention, and the system will function on the requirements selected by the user.

2) The Requirements for the Work of a Distribution (transportation) Center and the Flow of Steps Underlying the Work FIG. 25 is a functional block diagram of a distribution center to which the sorting system of this invention is applied. As shown in the figure, the distribution center is roughly divided into four areas: inflow docks 401 (for storage and passage), a storage area 402, an inflow sorting area 403 and a shipment sorting area 404.

Cartons picked up from the storage area 402, cartons passed from the inflow dock 401-2, and containers which are packed with inflow piecemeal goods and picked goods at the inflow sorting area 403 concentrate to the shipment sorting area 404 where goods are sorted according to purchasers, categories, and order of display, and then goods are stacked on wheeled cages, dollies and handcarts, to be transferred to vehicles for shipment.

3) Inflow Goods Should be Received to Meet Following Requirements.

3-1) Inflow goods to this system are divided into shop groups each comprising two sequencing groups (SEQing groups) (see FIG. 27). For each shop group, goods are divided according to their packed form: one group includes goods existing as separate pieces and collected in containers, and the other goods packed in cartons (see FIG. 26).

The data of containers and cartons necessary for hauling are automatically provided through SS (or PHS) wireless communication to terminals near the haulers working at a pick-up area, a storage area, aisles, etc.

3-2) The hauler, in accordance with the data indicated on his display, picks up the necessary amounts of necessary goods. The data are transmitted to the haulers arranged along a row of racks in accordance with the time sequence of their pick-up works. If haulers want to work on a certain row of racks and inform of it to the server through a nearby terminal, the server will automatically transmit necessary data to the haulers in accordance with the time sequence of their pick-up works.

Figure 26:
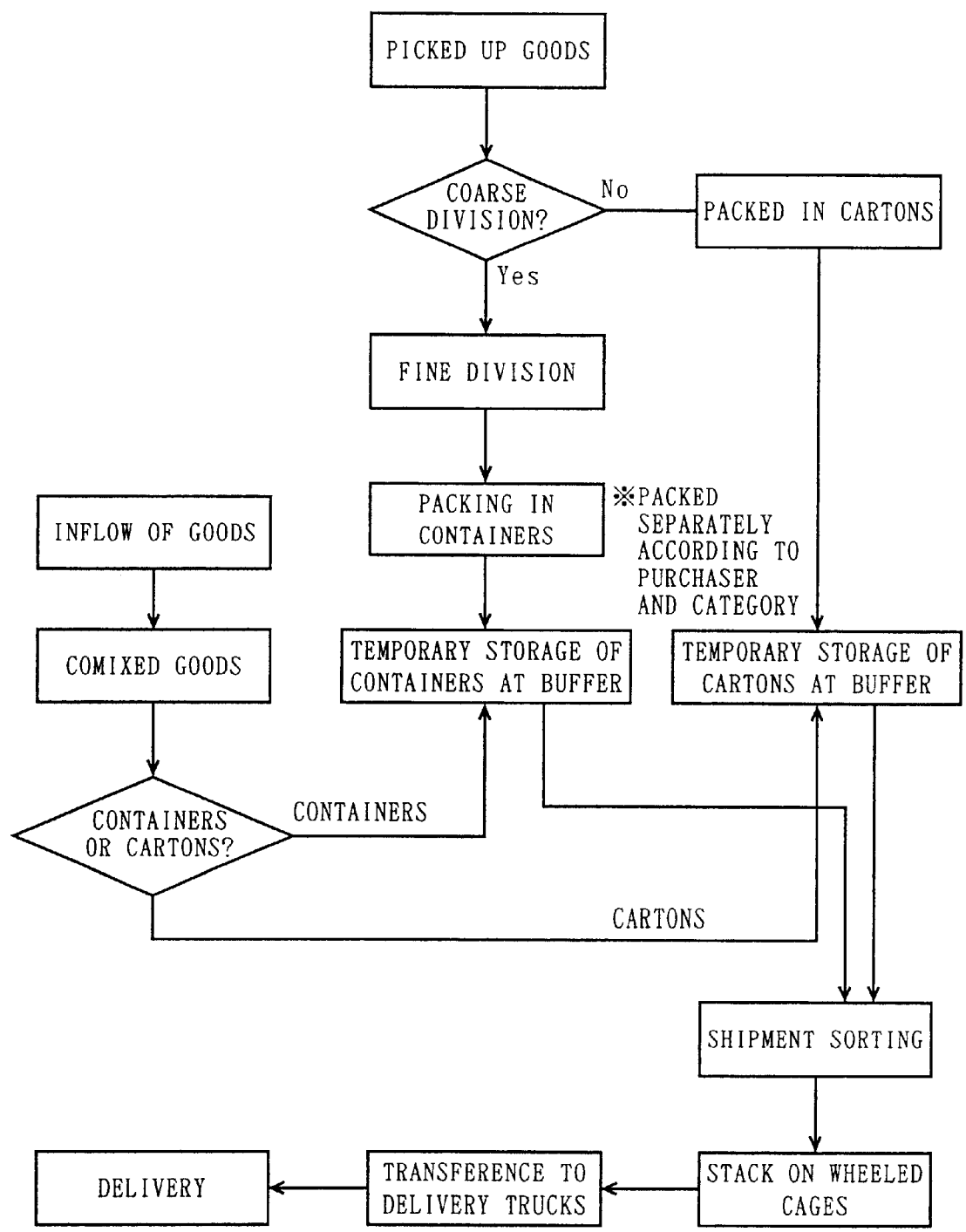
FIG. 26 is a flowchart of the steps necessary for sorting goods at an inflow area of the distribution center as depicted in FIG. 25.

3-3) FIG. 26 is a flowchart of the steps necessary for sorting goods at an inflow area of the distribution center as depicted in FIG. 25. Goods, after being picked up, are handled as shown in FIG. 26 and shipped. To put it more specifically, picked goods are roughly divided into two groups: one group is packed in containers and the other in cartons. Containers and cartons then go to respective buffer areas where they are sorted according to purchasers, and transferred to a shipment sorting area, that is, a feature of this invention.

4) Definition of the Shop Group and SEQing Group

FIG. 27 is a block diagram for explaining the definitions of a shop group and SEQing group to which goods are assigned at the initial phase of inflow as depicted in FIG. 26. The shop group is a unit group of shops to which goods are distributed, while the SEQgroup is a unit group of categories under which the goods of a shop group are put.

Assume that a distribution center distributes goods to be classified under fifteen categories to thirty shops. Then, the group composition will be as depicted in FIG. 27. In this example, a shop group contains ten shops; and for each shop group, two SEQing groups Nos. 1 and 2 are treated in parallel without any interruption.

Actually, hauling and sorting are carried out at the same time for both SEQing groups; one SEQing group is sent to a shipment sorting area while the other SEQing group is sent to a buffer area; and how sorting proceeds at the shipment sorting area is fed back to the buffer area to control the timing.

This arrangement will make it possible to advance the work without interruption, thereby increasing the speed and efficiency of the work. Such parallel handling may proceed on three or more SEQing groups as long as the capacity of buffer area permits.

5) Goods Should be Transferred to Wheeled Cages, Divided:
   (1) By purchasers,
   (2) By categories,
   (3) In order of display when goods are under the same category,
   (4) By the kind of cases.

6) Generation of Data Necessary for Control and Flow of the Data

Figure 28:
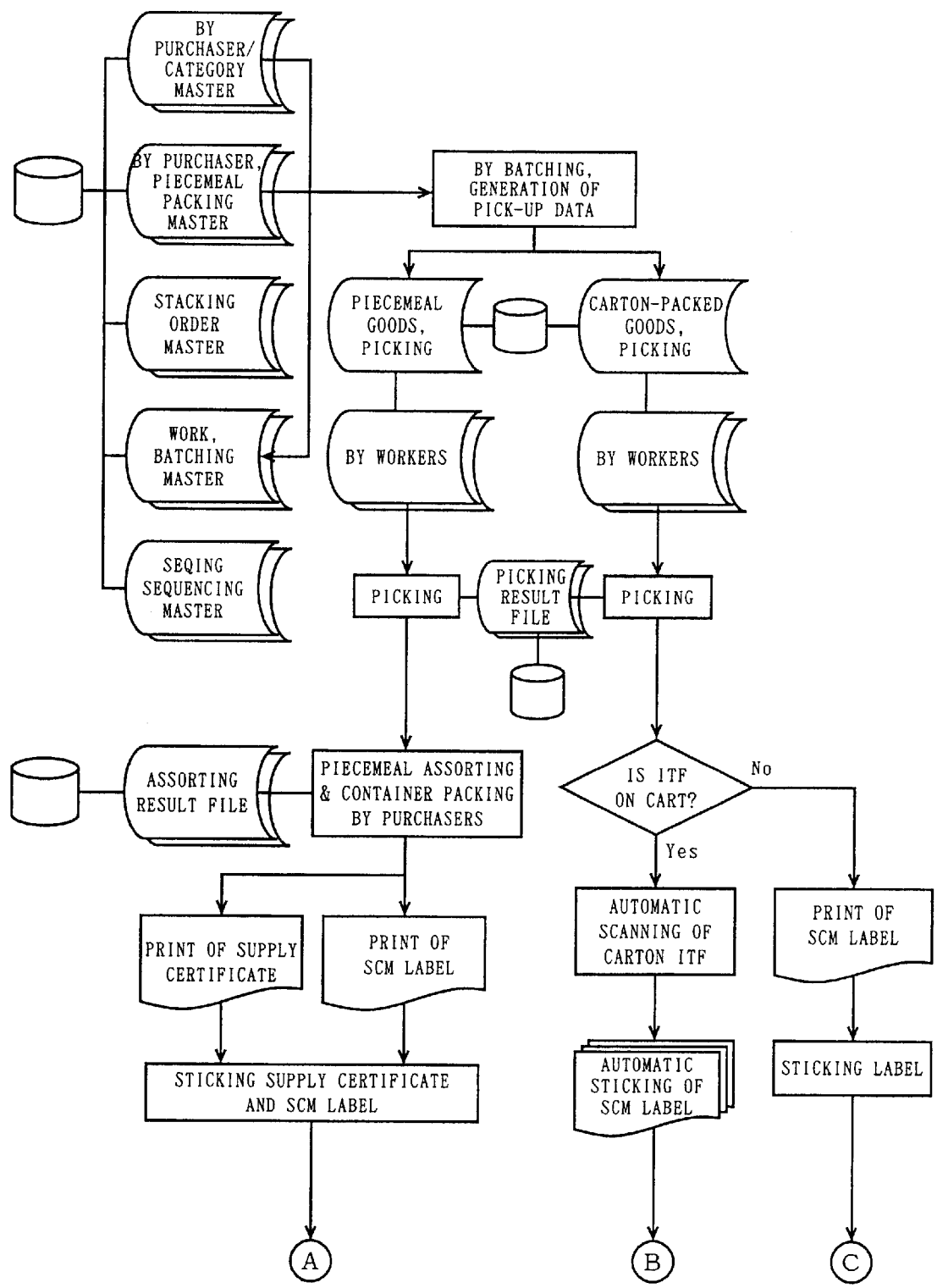
FIG. 28 is a flowchart for illustrating the generation of data necessary for controlling good handling in a distribution center as depicted in FIG. 25, and the control steps based on the data.
Figure 30:
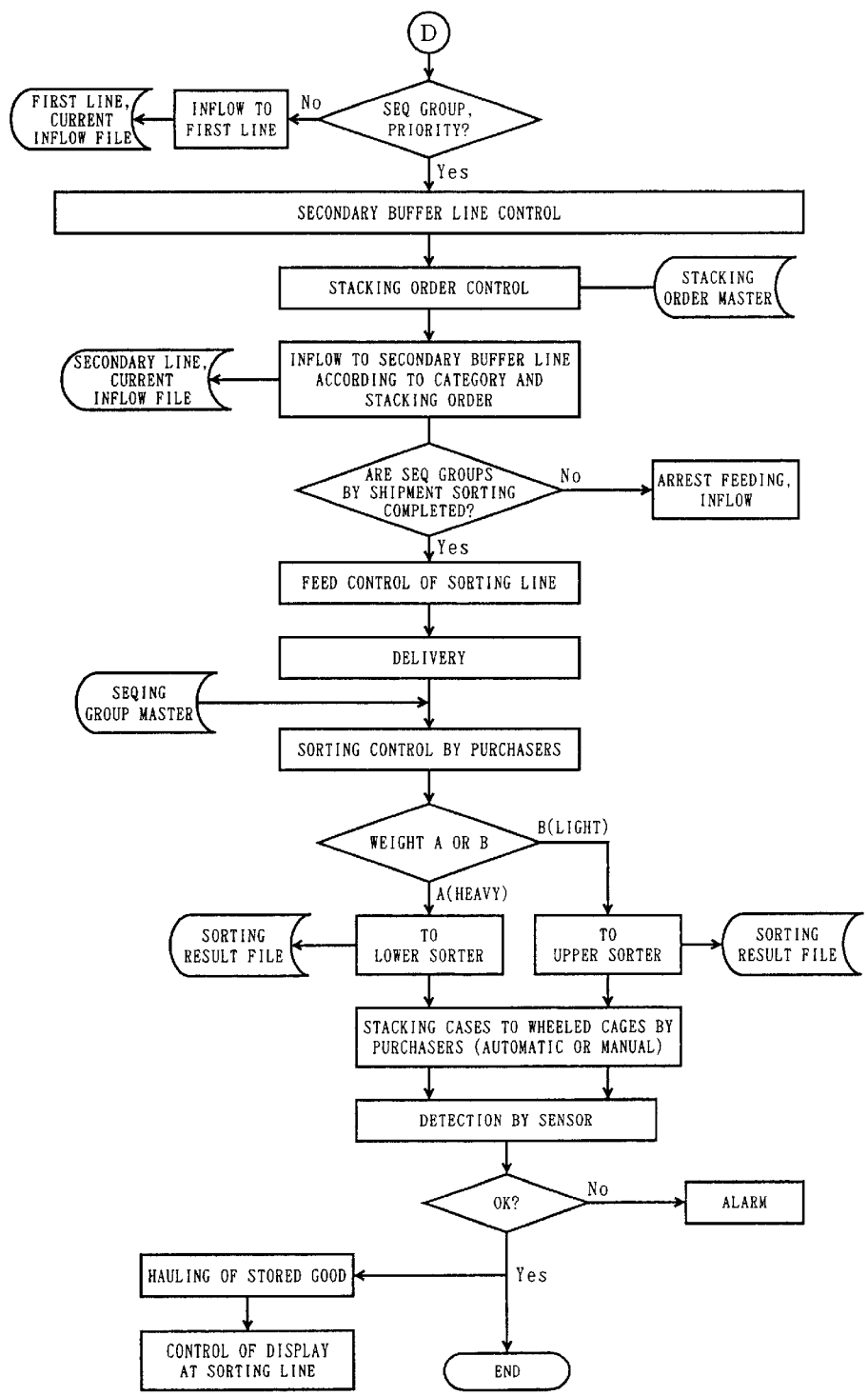
FIG. 30 is a flowchart for illustrating the generation of data necessary for controlling good handling in a distribution center as depicted in FIG. 25, and the control steps based on the data.

FIGS. 28 to 30 are flowcharts for illustrating the generation of data necessary for controlling good handling in a distribution center as depicted in FIG. 25, and the control steps based on the data. The charts deal with the steps controlling the handling of goods existing as cartons and containers. As shown in FIGS. 28 and 29, inflow pieces are sorted according to purchasers and categories; the sorted groups are put in different containers; containers and cartons are divided according to their weights; and they are further sorted according to categories at a buffer sorting area. Then, they are sent to a buffer control line which is described later.

7) Composition of a Control System

Figure 31:
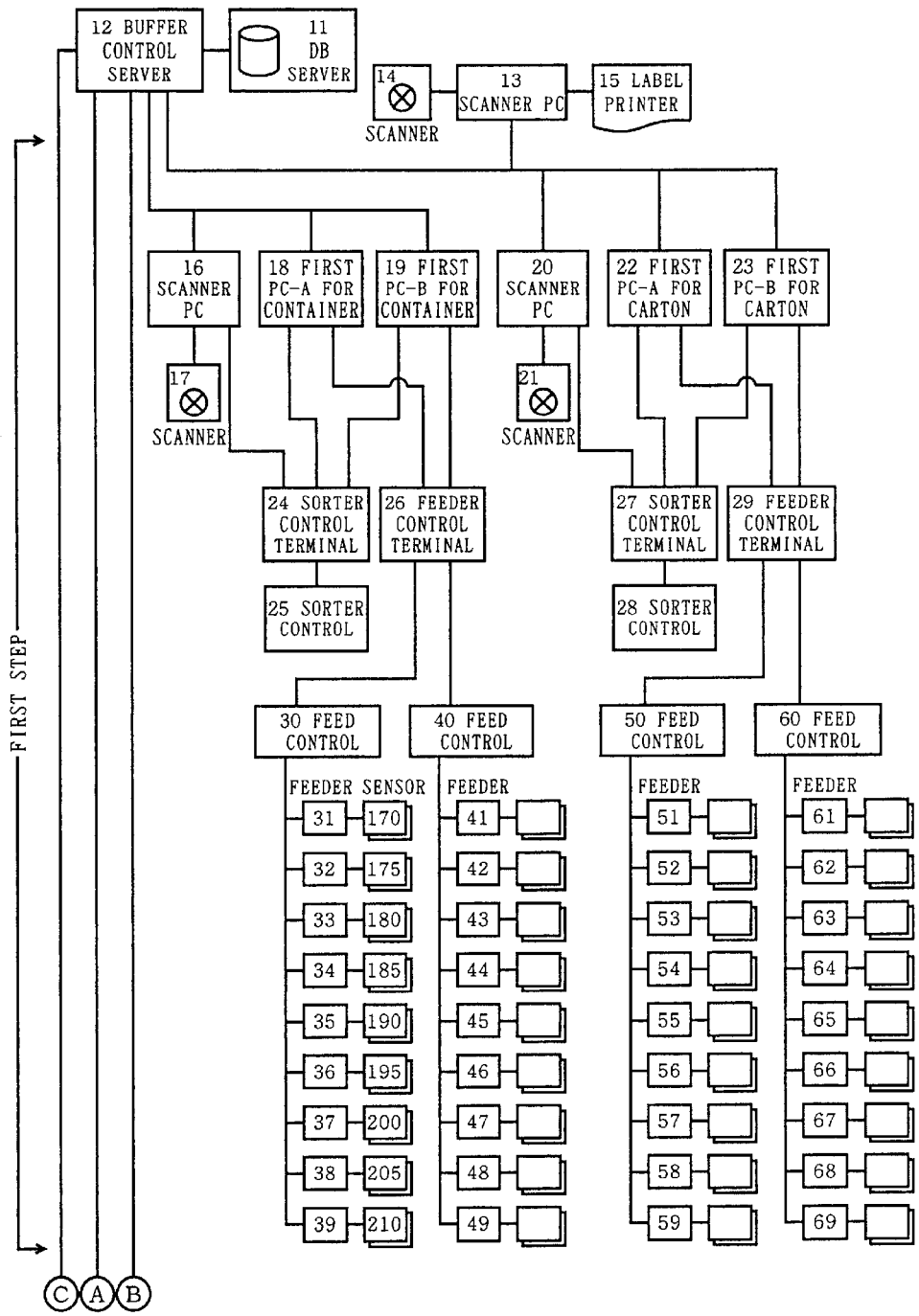
FIG. 31 is a block diagram for illustrating the composition of a control system of the shipment sorting system of this invention.
Figure 32:
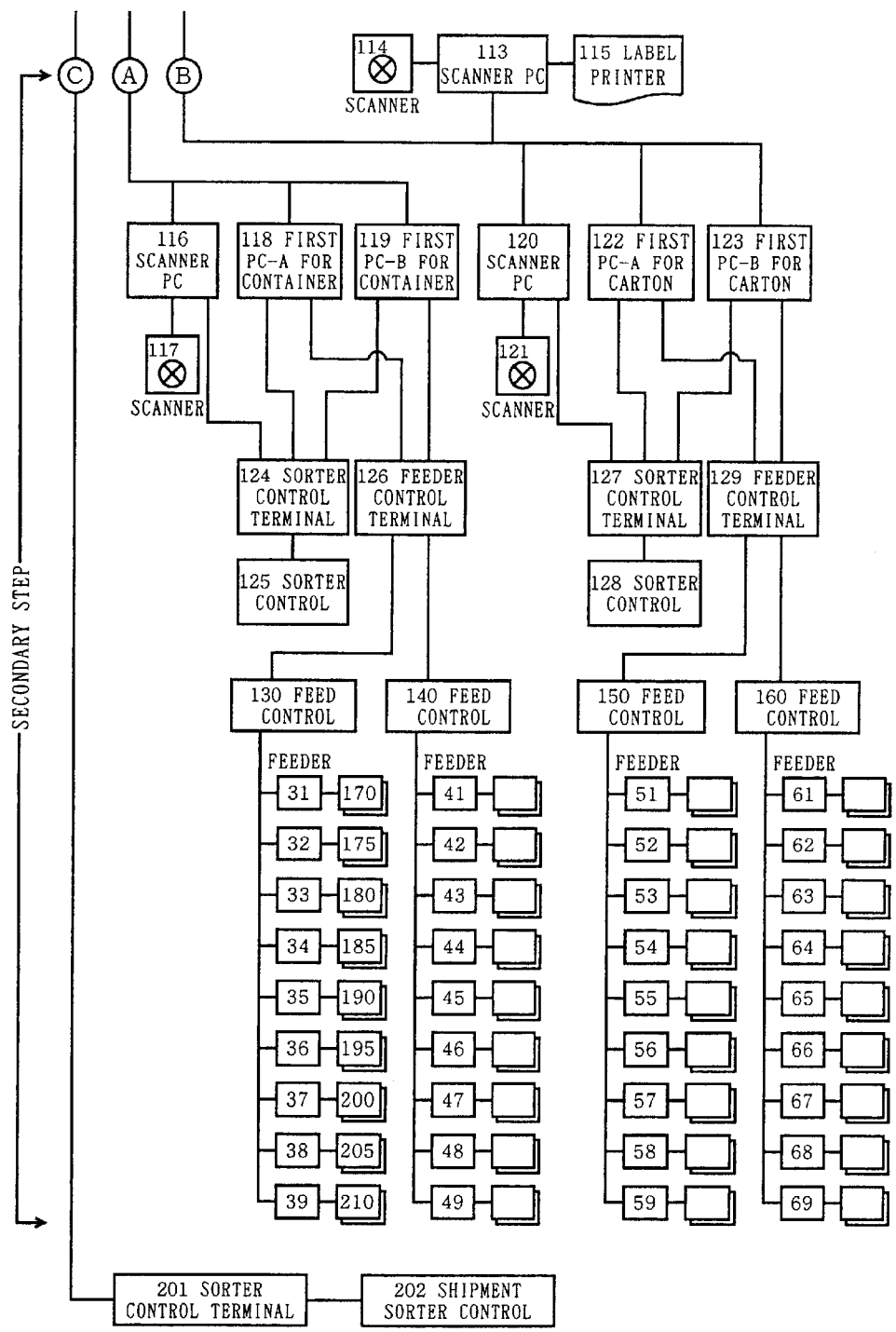
FIG. 32 is a block diagram for illustrating the composition of a control system of the shipment sorting system of this invention.

FIGS. 31 and 32 are block diagrams for illustrating the composition of a control system of the shipment sorting system of this invention. The first and second steps may be coalesced into one step. The number of subsystems may be determined dependent on the requirement for sorting packed goods, and the number of treated goods.

8) An Example of a Buffer Control Line for Shipment

FIG. 33 is a flat view of one example of a buffer control line incorporated in the shipment sorting system of this invention. This deals with goods contained in containers or cartons, comprises two columns, one of which is for the control of containers and the other for the control of cartons, and includes two buffer control lines for each column.

Accordingly, there are four lines between inflow areas and a shipment sorting area 404, that is, container first line 411-CO, carton first line 411-CA, container second line 412-CO, and carton second line 412-CA.

The first line 411 consists of a loop storage line 411a where cartons or containers may be circuited before storage, and of plural, parallel straight storage lines 411b connected to the loop storage line 411a where containers are stored.

The straight storage line 411b is divided into two sections: containers are assigned to different sections according to their weight and categories. If a section is filled with containers, excess containers may be stored in the loop storage line 411a.

Likewise, the second line 412 consists of a loop storage line 412a and plural straight storage lines 412b, and the output ends of straight storage lines 411b are connected to the loop storage line 412a.

At this second step, containers are stored in the straight storage line 412b according to their weight, purchaser, category and stacking priority. If the line is filled with containers, excess containers may be stored in the loop storage 412a.

The straight storage line 412b is provided with a return line 413. In case one of the straight storage lines becomes full, it acts as a bypass through which excess cargo may be returned through the loop storage line 412a to the other straight storage line for storage.

Containers stored in a straight storage line 412b are then transported to a shipment sorting area 414, where they are sorted by sorters according to purchasers, categories, and the order of stacking, discharged into a shoot line 414a, and automatically stacked by an auto-stacker 415 onto wheeled cages. Heavy containers A are sorted at a lower shipment sorting area while light containers B are sorted at an upper shipment sorting area.

[1] The first and second lines may be substituted for one line, provided that cargoes can be stacked regardless of their weight and the order of display. One of the buffer lines may be provided with a return line so that it may reuse and control the requirements for the next step.

[2] The loop line may be one, provided that the number of cargoes per unit time is sufficiently small.

[3] The column may be one, provided that the division of containers and cartons is not required, or provided that the cargoes to be handled are so small that they can be safely handled with one column.

[4] In the exemplary embodiment, the shipment sorting area consists of upper and lower areas, but they may be substituted for one area, provided that requirements are not stern.

[5] The control system controlling the delivery of containers and the counterpart for cartons are connected to each other through loop lines, and can substitute for each other in case one of the two control system fails.

9) Variants of the System

This system comprises plural loop lines: one of the loop lines is used as a buffer where cargoes are checked whether they meet given requirements, and, when they are found to meet the requirements, they are delivered to a shipment sorting line, while a combination of the loop lines are used for checking cargoes whether they meet complex requirements concerning sorting and stacking, as well as facilitate speedy handling.

Accordingly, the system of this invention is not limited to such a system as depicted in FIG. 33, but can be modified or simplified in various ways according to given requirements for stacking.

9-1) Loop Mode

FIG. 34 is a schematic flat view of a buffer control line based on a loop used in the shipment sorting system of this invention. FIG. 34A is an embodiment where a loop line 416 is connected to a shipment sorting line 414, and the loop line 416 can store many cargoes such as containers to ease their sorting.

FIG. 34B is another embodiment where duplicate loops exist; one loop 416 returns to the stem after depicting a loop and the other 417 returns through a shipment sorting area to the stem.

9-2) Main Loop/Sub-loop Mode

This is a high-performance variant of the system of FIG. 34B where sub-loop lines are introduced in the loop lines so that cargoes may be further divided according to the areas to which they will be delivered.

Figure 35:
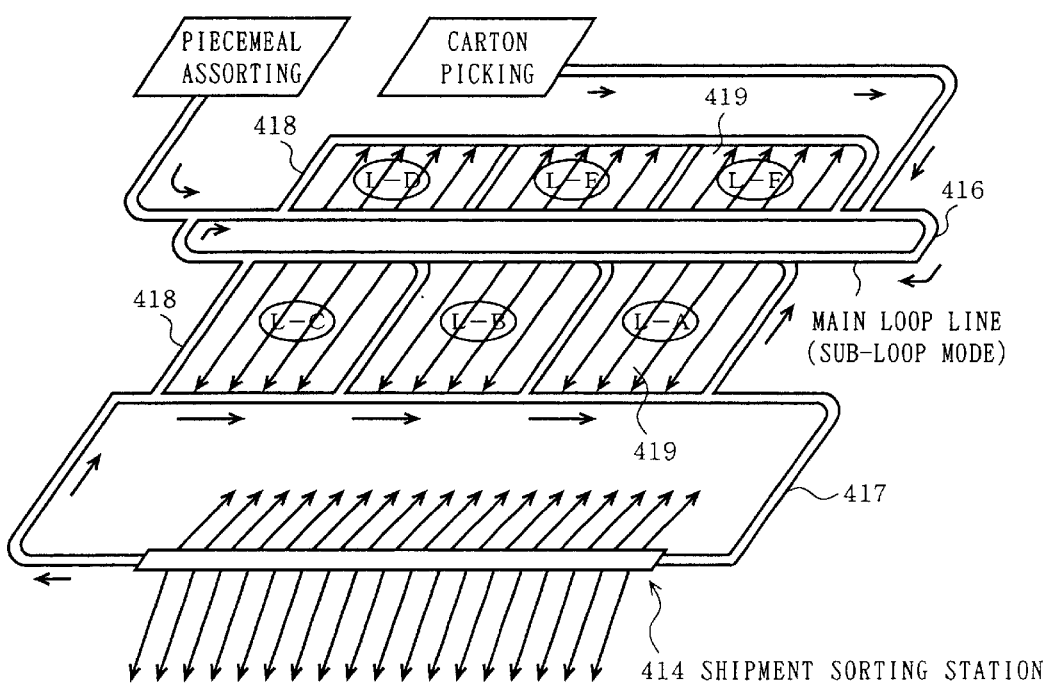
FIG. 35 is a schematic flat view of a system comprising a main loop line and sub-loop lines incorporated in a buffer control line of the shipment sorting system of this invention.

FIG. 35 is a schematic flat view of a system comprising a main loop line and sub-loop lines incorporated in a buffer control line of the shipment sorting system of this invention.

As shown in the figure, in this system, two sub-loop lines 418 are connected to a main loop line 416, thereby forming six sub-loop areas 419 (L–A to L–F).

One of the sub-loop lines 418 is combined with the main loop line 416 and the shipment sorting loop line 417. Any number of sub-loop lines may be formed in the main loop line. The number of control lines in a sub-loop line may vary from one sub-loop line to another.

Figure 36:
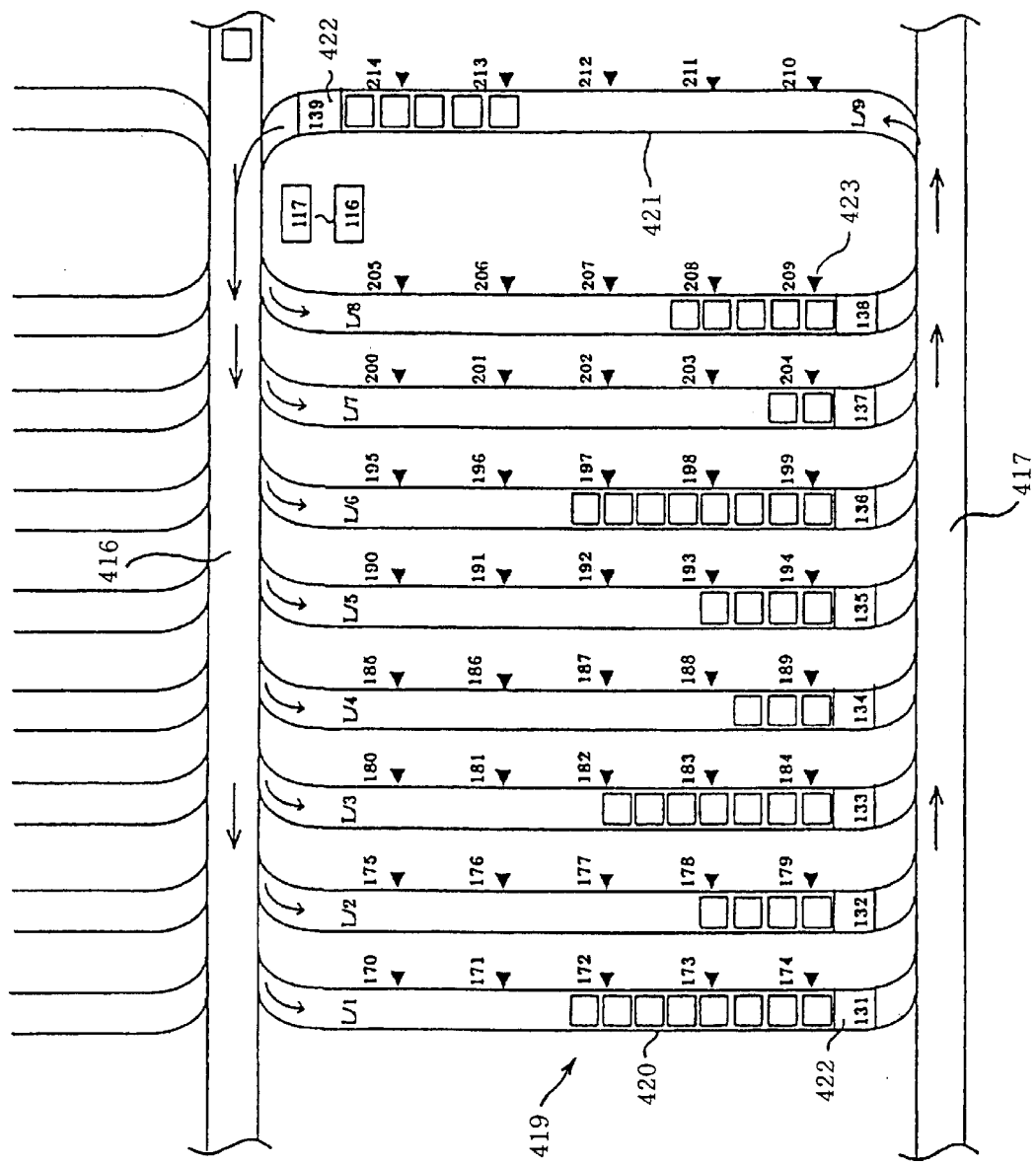
FIG. 36 is a schematic flat view of one example of the sub-loop line area as depicted in FIG. 35.

FIG. 36 is a schematic flat view of one example of the sub-loop line area as depicted in FIG. 35. As shown in the figure, a sub-loop area 419 consists of plural buffer storage lines 420 running in parallel and divided according to destination areas, and a return line 421 for a sub-loop.

At the exit of each line 420, 421, there is a discharging device 422, and along each line 420, 421, article sensors 423 are provided in its delivery direction such that a specified distance is inserted between the adjacent sensors.

The functions of the units and elements of the system as depicted in FIG. 36 are as follows.

[1] Primary sorting loop line: this is represented by the main loop line 416, and has a function to distribute cargoes to six sub-loop areas 419.

[2] Buffer storage line 420 divided by destination areas: cargoes primarily sorted at the main loop line 416 is stored here for further sorting. Transportation along this line may occur as a result of sliding over an inclined surface or being driven by a belt conveyor.

[3] Discharging device 422: this is a device to discharge cargoes from a buffer storage line to the shipment sorting loop line 417. This is not always required, provided that cargoes always moves on buffer storage lines through loop lines.

[4] Delivery line of the shipment sorting loop line 417: this is the line to control the delivery of cargoes discharged from buffer storage lines 420 to the shipment sorting area.

[5] Article sensor 423: this detects the passage of cargoes along a buffer storage line, to obtain data necessary for the management of stored cargoes and tracking of a target cargo. It can also be used for identifying the SEQ No. of a given cargo as needed.

[6] Return line 421 for sub-loops: containers and cartons, while being moved through loop line areas from one to another, are sorted to satisfy given requirements. This line functions as a link connecting one loop line area with another.

The sub-loop areas may be provided at both sides of the main loop or at one side. The number of sub-loop areas may be modified according to the sternness level of requirements. Further, the functions of sub-loop areas may not be the same but different: a special SEQing group of cargoes requiring stern handling may be stored in a sub-loop area dedicated for the purpose.

FIG. 37 is a block diagram of a variant of the sub-loop line areas as depicted in FIG. 35 in which different sub-loop areas treat respective requirements. In this particular example, six requirements are treated.

9-3) Multi-stage Mode

Figure 38:
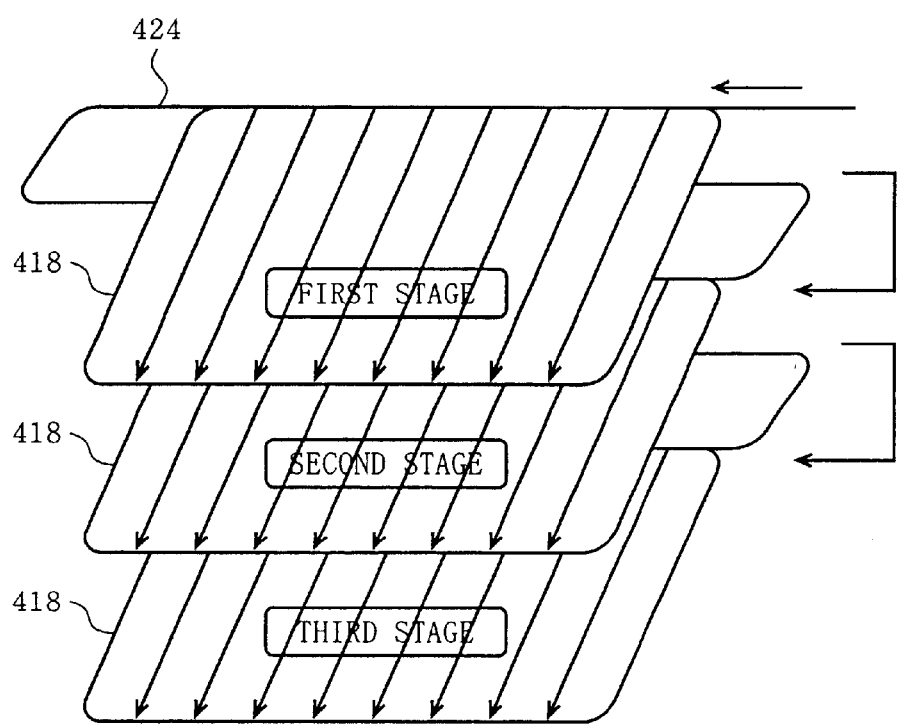
FIG. 38 is a schematic flat view of an exemplary multi-layered sub-loop line area incorporated in a buffer control line of the shipment sorting system of this invention.

FIG. 38 is a schematic flat view of an exemplary multi-layered sub-loop line area incorporated in a buffer control line of the shipment sorting system of this invention. In contrast with the aforementioned systems based on a combination of a main loop and sub-loops where sub-loop line areas are formed within the main loop line, this system comprises sub-loop lines placed one over another into a multi-layered structure.

To put it more specifically, on both the upper and lower surfaces of a main line 424, multiple layers of sub-loop lines 418 are overlaid. This system will make it possible to effectively use a vacant space formed in the upper section of a building of a distribution center.

9-4) Straight storage line midway return mode

Figure 40:
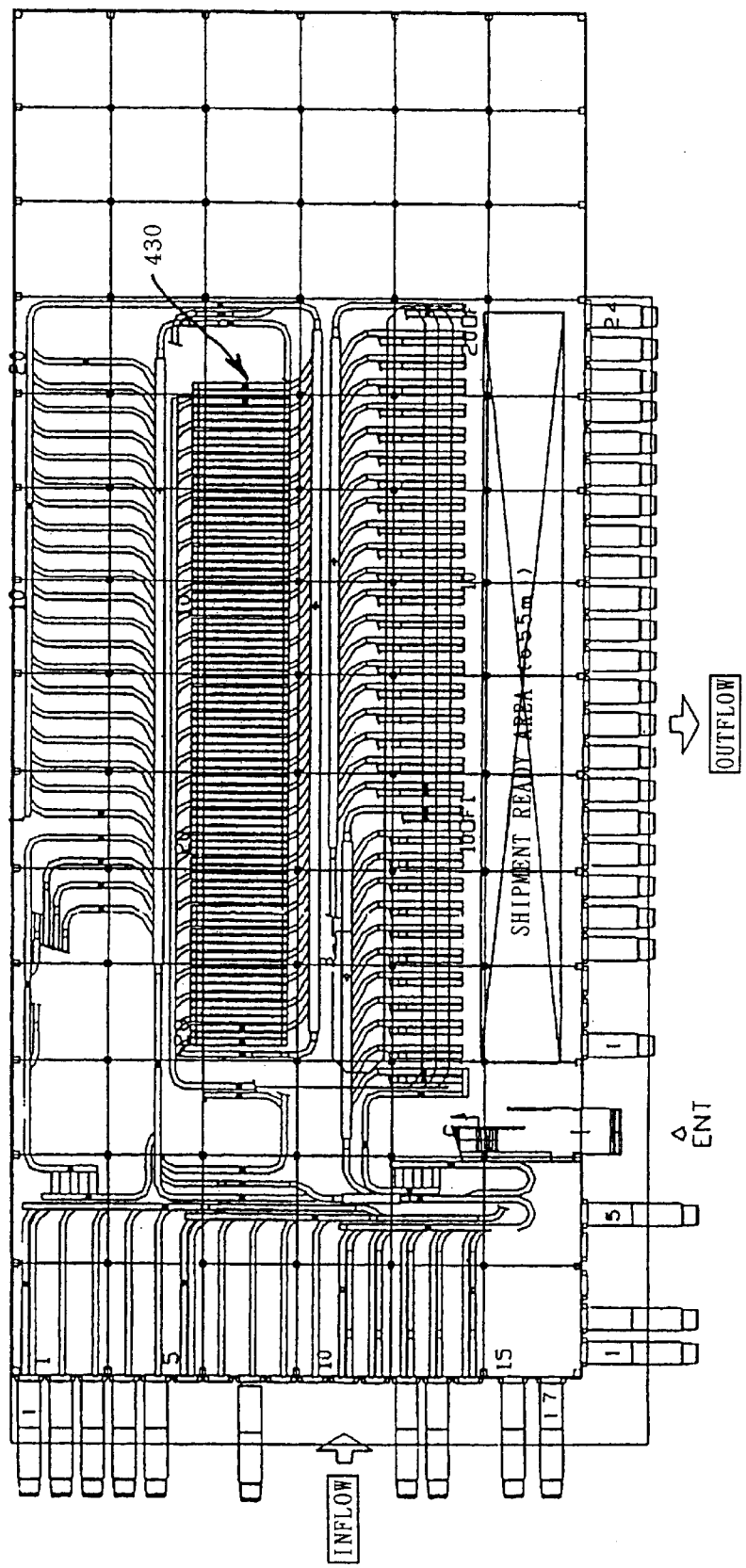
FIG. 40 is a flat view of an exemplary distribution center incorporating the buffer control line as depicted in FIG. 39.

FIG. 39 is a schematic flat view of a buffer control line comprising plural straight storage lines based on a midway return mode of the shipment sorting system of this invention. FIG. 40 is a flat view of an exemplary distribution center incorporating the buffer control line as depicted in FIG. 39.

The buffer control line as depicted in FIG. 39 is incorporated as a secondary line 430 at the shipment area of the distribution center of FIG. 40, and comprises multiple straight storage lines 433 running in parallel between inflow conveyors 431 and outflow conveyors 432.

For the lines 433, for example, every three lines are combined into a set; for such a set, a line 433a at the most upstream side is connected through an inflow junction 434 with an inflow conveyor 431; a line 433c at the most downstream side is connected through an outflow junction 435 with an outflow conveyor 432; the exit end of line 433a and the entry end of line 433b are connected with a crosslink 436, while the exit end of line 433b and the entry end of line 433c are connected with another cross-link 436; and therewith a continuous route is established for transportation of cargoes through the lines of the set.

Further, the exit end of the middle line 433b and the entry end of the upstream line 433a may be connected with a cross-link 436, thereby enabling cargoes on line 433b to return to line 433a.

Let us see what happens when containers enter this set of lines. Containers are carried to lines 433a and 433b; if containers are found to meet the requirements for sorting, they are carried from middle line 433b through line 433c to outflow conveyor 432 which carries them to a shipment sorting area; however, if the containers are found not to meet the requirements, they are returned from middle line 433b to the upstream line 433a.

The plural sets of numerous straight storage lines may be arranged into a multi-layered structure. The lines arranged into a multi-layered structure will have an advantage of ensuring a wide buffer storage space in a comparatively limited building space.

10) The Precedence of the System of this Invention Over the Conventional Method in Meeting the Above Requirements 10-1) Conventional Method A conventional system comprises multi-layered racks to store cargoes, shuttle carriers to send or fetch cargoes to/from the racks, and ladders to elevate or lower cargoes during hauling, manages containers and cartons according to the properties of goods contained therein, and automatically performs the storage and hauling of cargoes, and the delivery of cargoes to a shipment sorting area.

With this system, because the delivery of cargoes with a shuttle carrier occurs at a rate of one cargo per a shuttle carrier, the handling capacity of the system is very limited. If it be assumed that the system can store 1000 containers, and a shuttle carrier can handle a cargo in $1/1000$ hour, its handling speed will be 1000 cargoes/hour which is low.

Therefore, picking up and shipment must proceed in the timing to match this slow speed of 1000 cargoes/hour, and thus it is difficult for this system to handle a large quantity of goods. Moreover because this system further comprises a shuttle type delivery system, and vertically adjustable ladders, the investment for this system will be several times as high as that for the system of this invention based on a buffer line control mode, and its handling capacity will be $1/3$ to $1/5$ that of the latter.

If this system is used for handling 3000 to 5000 cargoes per hour, naturally three to five of it will be required.

10-2) Shipment sorting system of this invention

In contrast with the above conventional system, the system of this invention ensures following advantages.

[1] Sorting ability

With this system, storage of cargoes is stored based on the buffer line storage mode, and thus the sorting ability can be determined by the routing speed of cargoes through the line. Therefore, it is possible to match the sorting ability with the routing speed of cargoes, provided that the speed of cargo movement through the loop line is made equal to the speed of cargo movement through the exit line.

Let it be assumed for example that the speed of cargo movement through a line (routing speed) is 40 m/min, and that cargoes go one after another at a rate of one cargo/m, then, 2400 cargoes pass through this line in an hour. If the routing speed is 60 m/min, 3600 cargoes will pass; and if the routing speed is 100 m/min, the number will rise to 6000 cargoes. If a higher routing speed is desired, the main line and the exit line may be multiplied: if they are multiplied n times, the routing speed will be simply raised in proportion to n, but the extra cost required for the introduction of additional lines will be limited to that required for the introduction of the multiplicated lines.

[2] Cost Merit

Because this system introduces loaders with an inclined top platform at storage lines, it is possible to reduce the cost necessary for maintaining a unit storage capacity half to one ninth that of the conventional system.

Because with this system it is possible to increase its handling capacity several times by simply duplicating the main loop line and the discharge line, and by paying the extra cost required from the introduction of additional lines as mentioned just above, it is far more cost effective than the conventional system.

11) Sorting for Shipment

Figure 41A:
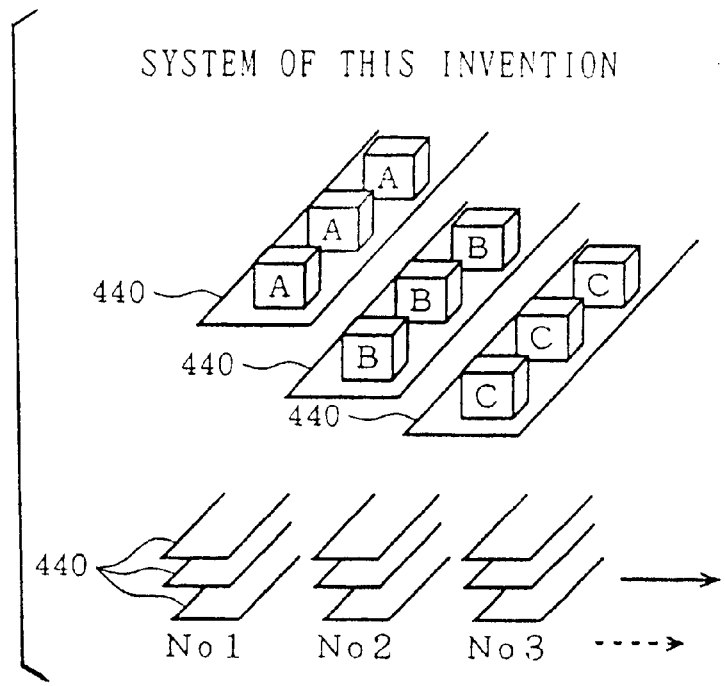
FIG. 41A is a perspective view of a shoot line at a shipment sorting area of this invention.
Figure 41B:
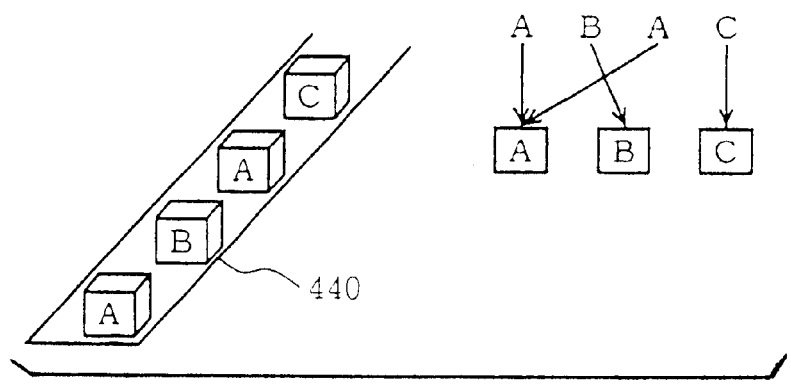
FIG. 41B is perspective and flat views of a shoot line of a conventional shipment sorting area.
Figure 42A:
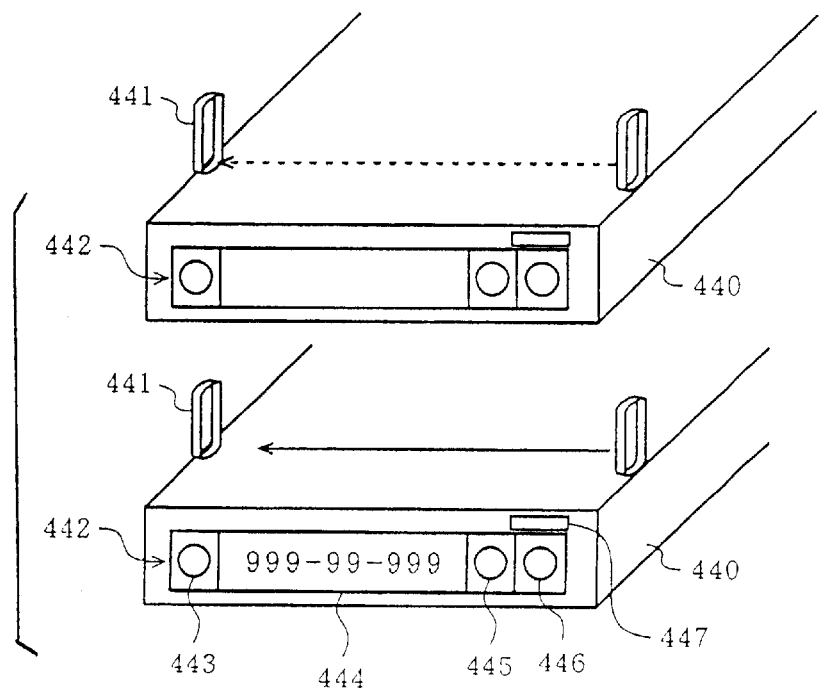
FIG. 42A is a perspective view of a sensor and a display device provided to the exit end of a multi-layered shoot line of this invention.
Figure 42B:
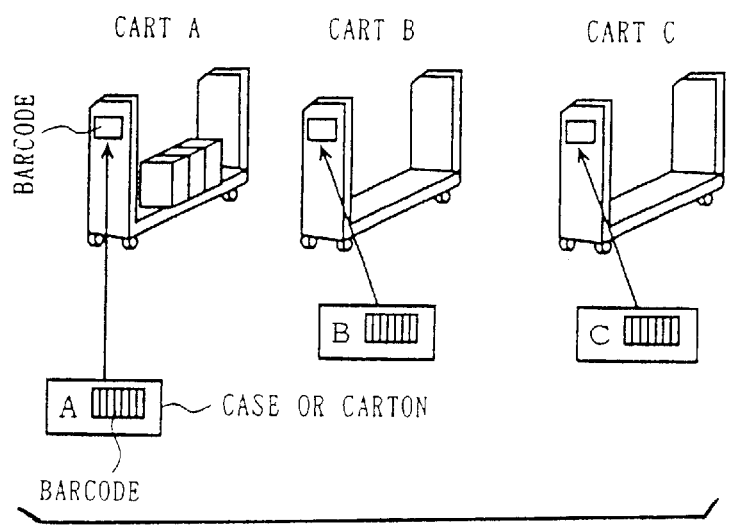
FIG. 42B is a perspective view of a handcart used in the conventional system.

FIG. 41A is a perspective view of a shoot line at a shipment sorting area of this invention; and FIG. 41B is perspective and flat views of a shoot line of a conventional shipment sorting area. FIG. 42A is a perspective view of a sensor and a display device provided to the entry of a multi-layered shoot line of this invention; and FIG. 42B is a perspective view of a handcart used in the conventional system.

As shown in FIG. 41, a number of shoot lines at a shipment sorting area are placed one over another into an array 440, and then the arrays are arranged in rows; and as shown in FIG. 42 to the entry of each array 440 is provided an article sensor 441 (transmission type or reflection type photoelectric sensor or infra-red ray sensor) to detect passage of cargoes, and a display device 442 to indicate the content of passing cargoes, and required works for them.

Let us assume that, with the conventional system as shown in FIG. 41B, cargoes A, B and C addressed to different purchasers come to a sorting area. Because the system has no mechanical means to separate cargoes A, B and C, cargoes A, B and C are mixed inadvertently on a shoot line 440, and thus a human sorter must sort them again, to load them to respective carts. Even if they are transferred to appropriate carts, the porter must check each of them for whether it is transferred to a right cart, by comparing the barcode of the cargo with the barcode of the cart as shown in FIG. 42B.

Because of this, the work efficiency remains very low. The work efficiency of the conventional system is 100–130 cargoes/man.hour because of loading and checking being cumbersome.

[1] Assume that similarly to above cargoes A, B and C come to a shoot line of the system of this invention as shown in FIG. 41A. The cargoes are sorted and sent to respective shoot lines for separate handling. Therefore, the need for resorting by the human sorter before the cargoes are transferred to carts can be successfully obviated.

[2] Because the need for resorting is obviated, transference of cargoes to carts is smoothened and the work efficiency is improved, which will reduced the cost involved in the wage of workers for the work.

[3] Because the system of this invention incorporates an article sensor and a display device at each entry of shooting line as shown in FIG. 42A, it can obviate the need for checking based on the use of a scanner as is observed in a conventional system. Because this system uses the sensor and display device in combination with the multiple shoot arrays (circulation sorting), transportation of cargoes will be facilitated; the work efficiency will be improved; and the work speed will be increased. These advantages will result in the reduced overall cost.

To put it more specifically, because the system uses the sensor and display device in combination with the multiple shoot arrays, the porter can transfer cargoes in the order of arrival to appropriated carts as instructed, and for this work he may only walk a short distance between the end of shoot lines and carts. This will bring a sharp increase in the work efficiency.

For example, with this system, the work efficiency as high as 500–550 cargoes/man.hour will be possible. Each shoot line may have two tails at the end so that two porters may handle cargoes slid down the shoot line. This will contribute to the improvement of work efficiency.

The display device 442 comprises a work instruction lamp 443, a digital indicator 444, a work check button 445, renewed display instruction button 446, and an alarm buzzer 447, and receives a detection signal from an article sensor 441, and data from a host computer. The functions of relevant elements are as follows.

[1] Article Sensor 441

It detects the passage of cargoes on an activated shoot line, and sends detection signals which are utilized as a material for the counting of delivered cargoes through the line. Or if it dispatches a detection signal from an inactivated line, that signal is utilized as indicating that the line is wrongly used.

[2] Work Instruction Lamp 443

Green: the line is activated or ready for the passage of cargoes (blinking light—line just activated, and continuous light—line under operation).

Yellow: the line will be activated next (passage of cargo being prohibited)(light—line's turn comes next).

Red: the line is inactivated but detects passage of a cargo (passage of cargo being prohibited)(light in combination with a buzzing sound—the line is wrongly used).

[3] Digital Indicator 444 Presents Followings:

a) Purchaser, b) Requirements for sorting, c) Number to be received, and remaining number, d) End of display as indicated by dimmed brightness.

The above items are differently defined by a number of digits, and their definitions may be varied as needed. The items may be indicated by different colors to improve visibility. The item c) is determined from the data sent by the relevant sensor, and is indicated on a real time basis.

[4] Work Check Button 445

Cart full button: a brief push notifies a previous cart is filled, and a new cart is ready. The push also activates the cart label of the new cart.

Printing a cart label: pressing over two seconds causes a cart label to be printed.

[5] Renewed Display Instruction Button 446 The total number to be received and the total number delivered: first push causes the total numbers of cargoes to be received divided by categories, and the total numbers delivered.

Total numbers delivered: the number of carts delivered is displayed.

[6] Alarm Buzzer

The alarm buzzer is activated if a sensor detects the passage of cargo through an inactivated line.

When work is over, the work instruction lamp 443 changes its color from green to red, and the digital indicator 444 becomes dim. If a cargo is passed through a wrong line, the work instruction lamp 443 gives a blinking red light, digital indicator 444 blinks, and alarm buzzer 447 gives an alarming sound.

Because the system of this invention is configured as above, it ensures following advantages.

1) Because this system comprises loop storage lines and straight storage lines, it becomes possible to transfer cargoes to carts at a shipment sorting area according to the order of their display at the purchasers' shops, thereby reducing the works and spaces necessary for display of goods at those shops.

2) Because the moving speed of cargoes along the loop storage line and the straight storage line can be made equal to the delivery speed of those cargoes at the exit, it becomes possible to easily and rapidly transfer cargoes to carts according to the purchaser, weight, category and order of display of those cargoes, thereby greatly improving the efficiency of sorting them.

3) Introduction of loop storage lines and straight storage lines can be performed by simply adding a necessary amount of conventional delivery lines to an existing system, which will require a small cost, as compared with the merits newly acquired. 4) If plural loop storage lines are combined for a joint operation, or if plural sub-loop areas are introduced, it will be possible to easily and rapidly sort cargoes for which stern requirements as regards sorting, stacking, etc. are imposed.

5) Because this system allows cargoes to be placed in shoot lines according to the sorting requirements imposed on the cargoes, the system can dispense with resorting often required for the conventional system dependent on a single shoot line where cargoes, in spite of being once sorted, are intermingled inadvertently. Moreover, because this system has a sensor and a display provided to each exit of shoot line, it can obviate the need for the conventional checking based on a scanner, and thus will make it possible to accelerate the delivery of cargoes, and to reduce human cost required for the work.

Fifth Embodiment

Figure 43:
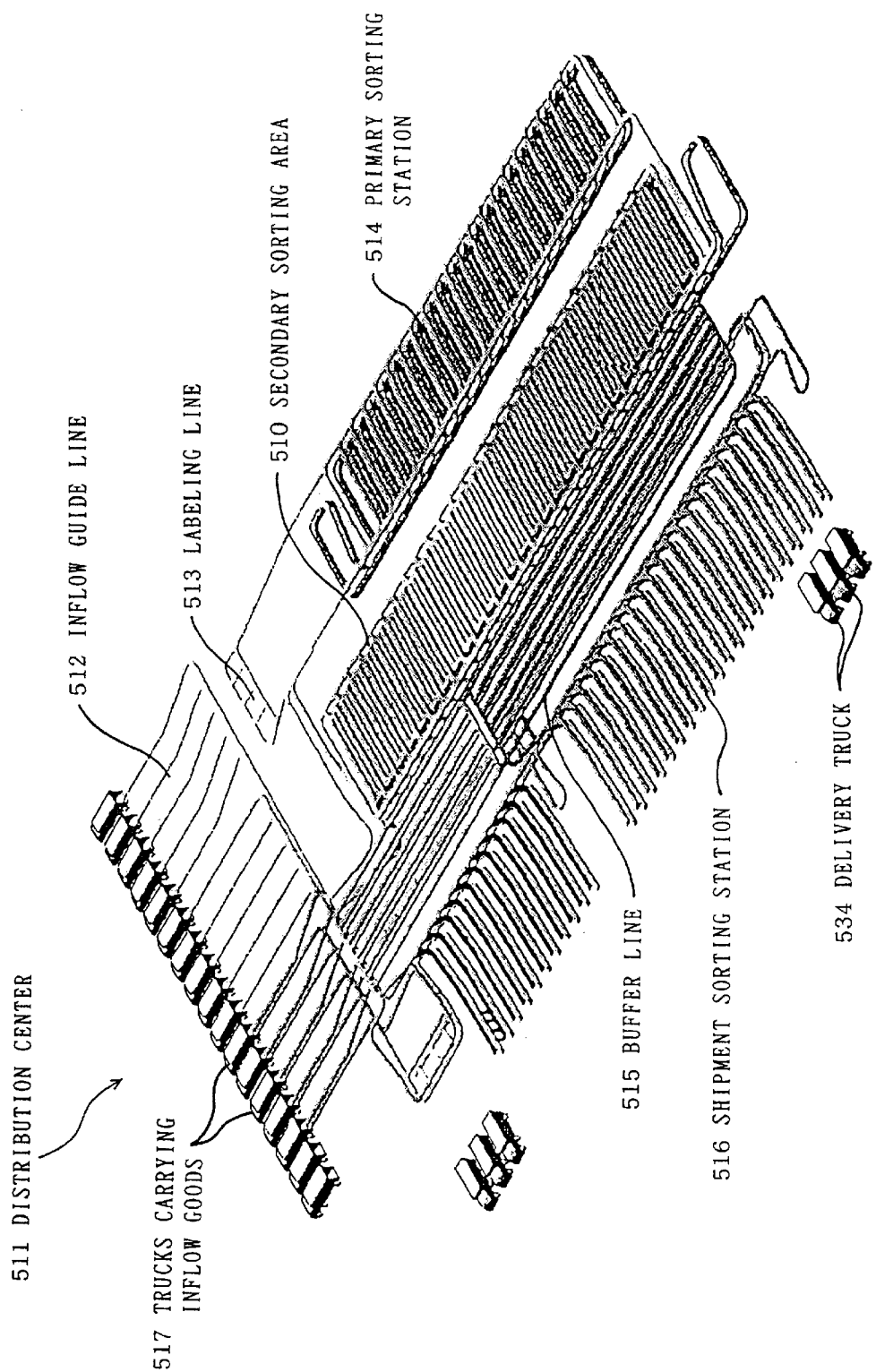
FIG. 43 is a perspective view of the route lines of a distribution center with a secondary sorting station representing an embodiment of this invention.

FIG. 43 is a perspective view of the route lines of a distribution center with a secondary sorting station representing an embodiment of this invention. As shown in the figure, a secondary sorting station (sorting section) 510 occupies a section of the distribution (transportation) center 511, and is inserted into a network of route lines spreading over the entire surface of the distribution center.

The distribution center 511 is a center to which goods (cargoes) from vendors concentrate, and from which goods are distributed to retailers such as supermarkets and convenience stores according to their purchase orders.

Goods flowing in the center 511 are passed through route lines; during passage necessary amounts of goods are separated and sorted according to the orders of their purchasers; and the sorted cargoes are distributed from the center 511 through delivery trucks to the purchasers.

This distribution center 511 has, in addition to the secondary sorting station 510, an inflow guide line 512, a labeling line 513, a primary sorting station 514, a buffer line 515, and a shipment sorting station 516 provided along the network of route lines consisting of conveyors.

FIG. 44 illustrates the outline of the inflow guide line of FIG. 43: FIG. 44A is a perspective view; and FIG. 44B a schematic diagram. As shown in the figure, the inflow guide line 512 is an introductory part for the inflow goods from vendors: goods from the trucks 517 sent by vendors are transferred to route lines (see FIG. 44A).

The inflow line consists, for example, of 15 lines (a to o): every five lines are combined into a group and thus three groups (a to e, f to j, and k to o) result. Because the lines k to o contain two conveyors each, they can accommodate many goods that concentrate in a short time. The lines are combined by groups, and finally merge into one common line (see FIG. 44B).

Checking of goods (commercial articles) is carried out by applying a scanner to the label stuck on the good itself, or on its container which may carry a barcode, two-dimensional code, or IC (Integrated Circuit) chip. If a good is found, as a result of checking, to have no ID data, it is sent to the labeling line 513.

FIG. 45 is a perspective view for illustrating the outline of the labeling line of FIG. 43. As shown in the figure, the label printer W sticks shipment labels (Shipping Container/Carton Marking Label or SCM label) to goods P sent from the inflow guide line 512 to the labeling line 513. The goods P are then sent through a route line to the primary sorting station 514.

Figure 46A:
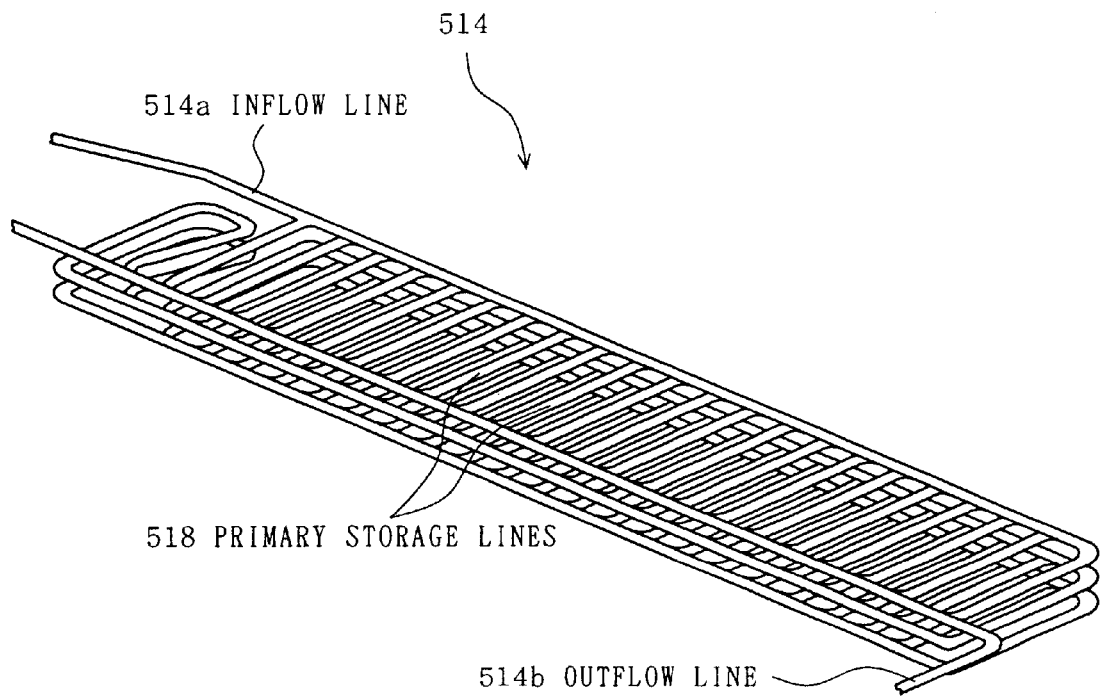
FIG. 46A is a perspective view and FIG. 46B a schematic diagram.
Figure 46B:
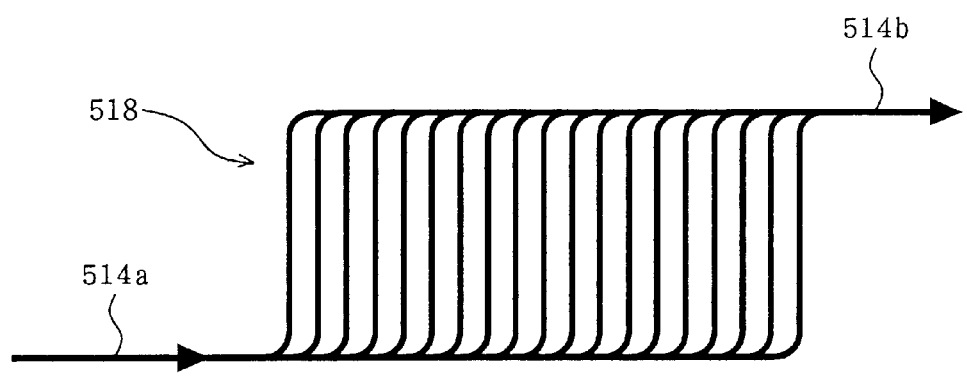
FIG. 46 illustrates the outline of the primary sorting station of FIG. 43.

FIG. 46 illustrates the outline of the primary sorting station of FIG. 43: FIG. 46A is a perspective view and FIG. 46B a schematic diagram. As shown in the figure, goods sent from the inflow guide line 512 and the labeling line 513 receive the first sorting (primary sorting) at this primary sorting station 514.

Goods flowing through an inflow line 514*a* into the primary sorting station 514 are temporarily stored at a primary storage line 518 connected to the inflow line 514*a* to receive sorting later.

The inflow line 514*a* consists of plural lines because of improved sorting ability, and in case any one of them ceases to work on account of a system failure. The primary storage line 518 may comprise plural lines correspondent with those of the inflow line.

The primary storage line may consist of a conveyor based on inclined rollers or of a motor-driven conveyor. The primary storage lines 518 are connected through respective junctions (not illustrated here) with an exit line 514*b*; and goods stored in the primary storage lines 518 are sent, the outflow being adjusted at respective junctions, towards the exit line 514*b* to merge.

FIG. 47 illustrates the outline of the secondary sorting station of FIG. 43: FIG. 47A is a perspective view and FIG. 47B a schematic diagram. As shown in the figure, goods sent from the primary sorting station 514 to the secondary sorting station 510 receives a secondary sorting there in the same manner as in the first sorting.

The secondary sorting elaborates the first sorting: goods sorted according to the purchasers in the first sorting are further sorted according to respective purchasers. The secondary sorting also includes buffering.

Goods P entering, from the exit line 514b of the primary sorting station 514, into the inflow line 510a to the secondary sorting line 510 are temporarily stored in secondary storage lines 519 which compose the secondary sorting station 510 (see FIG. 47A).

Three secondary storage lines 519 each of which consists of, for example, a motor-driven conveyor constitute a unit wherein, for example, a first line 519a, second line 519b and third line 519c are connected in series from upstream to down, with a 180 degree bend inserted between the downstream end of the forgoing line and the upstream end of the subsequent line (see FIG. 47B).

Goods P flowing from the inflow line 510a into the first line 519a moves in a direction; when they enter the second line 519b, they take the opposite direction; and when they come to the junction between the second line 519b and the third line 519c, it is determined whether they should be returned to the first line 519a or further sent to the third line 519c (see FIG. 47B).

If goods carried to the junction in question are found to meet the requirements imposed on them in advance, they will be sent to the third line 519c, and move in the opposite direction to that of the second line 519b. If they could not meet the requirements, they will be returned to the first line 519a, and move again on the first line 519a.

Provided that goods P meet the requirements, they are allowed to flow as far as a shipment shoot line or a buffer line (see arrows (1), (2), (3), (4) and (5) of FIG. 47), while if they could not meet the requirements, they will only circulate within the same unit of lines (see arrows (1), (2), (3) and (6) of FIG. 47).

The secondary storage lines 519 are connected through respective junctions (not illustrated here) with an exit line 510b; and goods delivered to the third line 519c are sent, the outflow being adjusted at the junction, towards the exit line 510b to merge (see FIGS. 47A and 47B).

As shown above, at the secondary sorting station 510, goods which meet the initial requirements are temporarily stored and sorting is made such that, out of the stored goods, those that meet subsequent requirements are sent in order to subsequent steps.

Sorting at the secondary sorting station 510 takes place at three stages: firstly, goods are sorted according to their storage temperatures; secondly, goods are divided according to the kind of case containing them, that is, cartons and containers; and thirdly goods are sorted according to their weight. This three stage sorting is applied to any given good to classify it to an appropriate address.

Take as an example a case where goods which have been sorted as belonging to the same category but are different in shape come to the station. The sorter may return them to a foregoing line; the goods will circulate within the same unit of lines; during circulation they are grouped with new inflow goods belonging to the same category and having the same shape; and then such groups of goods are selected for temporary storage.

In short, the station 510 comprises the circuit line and the delivery line, and sends only the goods that meet the specified requirements to the delivery line.

The number of the units of line constituting the secondary sorting station 510 may vary according to the quantity of goods to be handled. The embodiment of FIG. 43 has a three-layered structure each comprising 28 units.

Each of the 28 units can arbitrarily choose the requirement for goods it must check before it allows the passage of goods. If a certain unit checks goods whether they meet a certain requirement before it allows goods to pass through, and goods that must meet the same requirement increase suddenly, that unit may be increased in number. In this way, it is possible to increase or decrease the number of units in accordance with the number of goods required for meeting different requirements.

Sorting of goods is made according to the property of goods, the shape of their cases, their purchasers, etc. The criteria for example include followings.

They are: delivery vehicles, the order of departure of delivery vehicles, delivery routes, purchasers, sections of the purchaser's shop (temporary storage in the backroom or display for sale), categories, rows of display racks, layers of display racks, order of display, whether they are a material or a product, their storage temperatures (for example 0° C. and 8° C.), whether or not they can be delivered in the same vehicle in spite of their having to be stored at different temperatures, their fragility or robustness, the shape of their cases (cardboard cartons, foldable plastic containers, or stackable containers), etc.

Goods passing through the secondary sorting station 510 comes to the buffer line 515 and then to the shipment sorting station 516. An exemplary buffer control performed at the buffer line 515 (see FIG. 43) will be described below.

FIG. 48 is a diagram for illustrating the operation of an exemplary buffer control. This system comprises two buffer columns for the control of containers and cartons each being subdivided into first and second buffer sections.

Thus, the system comprises four lines: a first container line 520, a first carton line 521, a second container line 522 and a second carton line 523.

The first lines 520, 521 comprise loop storage lines for storing containers and cartons respectively while allowing cargoes to circulate along the lines, and straight storage lines 524b for storing cargoes connected to the loop storage lines 524a.

The straight storage line 524b is subdivided into two groups (A, B); cargoes are assigned to one of the two groups according to their weight; and if one group of straight storage lines is filled, excess goods are sent to the loop storage line 524a.

The second lines 522, 523 similarly comprise loop storage lines 525a, and straight storage lines 525b, and the exit ends of the straight storage lines 524b of the first lines 520, 521 are connected to the loop storage line 525a.

Cargoes are stored at the secondary lines 522, 523, after being sorted according to their weight (A, B), purchasers, categories, and the order of stacking. The straight storage lines 525b has a return line so that, if a line is full, cargoes sent to that line may be sent through the loop storage line 525a to another line having a room.

Cargoes, after having been stored in a straight storage line, are sent through a buffer line 516a for shipment sorting to the shipment sorting station 516.

The first lines 520, 521 and second lines 522, 523 may comprise one line each, if goods does not need to be sorted according to the weight or the order of display. Or, the buffer system may be reused as appropriate, or the number of loop lines and columns may be varied arbitrarily according to given conditions.

In sorting cargoes heading towards the shipment sorting station 516, multiple loop lines instead of single loop line may be introduced to be combined so that cargoes requiring complicated sorting may be sorted efficiently and speedily.

The system may be simplified if the requirements imposed on cargoes as regards the handling quantity, sorting quantity, and stacking are moderated.

FIG. 49 illustrates the concept of another buffer control based on a loop mode. The control is based on a complex loop based on the combination of the shipment sorting station 516 and a loop storage line 526. If the shipment sorting station has a sufficient capacity, it can also incorporates a loop storage line 526 in its sorting line.

FIG. 50 illustrates the concept of a still other buffer control based on a main loop/sub-loop mode. This is a high-performance variant of the system of FIG. 49 where sub-loop lines are introduced in the loop lines. In this particular example, two sub-loop lines 528 are connected to a main loop line 527 so that six sub-loop areas may be formed to be used for further fine sorting.

FIG. 51 illustrates the concept of a still other buffer control based on a multi-stage mode. In contrast with the control based on a main loop/sub-loop mode of FIG. 50 where sub-loop line areas are formed within a main loop line, this system comprises sub-loop lines 528 placed one over another into a multi-layered structure. This system will make it possible to effectively use a vacant space in the upper section of a building of a distribution center.

Figure 52:
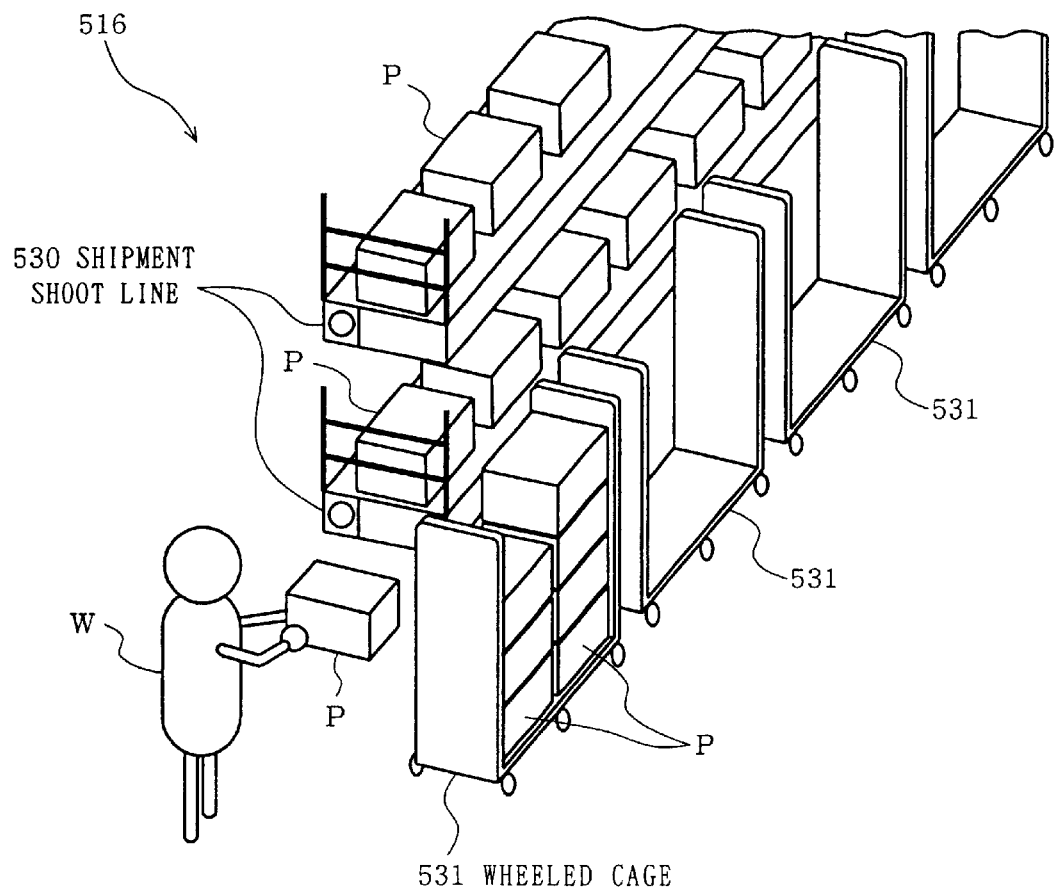
FIG. 52 is a perspective view for illustrating the outline of the shipment sorting station of FIG. 43.

FIG. 52 is a perspective view for illustrating the outline of the shipment sorting station of FIG. 43. As shown in the figure, cargoes sent from the secondary sorting line 510 through the buffer line 515 receives final sorting at this shipment sorting station 516.

Cargoes sent from the buffer line 515 through route lines enter the shipment sorting station 516; cargoes are transferred from the ends of shipment shoot lines 530 to wheeled cages 531 by the porters working at the shipment sorting station 516 in synchrony with the outflow of cargoes; or cargoes are carried through an extended line of the shipment sorting station directly to a truck.

The shipment sorting station 516 has multiple rows of shipment shoot lines arranged in parallel (with the embodiment shown in the figure, a row consists of two layers); and at the end of each shoot line 530, the data of cargoes P are indicated on display.

FIG. 53 is a perspective view of the end of a shipment shoot line of FIG. 52. As shown in FIG. 52, at the exit end of each shoot line 530 there are provided an article sensor (detection means) 532 and a display (display means) 533.

The article sensor 532 detects the passage of cargoes P on an activated shoot line 530. The detection signals are used for calculating the stored amount of cargoes P, or, if the signal is dispatched from an inactivated shoot line, to release an alarm for warning.

The display device 533 comprises a work instruction lamp 533a, a digital indicator 533b, a work check button 533c, renewed display instruction button 533d, and an alarm buzzer 533e, and displays a detection result of an article sensor 532.

The work instruction lamp 533a signals the start of sorting, work instruction, and the wrong activation of an inactive line; the digital indicator 533b indicates the purchaser, sorting requirement, current quantity, stored quantity, and completion of shipment for a given cargo; the work check button 533c signals the fullness of a cart and the label data of a cart; the renewed display instruction button 533d causes lists of the total amounts of cargoes to be shipped by categories and the total amounts of cargoes currently shipped to be displayed; and the alarm buzzer 533e emits a warning sound (alarm) in cooperation with the article sensor 532.

Because displaying, checking and sorting functions are combined as above, it is possible for the porter to meet the sorting requirements of individual cargoes P by simply transferring cargoes shoved at the end of each shipment shoot line 530 in the order of arrival to wheeled cages 531 close to the shoot line 530 in accordance with the data indicated on display. Because transference of cargoes P takes place at a short distance between the end of a shoot line 530 and a wheeled cage 531, the work efficiency will be sharply improved.

Because this system allows multi-layered shoot lines 530 to be assigned to cargoes on which different requirements are imposed, the system can dispense with resorting often required for the conventional system dependent on a single shoot line where cargoes (commercial articles), in spite of being once sorted, are intermingled inadvertently.

As a result, it becomes possible to rapidly transfer cargoes to carts, to improve workability thereby speeding up the portage, and to reduce the number of required porters. Moreover, introduction of the secondary sorting station 510 based on a circulation sorting which dispenses with resorting improves the accuracy of cargo transfer; checking not based on the use of a scanner as in the conventional system improves workability thereby speeding up checking; and overall it is possible to reduce human cost.

Cargoes P are transferred in order from shipment shoot lines 530 to wheeled cages 531; when a wheeled cage 531 becomes full with cargoes destined to the same purchaser, the wheeled cage 531 is transferred to a delivery truck 524 (see FIG. 43) assigned to a certain delivery route; and when the truck reaches a purchaser's shop, the wheeled cage containing cargoes P destined to that purchaser is removed and delivered to the purchaser's shop.

In a distribution center 512 incorporating the systems according to this invention, cargoes are handled, throughout all processes from picking up to transference to wheeled cages 531, in groups divided by their purchasers and categories, it will be necessary to also divide involved works in the same groups, considering the work efficiency.

Take as an illustration a distribution center which delivers goods to 50 purchasers daily, includes 10 shoot lines, and sorts goods under 15 categories. Then, if goods are handled in groups, they must be grouped by every three categories. Otherwise, delivery of goods would meet a confusion.

Sorting of cargoes P is achieved based on automatic allocation: a group of cargoes will be automatically assigned to an appropriate number of sorting lines, based on the numbers of current cargoes and of previously handled cargoes of that group.

As mentioned above, introduction of the secondary sorting center enables a multi-stage sorting whereby cargoes receive sorting not only during passage through routing lines but also at the additional sorting area. Cargoes, if they do not meet their specified requirements, are returned to an upstream routing line to circulate through the line where they are further sorted according to a requirement determined for that line on a real time basis.

For a given cargo, it is checked whether it may be discharged into a downstream line because it meets its specified requirement or it must be returned to an upstream line to circulate, and according to the result of check, the cargo may circulate through an upstream loop or may be discharged into a downstream line.

According to this invention, a distribution center which receives cargoes coming at random and must efficiently distribute them to purchasers, can introduce requirements for cargo sorting as appropriate, for example, sort cargoes giving the first priority on their temperature requirements, transfer cargoes sorted according to the arbitrarily chosen requirements to carts, and deliver cargoes to their purchasers.

Such arbitrarily introduced requirements may be numerous. However, introduction of the secondary sorting station 510 and the buffer line 515 capable of sorting cargoes according to their requirements will make it possible to rapidly and efficiently sort a large quantity of cargoes (goods), which will help the distribution center to speedily sort cargoes according to their purchasers and to reduce cost involved in sorting.

Material handling equipment provided to the primary and secondary sorting stations 514 and 510 has a function to manage information as follows.

The material handling equipment has functions to sort cargoes in multiple groups according to their requirements; to serve as a buffer; to guide cargoes into a routing line according to the kind of requirements they meet; and to circulate cargoes. For achieving these functions, it manages information regarding the sorting of cargoes in multiple groups according to their requirements, storage of cargoes classified by areas and lines, control of route junctions classified by lines, and control of circulation.

If such material handling equipment successfully achieves these functions by managing the information, it will be possible, for example, for the first storage lines 518 of a first sorting station 514 (see FIG. 46B) to have a three layered structure each layer containing 20 lines, thus totaling 60 lines; and for the secondary storage lines 519 of a secondary sorting station 510 to have a three layered structure each layer containing 3×3 (3 lines per unit) lines plus 1 circulation loop line totaling 28 lines, thus overall 84 lines.

Then, the primary sorting station 514 will be able to store about 1200 to 1800 cargoes and the secondary sorting station 510 to store about 4500 to 6700 cargoes at any one time.

Sorting at the secondary sorting station 510 may be achieved through the control of a hardware resource such as a computer based on the use of a recording medium recording a sorting program as described above.

As seen from above, according to this invention, cargoes conveyed through a routing line are sorted according to their specified requirements; if they are found not to meet the requirements, they are returned to an upstream line to circulate, and there they are further sorted according to a requirement assigned to the circulation line; and in this way cargoes receive a multiple-stage sorting, that is, cargoes are repeatedly sorted for each of their specified requirements.

The secondary sorting station 510 has a loop line through which cargoes circulate and a discharge line through which cargoes are sent outside; and cargoes that meet their specified requirements will be sent to a next step. Therefore, cargoes discharged from the secondary sorting station 510 may have been sorted according to following factors: whether they will be displayed for sale or stored in the backroom of the purchaser's shop; their temperature requirement; their scheduled location on the display rack; their fragility or robustness (stacking requirement); their weight, etc. Moreover, cargoes will be transferred to delivery trucks with due attention being paid to the properties of goods contained in them, the shape of their cases, etc.

Accordingly, with the system of this invention, it will be possible to avoid such careless handling of goods as follows: placing a plastic container over a cardboard carton; placing a heavy good over a light good; mixing a good to be displayed with a good to be stored in the backroom; mixing a good to be stored frozen with a good to be stored cooled; and mixing a good to be displayed on a rack with a good to be displayed on another.

By virtue of this, when the purchaser receives goods, he will be relieved of the necessity of resorting them according to their properties and the shape of their cases, and can avoid, for example, the risk of exposing fresh goods requiring freezing or refrigerating for storage to room temperature without due attention being paid because of his being busy in resorting and arranging other goods to display racks or to the backroom.

Incidentally, the above embodiment incorporates a secondary sorting station 510 consisting of a three layered structure each layer containing 28 units of lines, but the secondary sorting station 510 is not limited to such a three-layered structure, but may include any desired number of layers and any desired number of units for each layer.

The requirements according to which sorting is achieved at the secondary sorting station 510 are not limited to those mentioned above, but may include any conditions and requirements imposed by the cargoes handled and the purchasers under contract.

As seen from above, according to this invention, cargoes conveyed through a routing line are sorted according to their specified requirements; if they are found not to meet the requirements, they are returned to an upstream line to circulate, and there they are further sorted according to a requirement assigned to the circulation line; and in this way cargoes are repeatedly sorted until they fully meet their specified requirements. Therefore, cargoes can be sorted according to following factors: whether they will be displayed for sale or stored in the backroom of the purchaser's shop; their temperature requirement; their scheduled location on the display rack; their fragility or robustness (stacking requirement); their weight, etc. Moreover, cargoes will be transferred to delivery trucks with due attention being paid to the properties of goods contained in them, the shape of their cases, etc.

By virtue of this, when the purchaser receives goods, he will be relieved of the necessity of resorting them, and can avoid, for example, the risk of exposing fresh goods requiring freezing or refrigerating for storage to room temperature without due attention being paid to them.

Sixth Embodiment

Figure 54:
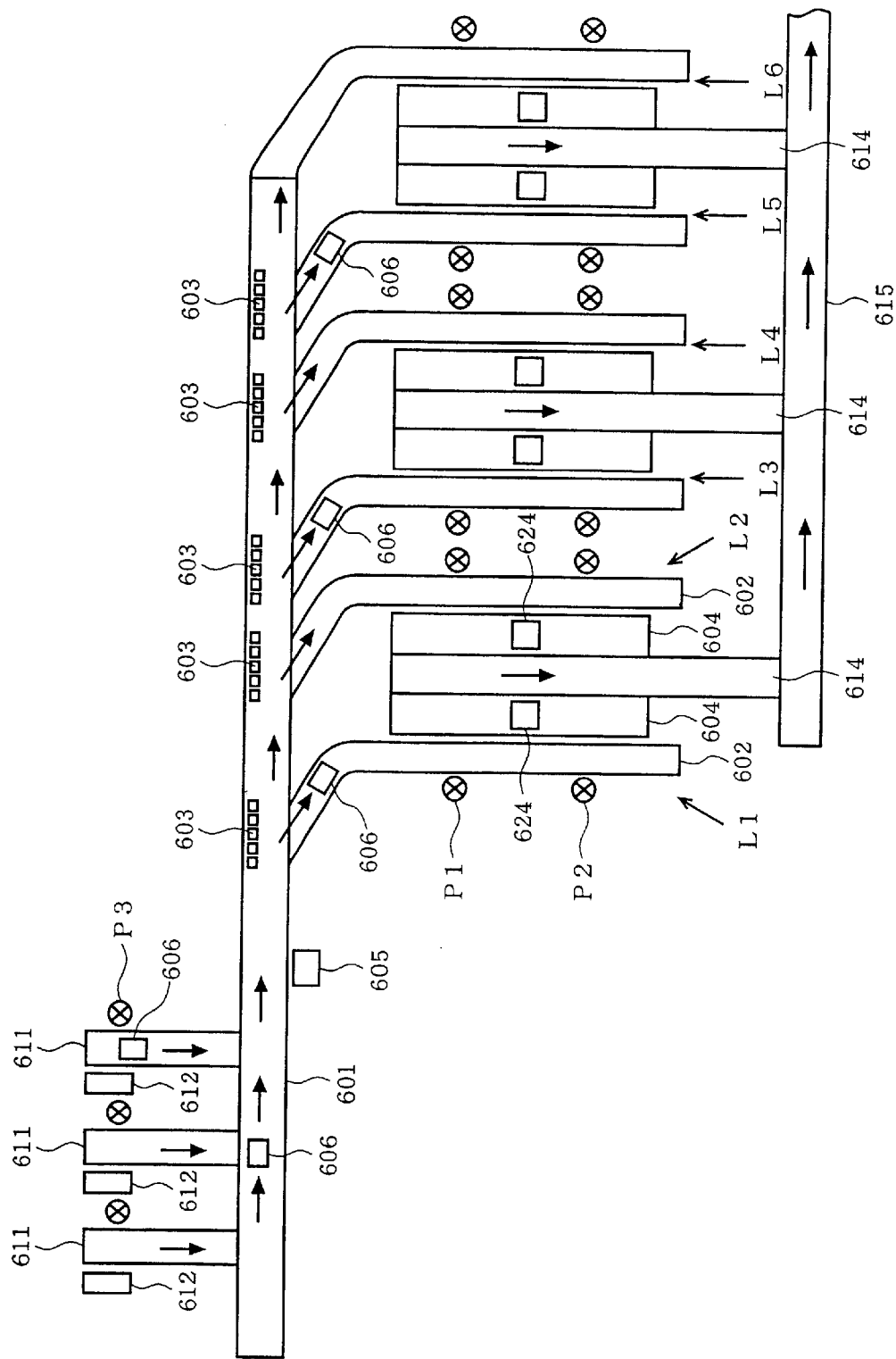
FIG. 54 illustrates the general composition of an article sorting system representing an embodiment of this invention.

FIG. 54 illustrates the general composition of an article sorting system representing an embodiment of this invention. As shown in the figure, the article sorting system comprises a first conveyor 601 conveying trays 606 carrying goods to be sorted; a plurality (six in this particular embodiment) of second conveyors 602 branching off from the first conveyor 601; a sorter 603 to guide a given tray conveyed by the first conveyor 601 to one of the second conveyors 602; and a scanner 605 or a tray information reading means to read a barcode attached to a given tray conveyed by the first conveyor 601.

The same system further comprises a plurality (six in this particular embodiment) of sorting racks 604 correspondent with the second conveyors 602; delivery conveyors 614, 615 which convey containers containing goods and kept stored in the rack 604 to a next step, that is, to a shipment area; a plurality (three in this particular embodiment) of inflow lines 611 through which goods carried on trays 606 are introduced to the first conveyor 601; and a computer terminal 612 (PC terminal hereinafter) provided to each inflow line 611. Another PC terminal 624 is provided to each sorting rack 604.

FIG. 55 is a block diagram for illustrating the composition of the control system of the article sorting system of FIG. 54. As shown in the figure, PC terminals 624 are connected together with PC terminals 612 to a host computer 640. The host computer 640 forms a local area network (LAN) with PC terminals 612, 614, and the involved computers communicate information with each other.

A scanner 613 to read a barcode is connected to each PC terminal 612. To each PC terminal 624 are connected a scanner 623 to read an SCM label (shipping carton marking) carrying the information of providers in characters and barcodes; a label printing device 625 to print a label carrying the specification of a good contained in a container; a direction indicator 626 to signal the location of the notified slot for a given good, and an entry indicator 627; and an infra-red beam sensor 628 to serve as an entry detection means when a good is put in its assigned slot.

Each of the host computer 640 and the PC terminals 612, 624 is provided with a display device, memory device (e.g., a hard disc), CPU (central processing unit), and a communication interface. The scanner 605 and the sorter 603 are connected to the host computer 640, which is engaged in the overall control of the article sorting system (see FIG. 54).

In the following description, a "sorting line" refers to a unit comprising a second conveyor 602 and a correspondent sorting rack 604; and six sorting lines are called lines L1, L2, . . . , L6. To each one of sorting lines L1 to L6, are assigned two sorters P1 and P2 while to each inflow line 611, one hauler P3 is assigned.

When hauler P3 applies, to the barcode (article identification information) of a good, a scanner 613 connected to a PC terminal 612, the display device of the PC terminal 612 displays the number of the same goods to be placed on a tray 606. Hauler P3 places the required number of goods on a tray 606, causes the scanner 613 to read the tray identification information of the tray, and puts the tray on the first conveyor 601.

During this operation, PC terminal 612 transmits the data carrying the tray identification information of the tray receiving the goods, the information of the good including the kind (category) and the number, etc. to the host computer 640, and the data are incorporated in an article information table stored in the memory of the host computer 640.

The scanner 605 reads the tray identification information from a tray conveyed by the first conveyor 601, and feeds the information to the host computer 640. The host computer 640 compares the information with the article information table stored in its memory, and with the arrangement pattern of slots of each sorting rack 604, determines which one out of the sorting lines L1 to L6 the tray 608 should be guided, and delivers a control signal to the sorter 603 to cause the sorter to guide the tray to the sorting line thus determined.

Through this operation, it is possible to automatically guide a tray carrying goods to a sorting line along which there is a slot meeting the sorting requirement of the goods.

Figure 56:
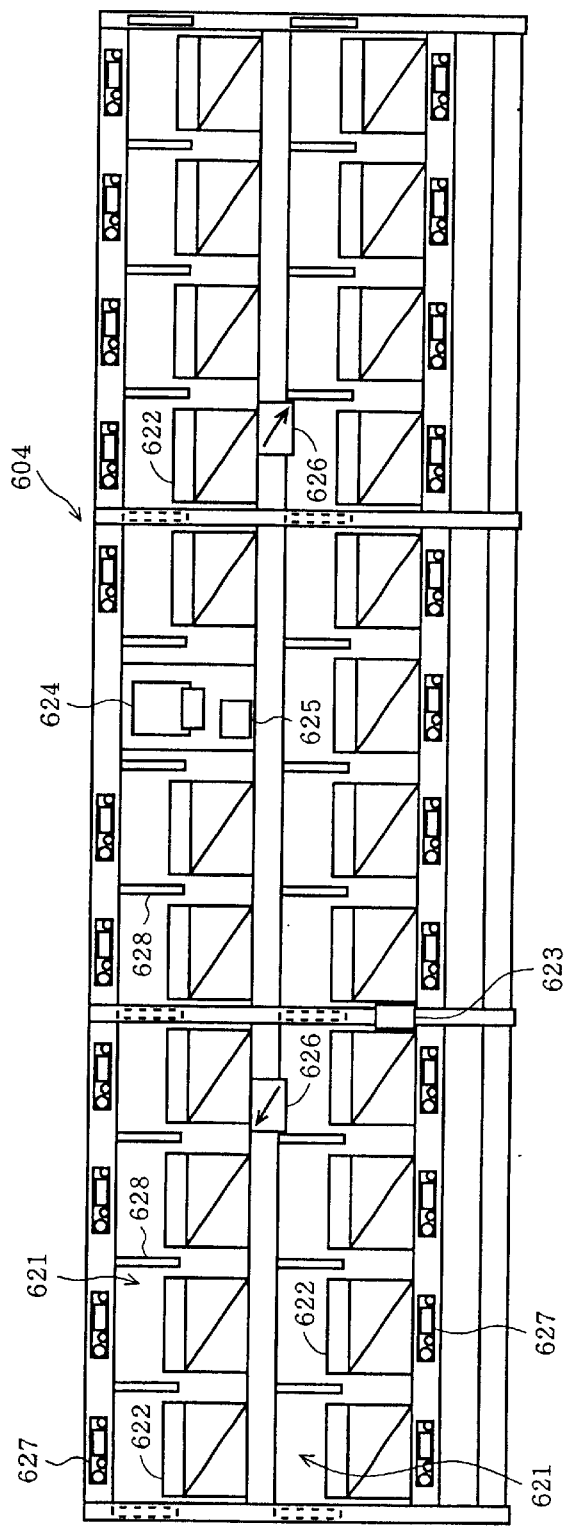
FIG. 56 is a frontal view of a sorting rack of FIG. 56.

FIG. 56 is a frontal view of a sorting rack of FIG. 56. As shown in the figure, the sorting rack 604 of this embodiment comprises two layers: the upper layer contains 11 foldable plastic containers while the lower one 12 same containers, and thus it includes 23 slots in total.

The sorting rack 604 is divided into two blocks A and B; and blocks A and B are assigned to sorters P1 and P2 respectively. To put it more specifically, out of 23 slots 621 of the sorting rack 604, sorter P1 is responsible for block A comprising 12 slots on the left side while sorter P2 is responsible for block B comprising 11 slots on the right side.

This arrangement makes it possible for sorter P1 to firstly handle goods placed on trays 606 and then for sorter P2 to handle the remaining goods.

As soon as sorter P1 or P2 completes hauling goods through a slot 621 into a container, he pushes a label printing button to cause an SCM label and a good specification label to be printed; sticks the labels to the container; and transfers the container to the delivery conveyor 614. The container will be sent through the conveyors 614, 615 to a shipment area.

The sorting rack 604 is provided with a PC terminal 624 and a label printing device 625 at its center (see FIG. 55), with a scanner 623 to read the tray identification information of trays at the lower layer, and with an entry indicator 627 above or below each slot 621.

Figure 57:
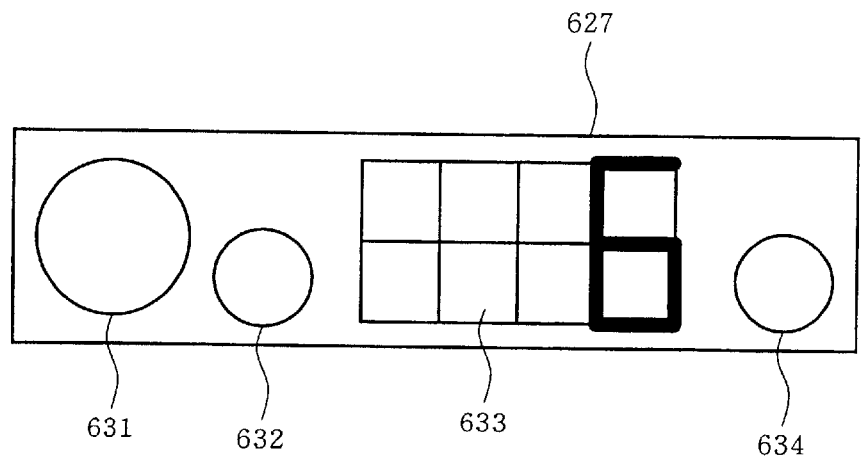
FIG. 57 illustrates the operation of the entry indicator provided to the sorting rack of FIG. 54.

FIG. 57 illustrates the operation of the entry indicator provided to the sorting rack of FIG. 54. As shown in the figure, the entry indicator 627 has an indication lamp 631, a number indicator 633, a check button 632 and a label printing button 634. The entry indicator 627 is connected to a PC terminal 624; when buttons 632 and 634 are pressed, a signal is fed to the PC terminal 624; and the PC terminal 624 delivers a control signal so that the operation of the indication lamp 631 and the number indicator 633 may be properly adjusted.

Figure 58:
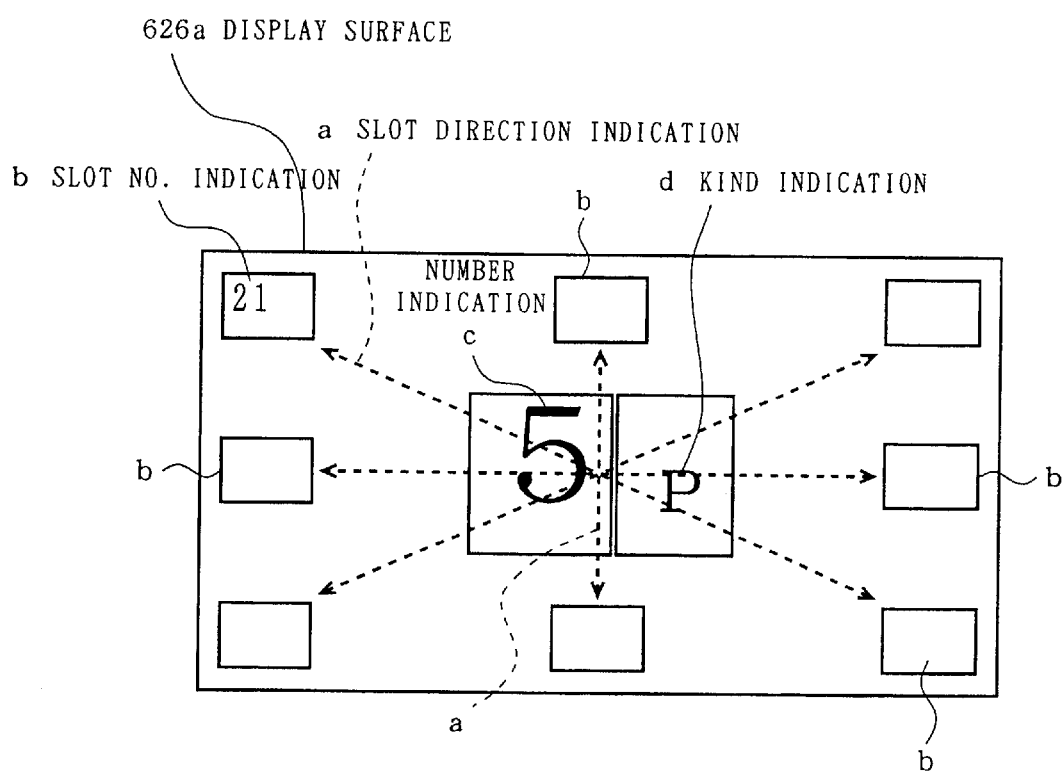
FIG. 58 illustrates the operation of the direction indicator provided to the sorting rack of FIG. 54.

FIG. 58 illustrates the operation of the direction indicator provided to the sorting rack of FIG. 54. As shown in the figure, the direction indicator 626 provided to each of blocks A and B presents, on its display surface 626a, the number of slot 621 nominated by PC terminal 624, and points to the location of the slot with an arrow thereby serving as a slot direction indicator; and also notifies the kind and number of goods to be hauled in that slot.

If for example the direction indicator has a rectangular display surface 626a, the following arrangement will be possible: a target slot will be indicated by a straight arrow a; a window at the tip of the arrow will give the No. of slot; a central window will give the number of goods to be hauled; and another central window will give the kind of goods (see FIG. 58).

The target slot indicator a or the arrow can take, as appropriate, any one of eight directions: north and south, east and west, north-east and south-west, north-west and south-east, if it be assumed that the display surface is a compass. The No. of a target slot b, the number of goods to be hauled c, and the kind of goods d are given in respective windows as digits.

The locations and numbers of the slot direction indicator a and the slot No. indicator b are not limited to the above locations, and to eight as described above, but take any location and number as needed. The locations and numbers of the number display c and the kind display d take any numbers as needed. This holds also true for the shape of the slot direction indicator a, slot No. indicator b, number indicator c and kind indicator d, and for their method of display.

The kind of a good to be displayed may concern with, as regards the packed state of the good, whether a specified number of the goods are contained in a case or in a bolus, or exist as disjoined pieces or in other forms (undefinable forms).

The kinds of good are distinguished by different characters and colors for easy discrimination. For example, when a good is packed in a case, its kind is represented by a green letter C against a common pale gray background; when a good is packed in a bolus, its kind is represented by a red letter B; when a good exists as disjoined pieces, its kind is represented by a blue letter P; and when a good exists in other forms (undefinable forms), its kind is represented by a yellow letter S.

These letters and their colors may be chosen and combined arbitrarily, and if a good is read by a scanner, a corresponding symbol representing its kind will be displayed on the display portion comprising a liquid crystal display or a plasma display in response to a display instruction signal from the PC terminal 624.

The signals transmitted by the slot indicator 626 as regards the slot direction a, slot No. b, number of goods c and kind of goods d are processed by the PC terminal 624; the signals are delivered at the same timing with a display instruction signal to the entry indicator 627; and the kind and color of symbol letters are also determined as appropriate. Introduction of such a display method will ensure the rapid and accurate sorting of goods, thereby improving the efficiency of sorting.

Each slot 621 of a sorting rack 604 has a sensor 628 based on a pair of infra-red beam generator and sensor (entry sensor hereinafter). Each time a good or the sorter's hand is put through a slot into a container, the sensor detects it and supplies a detection signal to the PC terminal 624.

In this embodiment, sorting lines L5 and L6 serve as back-up lines of the other sorting lines L1 to L4. As will be described later, if any one of the active sorting lines L1 to L4 becomes full, and the number of trays 606 waiting handling before the line reaches a predetermined level, goods otherwise destined to the line will be guided to either line L5 or L6.

In this particular embodiment, sorting lines L5 and L6 back up sorting lines L2 and L3, respectively. Introduction of such back-up lines will prevent the delayed or stagnated handling of trays thereby improving the efficiency of handling.

Next, the method how to arrange the slots 621 into a pattern representing an embodiment of this invention will be described. For illustration let us assume that the distribution center distributes goods on a half-day basis; and the memory device of the host computer 604 stores the inflow data of goods to be received for the half-day and provided in advance by their vendors. The inflow good data includes, for a given good, its kind, number, vendor and the date of inflow.

FIG. 59 is a flowchart for illustrating the steps necessary for determining the pattern of slots of FIG. 56. As shown in the figure, firstly, the host computer 640 reads the inflow good information stored in its memory (step S601).

Then, the computer determines by calculation the total amount (WTOTAL) of goods scheduled to be handled on the half-day; and then determines the amount of goods to be handled per a sorting line (WAVE) by dividing WTOTAL by the number of active lines (four lines in this particular embodiment)(step S602).

A work unit W is defined as the amount of goods that a hauler can haul into a container at one stroke, in stead of a single piece of good. If a good is sufficiently small and a hauler can haul 10 of it at one stroke, 10 pieces of the good form a work unit W. For another good, if a hauler can haul only one of it at one stroke, one piece of the good forms a work unit W.

Then, the slot pattern is determined according to the average work amount or WAVE, and necessary work amounts divided by purchasers (step S603). Let's assume for illustration that the distribution center is going to distribute goods to purchasers ST1, ST2, ST3 and ST4, arranged in correspondence with the display racks of individual shops. Let's assume further that the work amounts divided by individual purchasers are determined as follows:

Work amount WST1 required in the handling of goods to purchaser ST1 is: WST1=200 units;

Work amount WST2 required in the handling of goods to purchaser ST2 is: WST2=180 units;

Work amount WST3 required in the handling of goods to purchaser ST3 is: WST3=80 units;

Work amount WST4 required in the handling of goods to purchaser ST4 is: WST4=100 units;

Then, the total work amount WTOTAL:

WTOTAL=WST1+WST2+WST3+WST4=560 units.

The average work amount WAVE:

WAVE=WTOTAL/4=140 units

In this embodiment, the work amount is averaged not only for the sorting line but also for the sorter. Therefore, a line is determined to handle goods requiring 140 units of work amount, and then the slots of a block is arranged into a pattern so that the sorter assigned to the block may handle 70 units of work amount.

FIG. 60 illustrates an exemplary pattern of slots (No. 1). In FIG. 60, it is assumed that handling of goods at each slot requires 10 units of work amount, and an exemplary arrangement of the slots of sorting lines L1 to L4 is shown in the form of a table.

FIG. 60A is a schematic diagram of the slots of a sorting rack of FIG. 56: block A contains slots A1 to A12 while block B contains slots B1 to B11. FIG. 60B shows the pattern of slots of sorting line Li. Because goods destined to purchaser ST1 are plentiful, all the slots of line LI are determined to receive goods to be delivered to purchaser ST1. LC1 to LC14 refer to the addresses of display location at the purchaser's shop.

As shown in FIG. 60C, the slots of line L2 are determined to receive goods delivered to purchaser ST1 at LC15 to LC20, and goods to purchaser ST2 at LC1 to LC8. As shown in FIG. 60D, the slots of line L3 are determined to receive goods delivered to purchaser ST2 at LC9 to LC18, and goods to purchaser ST3 at LC1 to LC4. As shown in FIG. 60E, the slots of line L4 are determined to receive goods delivered to purchaser ST3 at LC5 to LC8, and goods to purchaser ST4 at LC1 to LC10.

As seen from above, because work amounts are averaged not only for each line but for each sorter, it is possible to prevent any one line or any one sorter from idly waiting the arrival of new goods, thereby improving the efficiency of sorting.

FIG. 61 illustrates another exemplary pattern of slots (No. 2). FIG. 61 shows the patterns of slots of sorting lines L5 (see FIG. 61A) and L6 (see FIG. 61B) serving as back-up lines.

As shown in the figure, the slot pattern of sorting line L5 includes, in addition to the slots of sorting line L2 to be backed up (see FIG. 60C), the slots (ST3/LC5 to ST3/LC8) directed to purchaser ST3, and the slots (ST4/LC4 to ST4/LC6) directed to purchaser ST4. The slot pattern of sorting line L6 is the same with that of sorting line L3 to be backed up (see FIG. 60D).

Because, with this system, it is possible to make the slot pattern of a back-up line equal to or at least include the slot pattern of a line to be backed up, it will be possible, even if a good otherwise guided to an active line were guided to a back-up line, to indicate a slot of the back-up line correspondent in position with the otherwise indicated slot of the active line, and thus to obviate the need for complicated works otherwise would be required.

Because, with this system, it is possible to introduce back-up lines L5 and L6, it will be possible to assist the handling of lines L2, L3 in case handling of goods at those lines were more delayed than scheduled, thereby improving the overall efficiency of handling.

The number of back-up lines, and the method how to apply which back-up line to which active line may be determined depending on the skill of sorters, the total work amount WTOTAL determined for the unit work period, etc. For example, if the total work amount WTOTAL were great, back-up lines should be reduced to one or zero.

Figure 62:
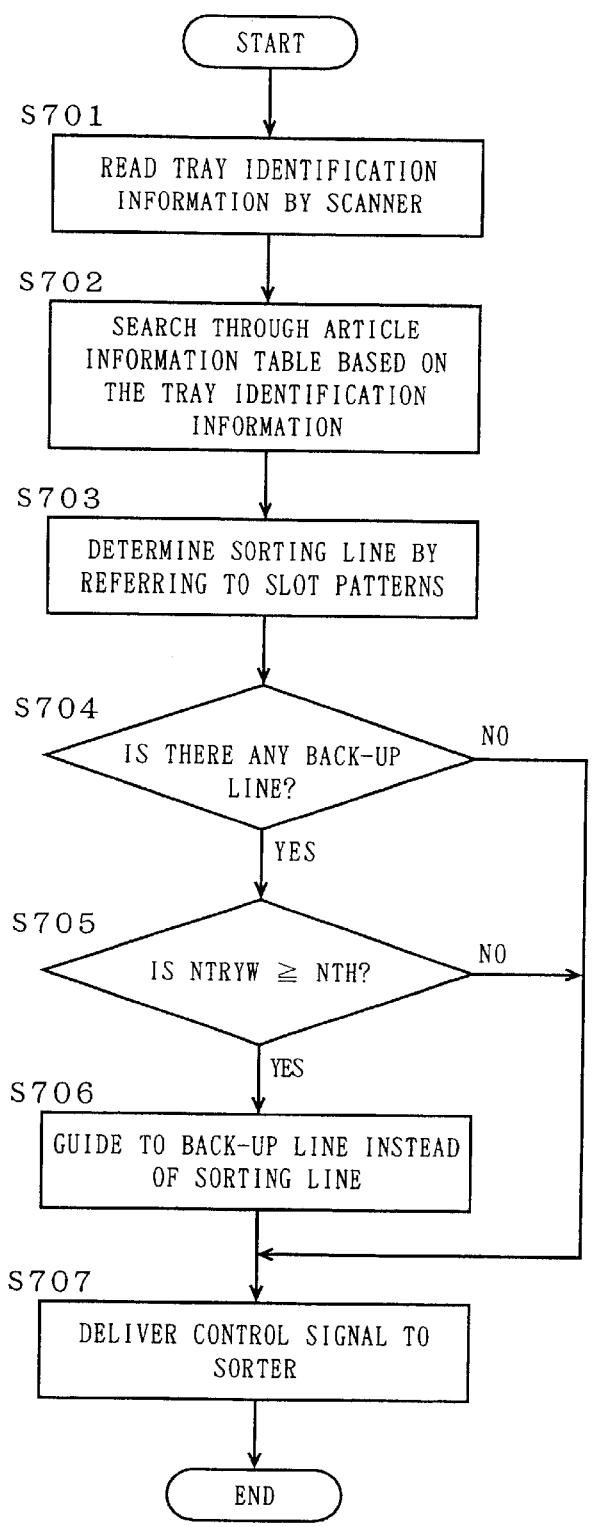
FIG. 62 is a flowchart for illustrating the control steps taken by the host computer as shown in FIG. 55.

FIG. 62 is a flowchart for illustrating the control steps taken by the host computer as shown in FIG. 55. As shown in the figure, firstly, a scanner 605 reads the identification information of a tray 606 conveyed by the first conveyor 601 (step S701); and the computer searches through the good information table stored in its memory according to the tray identification information provided (step S702).

Next, after referring to the information regarding the patterns of slots as shown in FIG. 60, the computer determines a sorting line to which the tray 606 should be guided (step S703). Then, the computer checks whether there is any back-up line left to back up the nominated line (step S704)

If the computer receives an affirmative answer (Yes), it checks whether the number NTRYW of trays 606 waiting handling exceeds a predetermined level NTH (step S705). If the computer fines NTRYW≧NTH, it switches the line to which the tray 606 should be guide to a back-up line (step S706), and then delivers a sorter control signal (step S707)

At step S704, however, if the computer finds there is any back-up line left (No), it immediately delivers a control signal to the sorter 603 (step S707). Similarly, if the computer finds NTRYW<NTH at step S705, it delivers a control signal to the sorter 603 (step S707).

The host computer 640 always checks the number NTRYW of neglected trays for each line based on the sorting end signal fed by the PC terminal 624 provided to each line, that is, the number of containers filled with goods, the kinds and numbers of goods contained, etc.

It is needless to say, even if a sorter control signal is delivered, the sorter is only activated after being notified through a signal from a sensor (not illustrated here) that the tray 606 in question reaches the position of sorter opposite to the line into which the tray should be guided.

FIG. 63 is a flowchart for illustrating the control steps taken by a computer terminal provided to each sorting line. As shown in the figure, firstly, a scanner 623 reads the identification information of a tray conveyed by the second conveyor 602 (step S801); and the computer searches through the good information table stored in its memory according to the tray identification information provided (step S802).

Next, after referring to the information regarding the patterns of slots as shown in FIG. 60, the computer determines a slot into which goods placed on the tray 606 should be put (step S803). Then, the computer delivers a control signal to the direction indicator 626 to cause the indicator to indicate the direction towards the slot 621 (step S804). At the same time, the computer instructs the indication lamp 631 of the slot to give a continuous or blinking red light, and the number indicator 633 to present the number of goods to be put through the slot (step S805).

Then, the computer waits the arrival of a detection signal from the entry sensor 628 (step S806); and if it confirms that the entry of goods is detected (Yes), it checks whether the slot receiving the goods is the right one (step S807). If it confirms the slot receiving goods is the right one (Yes), it instructs the indication lamp 631 of the slot to give a green light (step S808), and checks whether the label printing button 634 is pressed or not (step S809).

The label button 634 is provided so that a sorter may press it when he finds the relevant container 622 has received all the scheduled goods, so as to print an inventory of the goods. Therefore, for a given slot, as long as its label button 634 is not pressed, sorting of goods to that slot continues as ever. Thus, when the computer finds the label button is not pressed (No), it returns to step S804 to continue sorting for the slot.

Later, if the computer finds the label button 634 is pressed for that slot (Yes), it delivers a signal to the label printing device 625 to cause it to print an inventory label (step S810). Then, it checks whether there are any data indicating the presence of goods to be delivered to the slot (step S811), and if it receives an affirmative answer (Yes), it returns to step S804. If it receives a negative answer (No), it completes the sorting for the slot 606 in question.

If, at step S807, the computer finds goods are put in a wrong slot (No), it instructs the indication lamp 631 of the wrong slot to give a yellow blinking light, and the buzzer to give an alarming sound (step S812).

Then, the computer waits until the check button 632 is pressed by a sorter who becomes conscious of the error (step S813); if it confirms the button is pressed (Yes), it instructs the indication lamp 631 to resume a normal display and the buzzer to stop (step S814); and it returns to step S806. If the computer is informed through a detection signal from an entry sensor 628 that a renewed entry of good is made, it advances to step S807, and repeat the same processes.

As mentioned above, because, with this embodiment, the indication lamp 631 of a slot 621 to receive goods is lighted, and its direction is indicated by the direction indicator 626, the sorter can easily locate the slot into which goods should be hauled; the work efficiency will be improved; and careless hauling of goods into a wrong slot will be avoided. In addition, if goods are put in a slot different from the one indicated by the entry sensor 628, this is transmitted to the sorter so that he may put the goods in a right slot. Therefore, the incidence of goods put in wrong slots could be greatly reduced.

FIG. 64 is a flowchart for illustrating the steps taken by the host computer for monitoring the progress of the work. As shown in the figure, firstly, the computer reads the sorting end information delivered by the PC terminal 624 provided to each sorting line L1 to L6 and stored in its memory (step S901). The sorting end information concerns with containers which have received the scheduled goods, and carries the data about the kind and number of goods contained in them.

Next, the computer instructs the PC terminal 612 provided to each inflow line 611 to present the kinds and numbers of goods completing sorting on its display (step S902). Immediately thereafter, the computer instructs the PC terminal 612 provided to each inflow line 611 to present the kinds and numbers of goods still waiting sorting on the first conveyor 601 (step S903).

Then, the computer determines the number of containers 622 which have received scheduled goods and been pushed onto conveyor 614, from the sorting end information; and instructs the PC terminals 612 of sorting lines L1 to L6 to present the respective numbers of empty containers to be supplemented on their display (step S904).

This arrangement enables sorters P3 at inflow lines 611 to adjust the inflow of trays 606 to the inflow lines in accordance with the progress of sorting presented on the display, thereby preventing the undue accumulation of neglected goods, or the uneven distribution of trays among different sorting lines.

Moreover, because, with this embodiment, empty containers 622 are supplied through the first and second conveyors 601 and 602 to the sorting rack 604, and thus empty containers 622 are passed through the inflow lines 611, it will be possible to constantly fill the sorting rack 604 with containers, thereby improving the work efficiency. Further, because the sorting rack 604 can obviate the need for storing a large number of empty containers itself, efficient use of the space will be ensured.

In this embodiment, the host computer 640 and PC terminal 624 serve as a control means; the memory devices of the host computer 640 and the PC terminal 624 serve as a memory means; and the display device of the PC terminal 612 serves as a display means.

Seventh Embodiment

Figure 65:
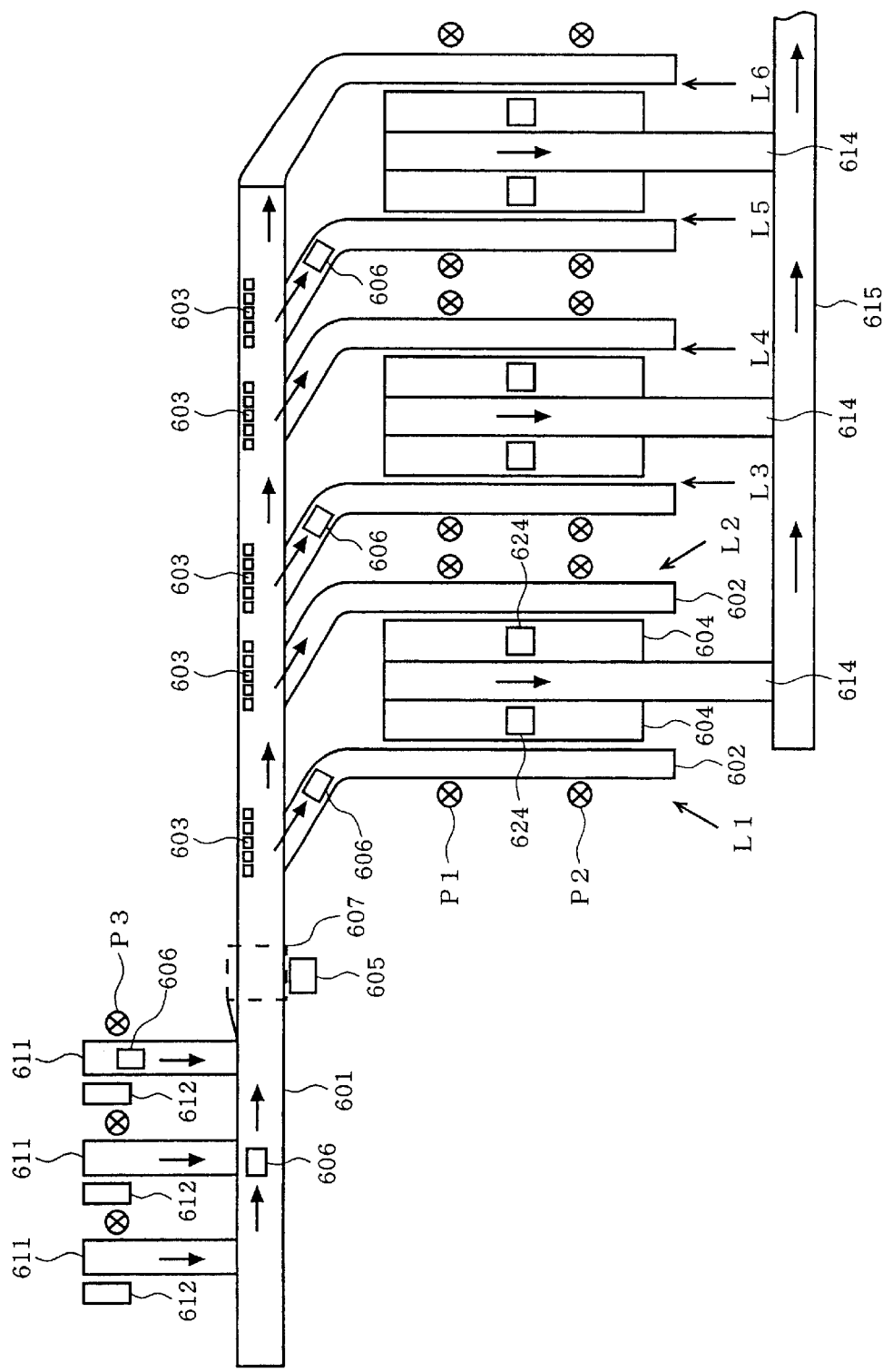
FIG. 65 illustrates the overall composition of an article sorting system representing a seventh embodiment of this invention.

FIG. 65 illustrates the overall composition of an article sorting system representing a seventh embodiment of this invention. As shown in the figure, with this article sorting system, a weight measuring meter 607 is provided to measure the weight of a tray 606 conveyed by the first conveyor 601.

FIG. 66 is a block diagram to illustrate the composition of the control system of the article sorting system of FIG. 65. As shown in the figure, the weight measuring meter is connected to a host computer 640, and its measurement data are fed to the host computer 640.

The composition of hardware elements excluding what has been just described is the same with that of the sixth embodiment. In this embodiment, the host computer determines by calculation the weight of a unit of good from the measurement data provided by the weight measuring means 607; determines by calculation the weight of sorted goods contained in containers 622, based on the weight of a unit of good, and the entry confirmation information provided by the entry sensors 628; and determines, for a given container, it has received scheduled goods when the computer finds the sorted goods accumulated in that container have reached a predetermined weight. In this case, it is assumed the goods accumulated in the container in question are the same in kind (category), and the weight increases as a function of the number of accumulated goods.

Figure 67:
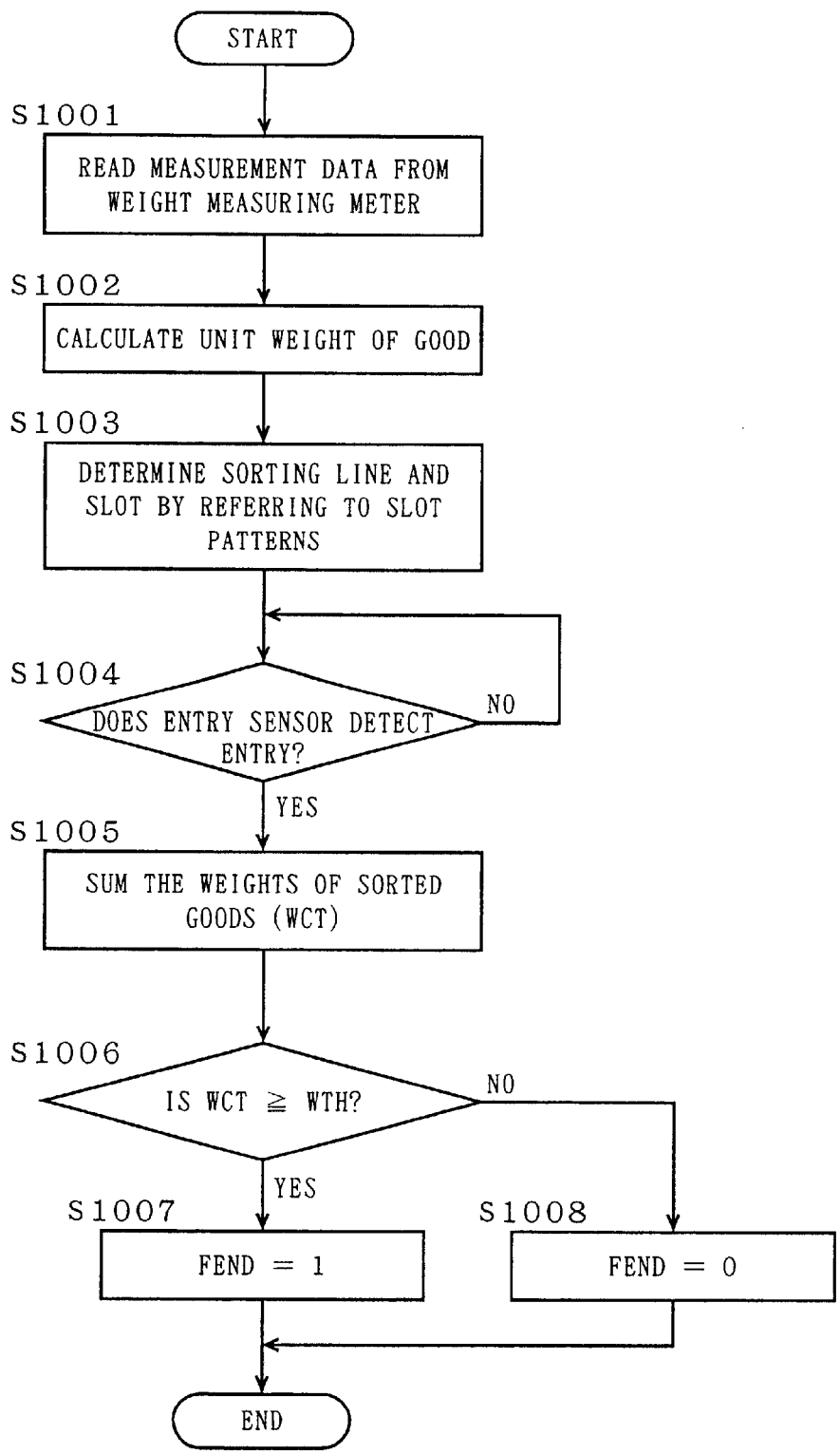
FIG. 67 is a flowchart of the steps taken by a host computer for determining the end of hauling for a given container.

FIG. 67 is a flowchart of the steps taken by the host computer for determining the end of hauling for a given container. As shown in the figure, firstly, the computer reads the measurement data of a tray provided by the weight measurement meter 607 (step S1001); and determines the unit weight WUNIT of the good (a single piece, or a group when grouped) contained in the tray from the number of the goods contained in that tray (step S1002) To put it more specifically, the computer determines the number N of the units of good contained in the tray by searching through the article information table using the tray identification information provided by the scanner 605. Then, the computer subtracts the weight WTRY of tray 606 from the weight measurement WM provided by the weight measuring meter 607, and divides the result with the number of units N to obtain the unit weight of the good WUNIT (=(WM—WTRY)/N).

Next, the computer refers to the pattern of slots, and identifies a slot 621 into which the goods contained in that tray will be put (step S1003); and then waits until it receives a detection signal provided by the entry sensor 628 of that slot 621 (step S1004).

If the computer confirms the goods are put into the slot (Yes), it adds the weight WACT of newly added goods to the weight WCT of goods already lodging in that container, to obtain the weight WCT of currently sorted goods (step S1005). The weight WACT is obtained by multiplying the number of unit goods by the weight WUNIT of a unit good.

Next, the computer checks whether the weight WCT of currently sorted goods exceeds a predetermined weight or not (step S1006), and if it finds the weight in question is equal to or more than the predetermined weight WTH, or WCT≧WTH (Yes), it sets the end flag FEND to "1," (step S1007). On the contrary, if the computer finds WCT<WTH (No), it sets the end flag FEND to "0" (step S1008).

The weight WCT of currently sorted goods and the value of end flag FEND are stored in the memory of the computer in connection with the relevant container. The host computer 640, as soon as it finds the end flag FEND value changes from "0" to "1," informs this to the PC terminal 624 of the sorting line where the container in question 622 resides.

Figure 68:
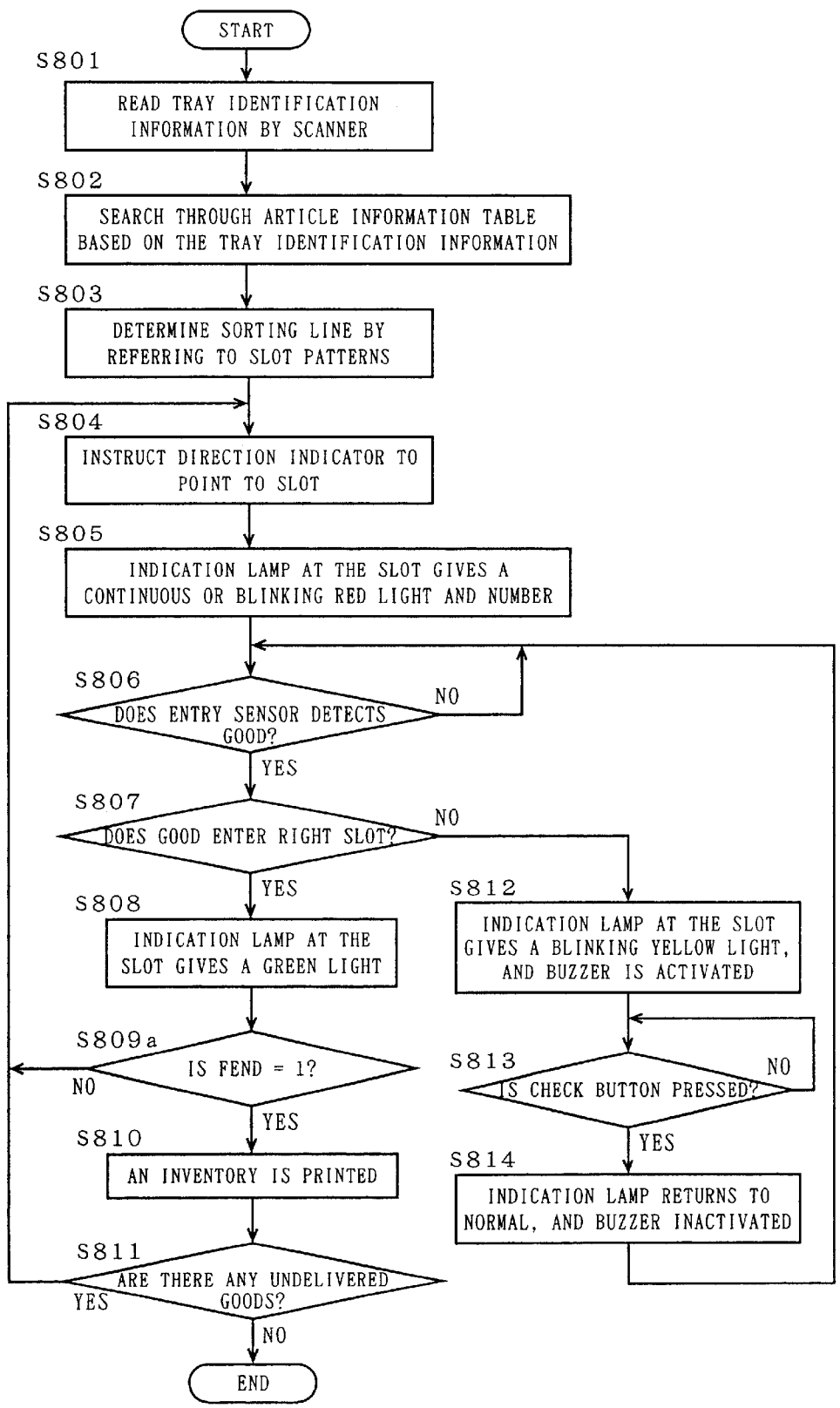
FIG. 68 is a flowchart for illustrating the steps taken by a PC terminal provided to each sorting line.

FIG. 68 is a flowchart for illustrating the steps taken by the PC terminal provided to each sorting line. This flowchart is essentially the same with that of the sixth embodiment (see FIG. 63) except that step S809 of the sixth embodiment is substituted for step S809a.

More specifically, in this embodiment, an inventory for a given container is not printed in response to a signal which is delivered when a sorter presses a label button 634; instead the host computer 640 practices an entry end determining process for the container(see FIG. 67), determines sorting is completed for the container based on the process result, and, as soon as setting the end flag FEND to "1," causes an inventory for the container to be printed.

According to this embodiment, for a given container 622, whether it has received scheduled goods or not is automatically determined. This will moderate the burden imposed on the sorter, and reduce the incidence of goods placed in wrong containers, thereby improving the work efficiency.

The host computer 640 (control means) is preferably so configured as to store a master table including the information of goods to be sorted, for example, the name of goods, the name of vendors, and the number of goods in its memory device (memory means); and to add (write) the weight WUNIT of a unit good to the information of the same good in the master table.

Because, through this arrangement, the weight WUNIT of a unit good derived from weight measurement can be automatically written into the article master table, it will be possible to relieve the sorter of the necessity of feeding input through a keyboard. In addition, provided that the same good repeatedly inflows, it will be only necessary to refer to the article master table to know its unit weight, which will obviate the need for weighing every good, in as much as that good has been previously weighed, which will improve the work efficiency.

Eighth Embodiment

If handling of numerous kinds of goods is required, distribution of goods among different sorting lines will tend to become uneven, even if slots are arranged so that goods assigned to individual sorting lines L1 to L6 and to individual blocks of the racks may be averaged. In worst cases, this will cause goods to be so unevenly distributed among different sorting lines that some will be too congested with goods to continue sorting, which will lower the work efficiency.

In view of this, this embodiment has ten buffer lines BL1 to BL10 inserted between inflow lines 611 and a first conveyor 601, thereby making it possible to temporarily store trays 606 in those buffer lines, to enable sorting to continue without interruption and to control the entry of trays (goods) to first conveyor 601.

Figure 69:
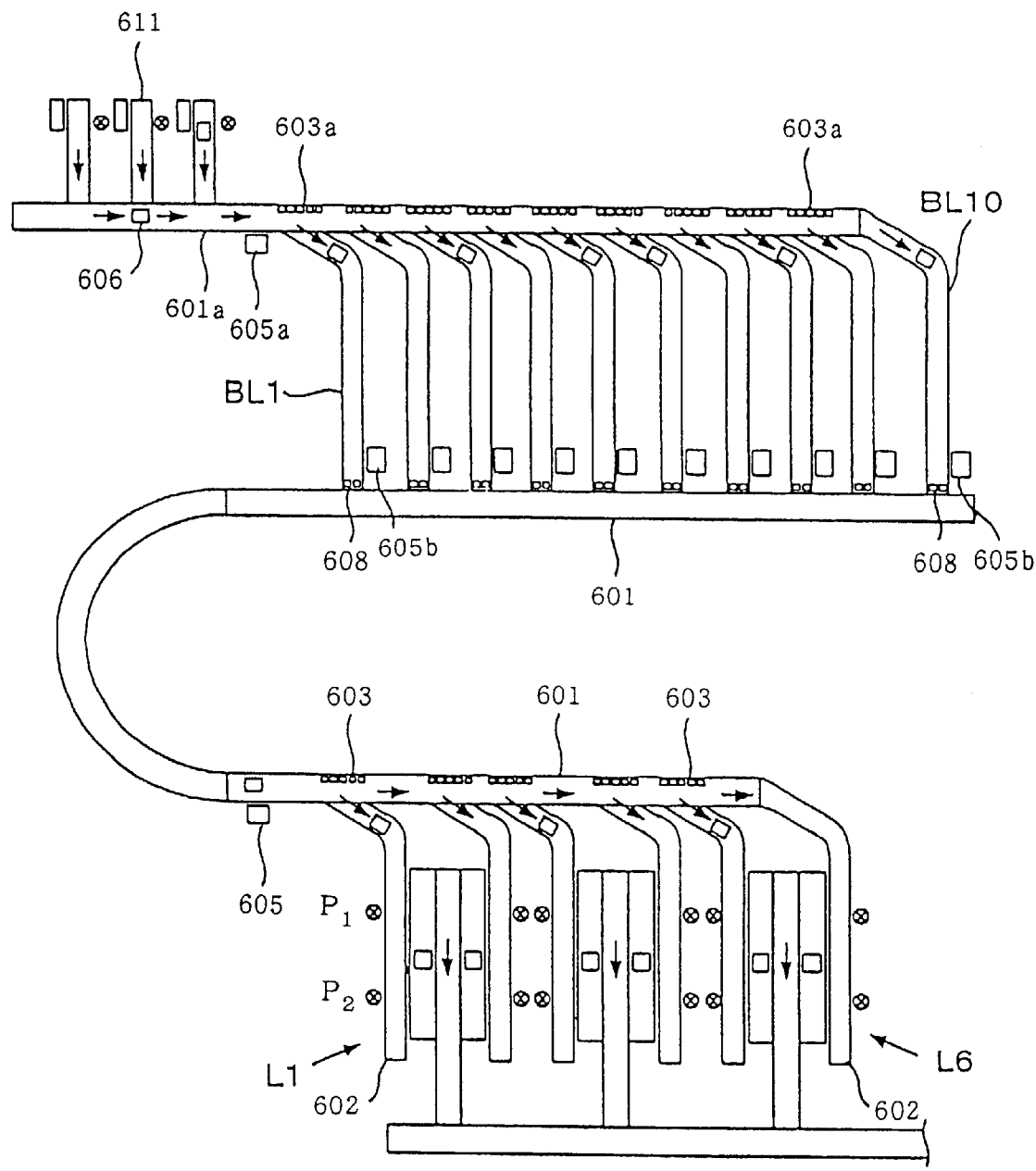
FIG. 69 illustrates the overall composition of an article sorting system representing an eighth embodiment of this invention.

FIG. 69 illustrates the overall composition of an article sorting system representing an eighth embodiment of this invention. As shown in the figure, buffer lines BL1 to BL10 are inserted between a first conveyor 601 and a newly added conveyor 601a connected to inflow lines 611. This additional conveyor 601a is provided with a scanner 605a connected to a host computer, and a sorter 603a.

Each of buffer lines BL1 to BL10 is provided with a scanner 605b and a stopper 608; and the scanner 605b and the stopper 608 are connected to the host computer 640. When stopper 608 is lowered, a tray held on the buffer line will advance to the first conveyor 601.

The host computer 640 determines, for a given tray, a buffer line to which the tray should be guided, based on the tray identification information provided by the scanner 605a; and instructs the sorter 603a to guide the tray 606 to the buffer line thus determined. In addition, the host computer 640 controls the entry of the tray 606 to the first conveyor 601 by activating or inactivating the stopper 608 based on the tray identification information provided by the scanner 605b.

The operation of this system will be described with reference to a sample case where goods G1, G2, G3 and G4 are handled in one work cycle. Let's assume, the relative amount of good in terms of energy required for handling is 30% for G1, 20% for G2, 10% for G3, and 40% for G4. As mentioned above, because the slots of each sorting rack is arranged so that the work amount required for sorting is averaged among different racks. Thus, the relative number of slots assigned to respective goods is 30:20:10:40.

Thus, out of 10 buffer lines, three is assigned to store good G1; two for good G2; one for good G3; and four for good G4. Then, the buffer lines are controlled such that each of them ejects trays 606 to the first conveyor 601 at the same rate (e.g., one tray per three minutes).

Through this arrangement, the amounts of trays (number of trays 606) stored by buffer lines BL1 to BL10 are averaged; and the entry rates of respective goods to the first conveyor 601 are adjusted to correspond with the work amounts required for respective goods at sorting areas. This will prevent goods from being so unevenly distributed among different sorting lines that some will be too congested with goods to continue sorting, and thus the work efficiency will be improved.

Because, with this system of this invention, numerous kinds of good to be handled in one work cycle are automatically assigned to a plurality of sorting lines so that sorting may proceed in parallel among those lines, it is possible to greatly improve the efficiency of sorting, as compared with the conventional sorting which consists of moving wheeled carts with goods among racks. Moreover, because, with this system, it is possible to adjust the distribution of goods among the sorting lines in accordance with how sorting proceeding among those lines, it will be possible to prevent sorting at a certain line from being delayed, for example, on account of unskilled sorters being assigned to the line, and to allow sorting to proceed evenly among different lines, which will improve the overall work efficiency.

Particularly, introduction of the direction indicator 626 (slot direction indicator) activated in connection with the entry indicator 627 makes it possible to automatically point to a target slot with an arrow colored differently dependent on the number and kind of goods to be put in the slot. This will further improve the rapidity and accuracy of the sorting work.

However, use of the buffer lines is not limited to the method described above, but may be based on any other method, provided that the entry rates of individual goods from the buffer lines to the first conveyor 601 can be adjusted to correspond with the work amounts required for sorting the respective goods at the sorting lines.

For example, if the total amount of goods is low, out of 10 buffer lines, four may be used for sorting: one buffer line is assigned to each of goods G1, G2, G3 and G4, and stoppers 680 are so controlled as to make the entries of respective goods to the first conveyor 601 correspondent with the work amounts required for sorting the respective goods.

The entry of goods from buffer lines BL1 to BL10 to the first conveyor 601 is preferably adjusted according to the sorting works proceeding at sorting lines L1 to L6.

This invention, however, is not limited to the above embodiments, but may be modified in various ways. For example, the article sorting system representing an embodiment of this invention uses, as the case to contain goods, plate-like trays 660 or box-like containers 622. However, the tray 606 may take the same form with that of the container 622. If the tray 606 is made the same in form with the container 622, it will be possible to obviate the need for supplementation of empty containers 622.

The number of sorting lines, or the number of sorting racks 604 is not limited to six but may take any number equal to or more than two. The number of slots of the sorting rack 604 is not limited to 23.

The control system of this system is not limited to the composition as depicted in FIGS. 55 and 66. For example, PC terminals may be connected through a hub to a host computer 640.

FIG. 70 is a block diagram for illustrating another composition of the control system of the article sorting system. As shown in the figure, the system is provided with a sorting server 652 to control a sorter 603, a POR (Point Of Receiving) server 653 connected to PC terminals at inflow lines 611, and an assorting server 654 to control works related with sorting racks 604. These servers 652, 653 and 654 may be connected through a hub 651 with a host computer 640.

Direction indicators 626 and entry indicators 627 are connected through a display control box 655 to the assortment server 654. Alternatively, the control system may be so configured as to make a single large computer control the whole system, and to distribute a display device and a communication interface to each line. In FIG. 70, sorter 603, PC terminal 624, label printer 625, and direction indicator 626 appear as single, but in reality each of them exists as multiple (see FIG. 66).

Moreover, with the above embodiments, a sorting rack is divided into two blocks to each of which a sorter is assigned. However, a sorting rack may be used as a whole, or may be divided into three or more blocks.

Supplementation of empty containers is achieved by feeding empty containers through the first and second conveyors. Instead, an additional conveyor (third conveyor) may be introduced for the supplementation of empty containers.

The terms "tray" and "container" used in the above embodiments refer to a receptacle to hold goods for their easy conveyance in the article sorting system, and are not limited to any shape as long as they take a box-like or plate-like form and allow goods to be easily taken out or to be easily put in.

The term "the arrangement pattern of slots" refers to the locations of slot of a sorting rack in relation to the purchasers (categories) of the goods to be put in the containers behind the slots.

As detailed above, according to this invention, even if numerous goods imposing different requirements for sorting arrive at the same time to be handled at one work cycle, they are automatically guided to a plurality of sorting lines so that sorting of them may proceed in parallel among the sorting lines. Thus, it is possible to greatly improve the efficiency of sorting, as compared with the conventional sorting which consists of moving wheeled carts with goods among racks.

Further, according to this invention, it is possible to change the sorting lines to be actively engaged in sorting according to the progression of sorting at individual active sorting lines, it will be possible to prevent sorting at a certain line from being delayed, for example, on account of unskilled sorters being assigned to the line, and to allow sorting to proceed evenly among different lines, which will improve the overall work efficiency.

Still further, according to this invention, slots of the sorting racks are arranged into a pattern based on the inflow information given in advance one day or half-day ahead, so that the work amount assigned to each sorting line may be averaged. Thus, it will be possible to avoid the concentration of goods to certain sorting lines, or conversely the scanty arrival of goods to certain other sorting lines.

Still further, according to this invention, the work amounts at the plural blocks at each sorting line are averaged and thus the work amount for each sorter is averaged. Thus it will be possible to avoid the concentration of goods to certain sorters, which will contribute to an improved work efficiency.

Still further, according to this invention, even if work is delayed at a certain sorting line, trays otherwise sent to that line could be guided to a back-up line, thereby reducing the number of neglected trays. This will improve overall work efficiency.

Still further, according to this invention, it is possible to make the slot pattern of a back-up line equal to or at least include the slot pattern of a line to be backed up, it will be possible, even if a good otherwise guided to an active line were guided to a back-up line, to indicate a slot of the back-up line correspondent in position with the otherwise indicated slot of the active line, and thus to obviate the need for complicated works otherwise would be required.

Still further, according to this invention, the number of trays waiting sorting at each sorting line is always monitored, and if a certain line is congested with so many trays, excess goods would be guided to a back-up line. Thus, it is possible to prevent trays from accumulating too much at a certain line, which will improve the work efficiency.

Still further, according to this invention, for goods contained in a tray, its unit weight is determined; the weight of sorted goods contained in each container is also determined; and it is determined goods in a container has completed sorting as soon as it is found that the weight of the goods exceeds a predetermined weight. Thus, it is possible to relieve the sorter of the necessity of pressing a button to inform of the completion of sorting for a container, thereby moderating the burden imposed on the sorter, which will reduce the incidence of wrongly entered goods.

Still further, according to this invention, the unit weight of a good derived from the weight measurement result is written into the article master table. Thus, it is possible to relieve the sorter of the necessity of feeding it through a keyboard. In addition, provided that the same good repeatedly inflows, it will be only necessary to refer to the article master table to know its unit weight, which will make it possible to obviate the need for weighing every good, in as much as that good has been previously weighed, which will improve the work efficiency.

Still further, according to this invention, the kinds and numbers of goods which have completed sorting are displayed on the display means at the sites where the entry of trays take place. Thus, it will be possible to accelerate the entry of trays which carry goods requiring urgent delivery, or to hold the entry of trays which carry goods whose handling is unduly delayed, which will prevent sorting lines from becoming uneven in their sorting works.

Still further, according to this invention, it is possible to know how much empty containers must be supplied to a given sorting line before the empty containers are actually provided to that line, and to quickly supply the empty containers through a conveyor. The sorting rack is always free from the shortage of empty containers; and it is not necessary to keep a heap of empty containers beside the rack. Efficient use of the work areas and space around the racks will be ensured.

Still further, according to this invention, trays are temporarily stored in a buffer line; and the entry of trays to the first conveyor is adjusted so that no interruption may intervene in the works of individual sorting lines. Thus, it will be possible to avoid a situation where goods are so unevenly distributed among different sorting lines that certain lines are too congested with goods to continue sorting. This will improve the work efficiency.

Furthermore, according to this invention, a tray carrying goods to be sorted is conveyed by a first conveyor; the tray is transferred to a second conveyor and then guided by a sorter to one of sorting lines; meanwhile the tray identification information of the tray and the information of goods contained in the tray are read by a reading means during the passage of the tray through the first conveyor; the article information table relating the former information with the latter and the pattern of slots of each sorting line are stored in a memory means; a control means refers to the identification information thus read, the article information table, and the pattern of slots of each sorting line stored in the memory means, to determine which sorting line the tray should be guided; the control means controls the sorter to this end; the direction indicating means points to a slot to receive the goods contained in the tray with an arrow with the address No. added, among a plurality of blocks introduced into the sorting rack; and at the same time the kind and number of goods to be placed in the slot are indicated.

Through this arrangement, it is possible to improve the efficiency of sorting multiple goods by small amounts according to various requirements imposed by purchasers.

As detailed above, according to this invention, it is possible to improve the efficiency of sorting multiple goods by small amounts according to various requirements imposed by purchasers.

What is claimed is:

1. An article sorting system comprising:
    a first conveyor to convey trays each containing articles to be sorted;
    a plurality of sorting lines each containing a second conveyor branching off from the first conveyor, and a sorting rack having a plurality of slots leading to containers into which articles are placed according to their sorting categories and placed opposite to the second conveyor; a sorter to guide a tray conveyed through the first conveyor to one of the plurality of sorting lines;

a reading means to read the identification information of a tray conveyed by the first conveyor;

a memory means to store an article information table connecting the identification information of a tray with the information of the articles contained in that tray and the arrangement pattern of the slots of each of the plurality of sorting line;

a sorter control means to determine an appropriate sorting line for a tray and control the sorter to guide the tray to the sorting line, after having referred to the identification information of the tray read by the reading means, and the article information table and the arrangement patterns of slots stored in the memory means; and a direction indicating means to provide each article introduced into the sorting rack with an arrow to indicate a direction towards a nominated slot and a number of the nominated slot for the article.

2. An article sorting system as described in claim 1 wherein the number of the nominated slot is displayed on each angle of the screen of the direction indicating means, and the arrow located at the center of screen points to an angle.

3. An article sorting system as described in claim 1 wherein the screen of the direction indicating means also displays the kind and number of articles to be sorted.

4. An article sorting system as described in claim 1 wherein the kind of articles is related with shape which articles to be sorted take during conveyance, and is distinguished by character and color.

5. An article sorting system as described in claim 1 wherein the direction indicating means is controlled based on a control signal delivered by a computer terminal forming a local network with a host computer, being interlocked with display processing signals notifying the entry of articles to be sorted.

6. An article sorting system as described in claim 1 further comprising; a display means is provided to each of inflow lines for introducing empty containers to the first conveyor;

wherein the first and second conveyors are arranged such that empty containers are introduced therethrough to the sorting rack; and the control means monitors the number of empty containers placed in the rack, and instructs the display means to display addresses to receive empty containers, and the number of empty containers to be supplied.

7. An article sorting system as described in claim 2 wherein the screen of the direction indicating means also displays the kind and number of articles to be sorted.

* * * * *